(12) United States Patent
Kinstner et al.

(10) Patent No.: US 9,928,661 B1
(45) Date of Patent: Mar. 27, 2018

(54) SYSTEM AND METHOD FOR SIMULATING USER INTERACTION WITH VIRTUAL OBJECTS IN AN INTERACTIVE SPACE

(71) Applicant: META COMPANY, San Mateo, CA (US)

(72) Inventors: Zachary R. Kinstner, Ada, MI (US); Raymond Chun Hing Lo, Richmond Hill (CA); Rebecca B. Frank, Los Angeles, CA (US)

(73) Assignee: Meta Company, San Mateo, CA (US)

( * ) Notice: Subject to any disclaimer, the term of this patent is extended or adjusted under 35 U.S.C. 154(b) by 0 days.

(21) Appl. No.: 15/432,846

(22) Filed: Feb. 14, 2017

Related U.S. Application Data

(60) Provisional application No. 62/302,805, filed on Mar. 2, 2016.

(51) Int. Cl.
| | |
|---|---|
| *G06T 19/00* | (2011.01) |
| *G06T 17/10* | (2006.01) |
| *G06F 3/01* | (2006.01) |
| *G06K 9/00* | (2006.01) |
| *G06T 7/70* | (2017.01) |

(52) U.S. Cl.
CPC .......... *G06T 19/006* (2013.01); *G06F 3/011* (2013.01); *G06K 9/00201* (2013.01); *G06K 9/00671* (2013.01); *G06T 7/70* (2017.01); *G06T 17/10* (2013.01); *G06T 2207/10028* (2013.01)

(58) Field of Classification Search
None
See application file for complete search history.

(56) References Cited

U.S. PATENT DOCUMENTS

2017/0235143 A1   8/2017   Chi

OTHER PUBLICATIONS

Ryden et al., "A Method for Constraint-Based Six Degree-of-Freedom Haptic Interaction with Streaming Point Clouds," IEEE, 2013.*

\* cited by examiner

*Primary Examiner* — Nicholas R Wilson
(74) *Attorney, Agent, or Firm* — Sheppard Mullin Richter & Hampton LLP

(57) ABSTRACT

Systems and methods for simulating user interaction with virtual objects in an augmented reality environment are provided. Three-dimensional point cloud information from a three-dimensional volumetric imaging sensor may be obtained. An object position of a virtual object may be determined. Individual potential force vectors for potential forces exerted on the virtual object may be determined. An individual potential force vector may be defined by one or more of a magnitude, a direction, and/or other information. An aggregate scalar magnitude of the individual potential force vectors may be determined. An aggregate potential force vector may be determined by aggregating the magnitudes and directions of the individual potential force vectors. It may be determined whether the potential forces exerted on the virtual object are conflicting.

20 Claims, 37 Drawing Sheets

US 9,928,661 B1

SYSTEM AND METHOD FOR SIMULATING USER INTERACTION WITH VIRTUAL OBJECTS IN AN INTERACTIVE SPACE

FIELD OF THE INVENTION

The system and methods described herein generally relate to simulating user interaction with virtual objects in an interactive space.

BACKGROUND OF THE INVENTION

In recent years, digital technology has trickled into every aspect of our analog life. Most recently, there is a surge in digital technology to replace or enhance our visual experiences. Head-mounted displays (HMDs) have been around for years; however, as computers get more powerful, the visual effects provided by the computers are getting more spectacular, resulting in a resurgence of HMDs.

An HMD is a display device worn on the head of a user or as part of a helmet worn by the user. The HMD may incorporate an opaque display optic positioned in front of one eye (monocular HMD) or each eye (binocular HMD) of the user. Alternatively, an optical HMD is a wearable device, also worn on the head of user that incorporates transparent optics that have the capability of relaying projected images to the viewer while allowing the viewer to see the exterior, real-world environment. One example of a HMD includes a small display optic (e.g., data glasses or a visor) in front of one or both eyes. The HMD may be an optical head-mounted display (OHMD) configured to reflect projecting images on an optical element (e.g., a visor or lens) and allow the user to see through the optical element. HMDs may have one or two small optical elements with lenses and semi-transparent mirrors embedded within data glasses or a visor. The display may be a cathode ray tube (CRT), a liquid crystal display (LCD), liquid crystal on silicon (LCoS), or organic light-emitting diode (OLED). In some examples, the display includes multiple micro-displays to increase the total resolution and field-of-view, therefore providing a better experience to the user. HMDs are used in many applications including military, governmental, and civilian/commercial (e.g., movies, video gaming, sports, etc.), among others.

HMDs may be used to replace our visual experience (e.g., via Virtual Reality (VR)) or enhance our visual experience (e.g., via Augmented Reality (AR)). VR, sometimes referred to as immersive multimedia or computer-simulated reality, replicates an environment that simulates a physical presence in places in the real world or an imagined world. VR allows the user to interact with that world. Moreover, VR may artificially create sensory experiences relating to the virtually created world, which may include one or more of sight, touch, audio, and/or smell. AR is a live direct or indirect view of a physical, real-world environment that includes augmented or supplemented elements generated by a computer having sensory inputs. The sensory inputs may include one or more of a sound, a video, graphics, and/or position data. AR modifies the view of reality by using a user device, coupled with an application executing on the user device. Furthermore, AR functions by enhancing, altering, or modifying a user's perception of reality, which may be different from virtual reality that replaces the real world with a simulated one. AR applications may provide the user with a real-time experience in relation and in context with environmental elements around the user. AR applications allow a user to interact with his/her environment and objects within the environment and manipulate the AR associated with the environment.

SUMMARY

The description herein provides methods, systems, techniques, and components that may facilitate manipulation of computer-generated elements (e.g., virtual content in the form of three dimensional (3D) digital imagery) within an interactive space. The interactive space may include one or more of a virtual reality environment, an augmented reality environment, and/or other interactive spaces. An "augmented reality environment," as used herein, may refer to a space that represents a virtual environment that is superimposed over a perspective of a physical environment around a specific user. An augmented reality environment may include attributes of a virtual environment, including virtual objects superimposed over portions of the physical environment. In some implementations, an augmented reality environment may represent physical objects in the physical world as virtual objects in the augmented environment. The terms "space" and "environment" may be used interchangeable herein.

In some implementations, manipulation of computer-generated elements may be facilitated based on output signals from one or more sensors and/or other information. The output signals may convey locations of points on a real-world object within a real-world three-dimensional space. The points may correspond to, for example, a 3D point cloud. In some implementations, the virtual content (also referred to as one or more of "virtual entities," and/or "virtual objects") may be assigned an associated charge and/or field. A charge and/or field assigned to virtual content may be referred to as one or more of an "interactive volume," "volume of influence," and/or other terms. It is noted that the terms "interactive volume" and "volume of influence" may be used interchangeable to refer to an assigned charge and/or field of virtual content. In some implementations, virtual content may include one or more of individual primitives (a concept that is described in greater depth herein), entities comprised of a composite of multiple discrete primitives, and/or other content.

In some implementations, a virtual object may have more than one associated interactive volumes and/or fields. A virtual object may become interactive with an entity from the real world (also referred to as one or more of a "real-world entity," "real-world object," and/or "real world element") when the real world entity interacts with an interactive volume associated with the virtual object. For example, when a real world object enters an interactive volume of a virtual object, a force exerted on the virtual object by the real world object may be determined. The force may be determined based on a charge associated with the interactive volume of the virtual object and/or other information. The virtual object may be configured to respond to the exerted force based on one or more of one or more properties assigned to the virtual object, one or more properties of an interactive space in which the virtual object and real world object may be present, and/or other information. In some implementations, forces may be applied to virtual objects using a real-world physics model to determine a response by the virtual object to an applied force. In some implementations, a virtual object may be treated as a fluid (e.g., a deformable object with a displacement property). In some implementations, a virtual object may be treated as a solid (e.g., an object with a stable, definite shape, and/or a definite volume).

By way of non-limiting example, a real world object may penetrate or otherwise exist inside of a virtual object as rendered in an interactive space. In some implementations, a virtual object having an interactive volume that has been entered by a translated real world object may be acted upon by a force from the real-world object. As a result, virtual objects may be manipulated and/or interacted with by real world objects. A real-world object may include one or more of a hand, a pencil, a table, and/or other real-world objects.

In some implementations, a processing burden associated with rendering and/or manipulating virtual objects in a 3D interactive space may be reduced and/or simplified by limiting processing computations associated with virtual objects to fewer instances when translated real world object and virtual objects are interacting concurrently. Users may intuitively interact with virtual objects based on their everyday understanding of real-world physics phenomena while achieving efficiency from a computing perspective.

In some implementations, a virtual object may be defined by one or more of shape, form, size, color, and/or other attributes. In some implementations, a virtual object may be provided as a digital image rendered by an imaging component configured to generate digital imagery. An imaging component may comprise one or more of a display, a projector, and/or other imaging components. An individual virtual object may be assigned one or more parameter values of one or more parameters to model one or more properties of the virtual object in a 3D interactive space. The one or more parameter values of the one or more parameters may be used to determine a behavior of the virtual object in an interactive space. The one or more parameters may include one or more of a type parameter, a charge parameter, a field parameter, one or more constraint parameters, one or more visual parameters, and/or other parameters. One or more parameter values of the one or more parameters may be permanent and/or adjustable to modify the behavior and/or appearance of a virtual object within the interactive space.

A virtual object may be comprised of a set of one or more primitives that may be geometrically modelled. One or more primitives may be used, associated, and/or combined to represent a virtual object within the interactive space. Primitives may include one or more of a point, a line and/or a line segment, a plane (or subset of a plane with a boundary condition, such as a circle or rectangle), an ellipsoid (e.g., a sphere), a cylinder, a torus, and/or other forms.

In some implementations, a real world object may be detected and/or modeled in a virtual world as a collection of point charges. For example, a real world object (e.g., a hand and/or other real world object that may be detected by a sensor) may be modelled as a point cloud derived from output of one or more sensors. In some implementations, output of one or more sensors may be referred to interchangeably as "three-dimensional point cloud information," "three-dimensional point cloud data," "point data," and/or other terms. The three-dimensional point cloud information may convey three-dimensional coordinates of points within a real-world and/or an interactive space. The interactive space may comprise an augmented reality space and/or a virtual reality space. An augmented reality space may refer to one or both of a virtual space and/or a real-world space. In some implementations, a sensing device may be configured to sense and/or detect a real world object. The sensing and/or detection may provide via output that comprises a collection of point data (e.g., three-dimensional point cloud information). The point data may be representative of the real world object and its movement in space over time.

In some implementations, point data from one or more sensors may be associated with coordinates corresponding to a location of the point data in a virtual space and/or other interactive space. By way of non-limiting illustration, a sensor may be included in a depth/range sensing camera, such as, for example, a Time-of-Flight (ToF) camera and/or other devices. The sensor may be configured to generate output signals conveying a set of points having real-world spatial coordinates. The set of points may correspond to locations on a real world object within the camera's range of vision. Individual points may have a spatial coordinate expressed within a coordinate system. For example, in a three-dimensional Cartesian coordinate system, the special coordinates may expressed as values of one or more of an x-component, y-component, z-component, and/or other components. Individual points may be associated with individual confidence values (e.g., a value ranging from 0 to 1). Individual points may be associated with a time stamp associated with a frame or snapshot in time from the sensor. A set of points may be referred to as a point cloud. The point cloud may be filtered, for example, using the confidence values to stabilize the input and reduce noise associated with detection of the point cloud. The filtered point cloud may be associated with 3D virtual space coordinates to align the virtual world and the real world. The filtered collection of points may be assigned a parameter value of a charge parameter and/or other parameter values of other parameters.

In some implementations, individual points and/or individual sets of points may be assigned an individual parameter value of a charge parameter. In some implementations, individual sets of points corresponding to individual real world objects may be assigned the same or different parameter values for charge parameter than other individual sets of points corresponding to other individual real-world objects (e.g., points within a point cloud associated with a user's hand may be assigned a value of a charge parameter and points within a point cloud associated with a table surface may be assigned the same or different value).

In some implementations, individual unique identifications (ID) and/or other information may be associated with individual points and/or sets of points. In some implementations, a visual representation of points in a point cloud may be rendered within the 3D virtual space (e.g., to aid a user in manipulating real world objects in order to affect virtual objects in the virtual 3D space). When points within a point cloud enter a field or boundary associated with a virtual object (such as a primitive of the virtual object), forces may be determined and/or applied to the primitive based on parameter values of one or more parameters assigned to the primitives and/or to the virtual environment to determine a response by the associated virtual object.

One or more aspects of the disclosure relate to a system configured to simulate user interaction with virtual objects in an interactive space, such as an augmented reality space. In particular, one or more features and/or functions of the system may be configured to facilitate user interactions that may be indicative of one or more manners of interaction. One or more manners of interaction may include one or more of a user "grabbing," "grasping," and/or performing other gestures and/or interactions with respect to a virtual object in an augmented reality space.

The system may comprise one or more physical processors. The one or more physical processor may be configured by machine-readable instructions. Executing the machine-readable instructions may cause the one or more processor to facilitate simulating user interaction with virtual objects in an augmented reality space. The machine-readable instructions may comprise one or more computer program components.

A component of machine-readable instructions may be configured to obtain three-dimensional point cloud information and/or other information. Three-dimensional point cloud information may be obtained from a three-dimensional volumetric imaging sensor and/or other sensing devices. The three-dimensional point cloud information and/or other information may convey three-dimensional coordinates of points detected within a real-world space and/or interactive space. The points may include a first set of points and/or other sets of points.

A component of machine-readable instructions may be configured to determine object positions of individual virtual objects within the augmented reality space. An object position of a virtual object may be defined by three-dimensional coordinates within an interactive space, and/or other information.

A component of machine-readable instructions may be configured to determine individual potential force vectors for potential forces exerted on a virtual object by individual points in the first set of points and/or other sets of points. An individual potential force vector may be defined by one or more of a magnitude, a direction, and/or other information. The magnitude of the individual potential force vectors may be a function of distance between the individual points in the first set of points and the virtual object within an interactive space, and/or other information.

A component of machine-readable instructions may be configured to determine an aggregate scalar magnitude of the individual potential force vectors.

A component of machine-readable instructions may be configured to determine an aggregate potential force vector. The aggregate potential force vector may be determined by aggregating the magnitudes and/or directions of the individual potential force vectors.

A component of machine-readable instructions may be configured to determine whether potential forces exerted by the individual points in the first set of points and/or other sets of points on the virtual object may be conflicting. By way of non-limiting example, responsive to a difference between the aggregate scalar magnitude and the aggregate magnitude of the aggregate potential force vector being greater than a threshold value, it may be determined that the potential forces exerted by the individual points in the first set of points on the virtual object may be conflicting. By way of non-limiting example, responsive to the difference being less than the threshold value, it may be determined that the potential forces exerted by the individual points in the first set of points on the virtual object may not be conflicting.

The following detailed description is merely exemplary in nature and is not intended to limit the described embodiments (examples, options, etc.) or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable making or using the embodiments of the disclosure and are not intended to limit the scope of the disclosure. For purposes of the description herein, the terms "upper," "lower," "left," "rear," "right," "front," "vertical," "horizontal," and similar terms or derivatives thereof shall relate to the examples as oriented in the drawings and do not necessarily reflect real-world orientations unless specifically indicated. Furthermore, there is no intention to be bound by any expressed or implied theory presented in the following detailed description. It is also to be understood that the specific devices, arrangements, configurations, and processes illustrated in the attached drawings, and described in the following specification, are exemplary embodiments (examples), aspects and/or concepts. Hence, specific dimensions and other physical characteristics relating to the embodiments disclosed herein are not to be considered as limiting, except in the context of any claims which expressly states otherwise. It is understood that "at least one" is equivalent to "a."

The aspects (examples, alterations, modifications, options, variations, embodiments and any equivalent thereof) are described with reference to the drawings; it should be understood that the descriptions herein show by way of illustration various embodiments in which claimed inventions may be practiced and are not exhaustive or exclusive. They are presented only to assist in understanding and teach the claimed principles. It should be understood that they are not necessarily representative of all claimed inventions. As such, certain aspects of the disclosure have not been discussed herein. That alternate embodiments may not have been presented for a specific portion of the invention or that further alternate embodiments which are not described may be available for a portion is not to be considered a disclaimer of those alternate embodiments. It will be appreciated that many of those embodiments not described incorporate the same principles of the invention and others that are equivalent. Thus, it is to be understood that other embodiments may be utilized and functional, logical, organizational, structural and/or topological modifications may be made without departing from the scope and/or spirit of the disclosure.

These and other objects, features, and characteristics of the present disclosure, as well as the methods of operation and functions of the related components of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the any limits. As used in the specification and in the claims, the singular form of "a", "an", and "the" include plural referents unless the context clearly dictates otherwise.

DETAILED DESCRIPTION

Force Determination

Figure 1:
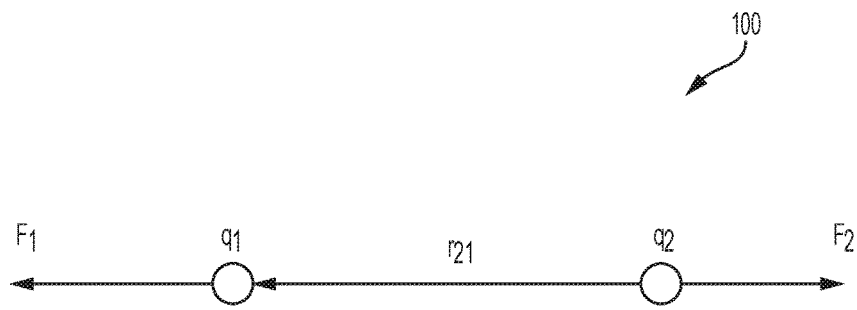
FIG. 1 illustrates an example of a force diagram showing manipulation of virtual Input/output (I/O) elements using forces, in accordance with one or more implementations.

FIG. 1 illustrates a technique of applying forces to individual virtual objects in an interactive space. A virtual object may be represented by one or more points within an interactive space. An individual point of a virtual object may be assigned a parameter value of a charge parameter and/or other parameter values of other parameters. A real-world object may be represented by one or more points within an interactive space. An individual point of a real-world object may be assigned a parameter value of a charge parameter and/or other parameter values of other parameters.

Assignment of parameter values of a charge parameter to individual points may cause the individual points to act as electrically charged particles. Interaction of multiple points 100 in FIG. 1 may be simulated by applying governing principles of Coulomb's Law, which models electric forces between two charges. A magnitude of an electrostatic force of interaction between two point charges, q1 and q2, may be determined to be directly proportional to a scalar multiplication of individual magnitudes of the point charges and inversely proportional to the square of a distance, r21, between the two point charges, q1 and q2. The force may be applied along a straight line joining the points. If the two points have the same charge (e.g., positive and positive), a virtual electrostatic force between them is repellant (e.g., the points try move away from each other); if the two points have different charges (e.g., positive and negative), a virtual force between them is attractive (e.g., the points try to move towards each), as shown in FIG. 1.

Coulomb's law can be stated as a mathematical expression. The scalar and vector forms of the mathematical equation are given by:

$$|F| = k_e \frac{|q_1 q_2|}{r^2} \text{ and} \qquad \text{Equation 1}$$

$$|F| = k_e \frac{|q_1 q_2|}{|r_{21}|^2} r^{\wedge}_{21} \qquad \text{Equation 2}$$

respectively,
where ke is Coulomb's constant ke=8.9875×10⁹ N·m²·C⁻² and q1 and q2 are the signed magnitudes of the charges, the scalar r is the distance between the charges, the vector $r_{21}=r_1-r_2$ is the vectorial distance between the charges, and $$r^{\wedge}_{21} = \frac{r_{21}}{|r_{21}|} \qquad \text{Equation 3}$$

(a unit vector pointing from q2 to q1).

For example, as shown in FIG. 1, if q2 represents a point charge associated with a real world object and q1 is a point charge associated with a virtual object (e.g., a primitive), then a vector form of the equation calculates the force F1 applied on q1 by q2. The determined force may be applied to the virtual object according to one or more properties associated with the virtual object. In some implementations, a derivative of Coulomb's law may be applied to simplify a computation of force applied to a virtual object. For example, the constant ke and q1 may be replaced by a single constant K, if the point charges on each primitive are constant at that instance, which is given by:

$$|F_1| = K \frac{q_2}{|r_{21}|^2} r_{21} \qquad \text{Equation 4}$$

In some implementations, other force mapping functions may be used to compute force applied to a virtual object—for example, to create a different behavior resulting from a force interaction. By way of non-limiting example, a distance may be mapped to a force computation using a reciprocal function (e.g., F ∝ 1/r⁴) to obtain a faster rate of force application (e.g., when a faster response time is desired from a force interaction).

Primitives

In some implementations, individual virtual objects may be modeled by one or more primitives and/or other virtual content. Information defining individual virtual objects (e.g., a data file) may include information defining one or more of one or more primitives, one or more coordinates, assigned content, one or more graphics, and/or other information. In some implementations, a primitive may represent a building block of virtual objects in a virtual world. Individual primitives may be assigned one or more parameter values for one or more parameters. Parameter values of one or more parameters may define properties the individual primitives and/or virtual objects they make up. For example, parameters may include one or more of a type parameter, a charge parameter, a field parameter, a size parameter, one of more constraint parameters, one or more coordinate parameters, one or more visual parameters, and/or other parameters. Assigning values to one or both of a charge parameter and/or field parameter may facilitate defining an interactive volume of a virtual object.

A "primitive," as used herein, may refer to a basic shape used as a building block of one or more virtual objects. A primitive may have one or more attributes that define the primitive. Attributes may include one or more of length, width, depth, volume, mass, flexibility, momentum, force, rotational attributes, and/or other attributes. In some implementations, attributes of a primitive may be defined by a user, such as a developer or an end-user.

A type parameter may refer to a geometry type of a primitive. A value of a type parameter may specify a geometry of a primitive and/or other information. By way of non-limiting illustration, a value of a type parameter may include one or more of a point, a line or a line segment, a plane (or subset of a plane with a boundary condition, such as a circle or rectangle), an ellipsoid (e.g., a sphere), a cylinder, a torus, and/or other geometries. One or more geometric models may be specified by piece-wise parametric equations corresponding to a shape and/or a size of the primitive.

A value of a charge parameter of a primitive may include one or more of positive, negative, no charge (e.g., 0), and/or other values. In some implementations, a value of a charge parameter may further specify a magnitude of a charge (e.g., 0<q<100). In some implementations, if a charge of a virtual object is the same as the charge associated with a point from a sensor input, then a force applied by the sensor input on the virtual object may be repellant. In some implementations, if a charge of a virtual object is the opposite to a charge associated with a point from a sensor input, then a force applied by the sensor input on the virtual object may be attractive. In some implementations, a primitive may have multiple values of a charge parameter (e.g., have multiple charges).

A value of a field parameter of a primitive may facilitate defining an interactive boundary of the primitive. When a value of a field parameter is combined with a value of a charge parameter of a primitive, an "interactive volume" of the primitive may be defined. An interactive volume may facilitate interactions of a primitive with one or more real world objects. In one example, a value of a field parameter may include a distance, df (e.g., 0 cm<df<=10 cm), measured by a line segment orthogonal to a core of a primitive at which, when coordinates of a sensor input are determined to be within it, the primitive becomes interactive (e.g., responds to forces acting on the primitive according to a charge associated with the field). In some implementations, a distance may be measured as a line segment orthogonal to a core associated with a virtual object comprising multiple primitives. When coordinates of a sensor input are determined to be within a boundary of a virtual object defined by a value of a field parameter, the virtual object may be active or interactive. When a virtual object becomes active or interactive, the virtual object may be configured to respond in a defined manner to a sensor input (e.g., responsive to an application of force from the sensor input according to a charge associated with the field).

In some implementations, a primitive may have multiple interactive volumes (also referred to as volume of influence). In some implementations, a primitive may have at least two interactive volumes. For example, a primitive may have a first value of a first charge parameter (e.g., zero charge) that may be applied from a core of the primitive to a first distance defined by a first value of a first field parameter, and a second value of a second charge parameter (e.g., a positive or negative charge) that may be applied between the first distance and a second distance defined by a second value of a second field parameter. The first distance may define a first field; and a space between the first distance and the second distance may define a second field. For example, from the core to the first distance (e.g., 0 cm<=dfcore<=5 cm), the primitive may have a zero charge to generate a neutral interactive volume. Within the neutral interactive volume, no forces may be applied to the virtual object associated with the primitive and/or no force computation may be performed. In some implementations providing a neutral interactive volume around a core of a primitive may prevent an infinite amount of force from being applied to the primitive and its related virtual object, for example, at an instance due to an attempt to divide by zero during a force calculation. Dividing by zero may result in unwanted manipulation of a virtual object. In some implementations, the neutral interactive volume may be roughly correlated to a visual size or portion of a rendering of a virtual object as it appears to a user. From the first distance to the second distance (e.g., 5 cm<dfforce<=10 cm), the second field may have a charge (e.g., positive or negative). The charge of the second field may create a repellant interactive volume (e.g., charge of field is same as charge associated with a sensor input) or an attractive interactive volume (e.g., charge of field is opposite to a charge associated with a sensor input). The charge of the second field may govern the way one or more applied forces (as defined by sensor input) acts on the primitive. Beyond the second distance, the primitive may be inactive. Examples of interactive volumes are shown in conjunction with the primitives illustrated in FIGS. 2A-2E.

In some implementations, a primitive may have three interactive volumes: an inner neutral interactive volume, an intermediate repellant interactive volume, and a third outer attractive interactive volume. The combination of interactive volumes may allow a virtual object to be moved and "held" in space as the attraction and repellent forces balance in an equilibrium state (e.g., a force of repulsion may be substantially equal to a force of attraction at a specified distance from the core). An example of a primitive with three interactive volumes configured in this fashion is shown in FIG. 2F. For example, primitive 200F in FIG. 2F may include one or more of a neutral interactive volume extending from a core of the primitive to a first distance (e.g., 0 cm<=dfcore<=5 cm, charge=zero), a repellant interactive volume extending from the first distance to a second distance (e.g., 5 cm<dfrepel<=10 cm charge=positive), an attractive interactive volume from the second distance to a third distance, and/or other interactive volumes. A sensor input may have a positive charge. As the sensor input moves within the third distance from the core of primitive 200F, primitive 200F may experience an attractive force and may move toward sensor input. As long as the sensor input maintains a distance that is between the second distance and third distance, primitive 200F may continue to be attracted and/or move towards sensor input. If sensor input remains in place over time, primitive 200F may continue to be attracted and may move towards sensor input until the distance from the core of the primitive reaches the second distance and into the repellant interactive volume. Once sensor input is at the second distance, the attractive force generated by the attractive interactive volume may equal the repellant force generated by the repellant interactive volume. This balance may facilitate simulating primitive 200F being held in space. If sensor input moves within the second distance in the repellant interactive volume, primitive 200F may experience a repellant force and may move away from sensor input. Such an interaction may simulate giving primitive 200F the appearance of body or substance. As long as the sensor input maintains a distance between the first distance and second distance (e.g., 5 cm<d_sensor input<=10 cm), primitive 200F may continue to be repelled and may move away from sensor input. If sensor input moves within the first distance, no force may be applied to primitive 200F, for example, to prevented unwanted force calculations and/or unwanted virtual object manipulation.

For example, if depth camera sensor points correspond to a user's hand and a primitive such as primitive 200F is incorporated into a virtual object, a user may reach towards the virtual object. When the user's hand encounters an outer interactive volume of the primitive, the virtual object may be attracted to the user's hand. The attraction may continue to the point of equilibrium between the attractive and repellent interactive volumes associated with the primitive. At equilibrium, the virtual object may come to rest. If the user's hand maintains this distance relative to the virtual object, the virtual object may appear to move with the hand as long as this distance is maintained. In this manner, a simulation of the user "holding" the virtual object may be achieved. When in this "hold" position, if the user's hand moves closer to the virtual object, the virtual object will move away from the user's hand, seemingly responding to the movement of the user's hand as it appears to hold the virtual object. Conversely, if the user's hand is moved away from the virtual object with sufficient velocity, the user's hand may leave the attractive interactive volume around the virtual object, and the hand may appear to release or shake off its simulated hold of the virtual object.

In some implementations, a virtual object may be held using two interactive volumes (e.g., a neutral interactive volume surrounded by an attractive interactive volume). In this configuration, the virtual object may be penetrated (e.g., as there may be no repellant interactive volume).

Visual parameters of individual primitives may be used to define visual properties of the individual primitives. Visual parameters may include one or more of a size parameter, a color parameter, a texture parameter, and/or other visual parameters. A value of a size parameter may specify a size of a primitive. A value of a color parameter may specify a color of a primitive. A value of a texture parameter may specify simulated surface texture of a primitive. Values for visual parameters may be used in rendering of primitives in an interactive space. In some implementations, a link, identifier, and/or pointer may be used to associate and/or map virtual content to individual primitive. For example, graphics of a web page may be mapped to a panel (e.g., a two-dimensional plane) primitive simulating a virtual 3D multi-touch pad, while allowing a user to perform click or other gesture inputs on the simulated pad.

Values of one or more constraint parameter may define constraints on how a primitive responds to forces exerted on the primitive when the primitive is active. For example, a force vector and a constraint (among other parameters) may be input to a physics engine or other logic program to simulate dynamics of a virtual and/or augmented reality environment and to determine a response of a primitive to the application of the force. Constraint parameters may include one or more of a drag parameter, an angular drag parameter, a mass parameter, a center of mass parameter, a trajectory parameter. A value of a drag parameter may specify a proportion of force exerted in a direction opposite to a translation velocity of a primitive. A value of a drag parameter may be specified for individual coordinate directions. For example, there may be one or more of a value of a drag parameter in an x-direction, a value of a drag parameter in a y-direction, a value of a drag parameter in a z-direction, and/or other drag specifications. In some implementations, a value of a drag parameter may be between 0 and 1. A value of an angular drag parameter may specify a proportion of force applied in a direction opposite to a rotational velocity of a primitive. A value of an angular drag parameter may be between 0 and 1, and/or other values. A value of a mass parameter may specify a resistance of a primitive to being accelerated by a force applied to the primitive. By way of non-limiting illustration, a value of a mass parameter of a virtual object may be in the range of 0.1 to 10 kilograms, and/or other ranges. It is noted that other amounts and units of measurement may be used. A value of a center of mass parameter may specify a point of a primitive where a force may be applied causing the primitive to move in the direction of the applied force without rotation. A value of a trajectory parameter may specify a pre-defined path a virtual object may travel in a 3D virtual and/or augmented reality environment. A value of a trajectory parameter may constrain possible movement of a virtual object (e.g., moving on a curve, and/or other movement). A primitive may have coordinates associated therewith to define its position in a virtual and/or augmented reality environment and where the primitive may be rendered for display.

FIGS. 2A, 2B, 2C, 2D, 2E, and 2F show examples of primitives that may be used to build virtual objects. As previously stated, the primitives may be the building blocks of virtual objects in a virtual 3D environment and/or augmented reality environment. For example, individual primitives may be used, or one or more of the same or a mixture of different primitives may be combined, to model virtual objects in a virtual 3D space.

Figure 2A:
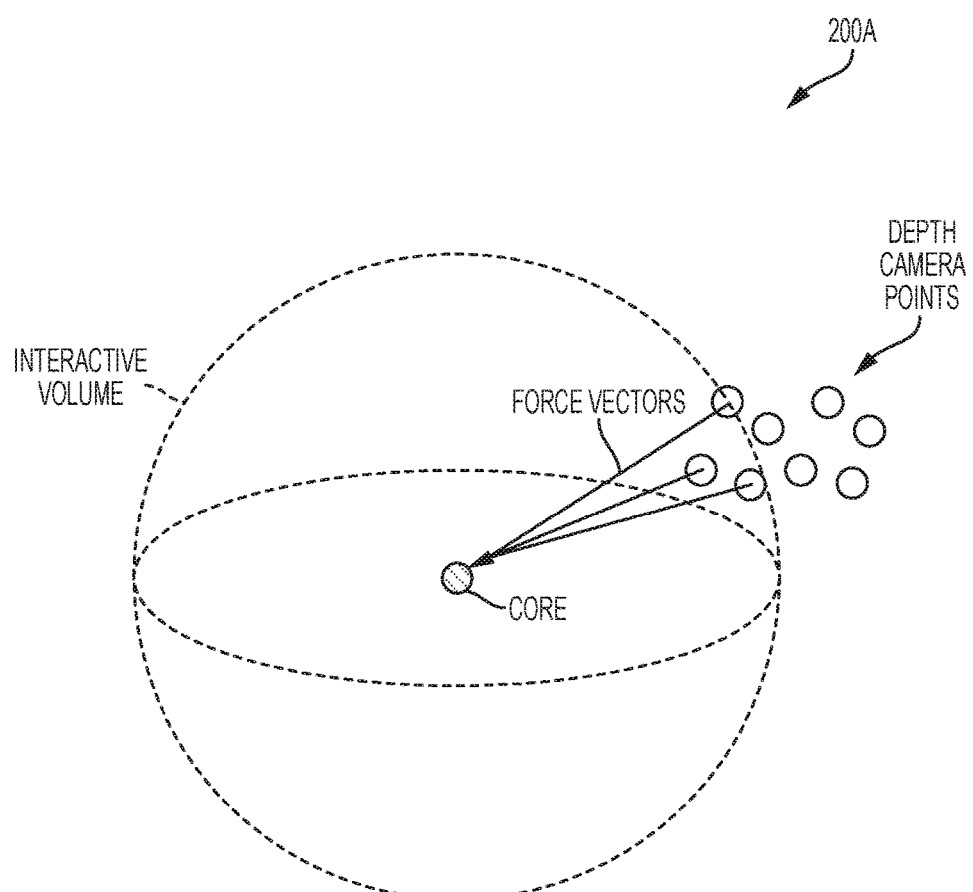
FIG. 2A shows an exemplary primitive that may be used to build virtual objects, in accordance with one or more implementations.
Figure 2B:
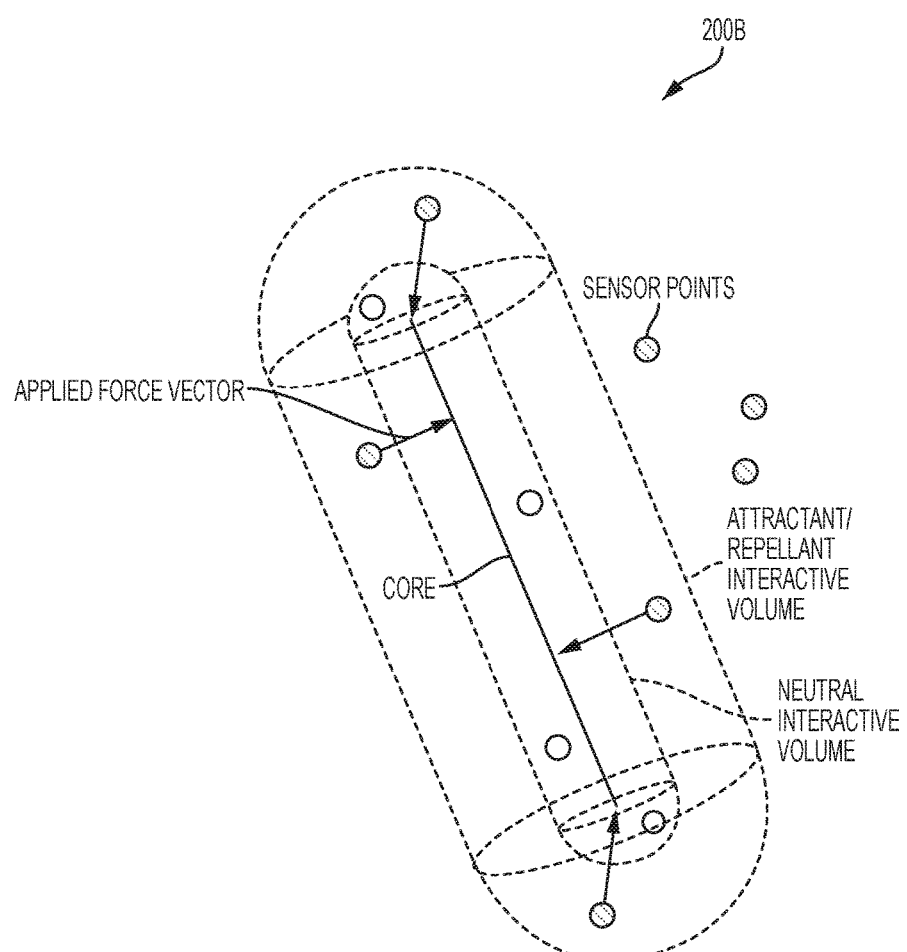
FIG. 2B shows another exemplary primitive that may be used to build virtual objects, in accordance with one or more implementations.
Figure 2C:
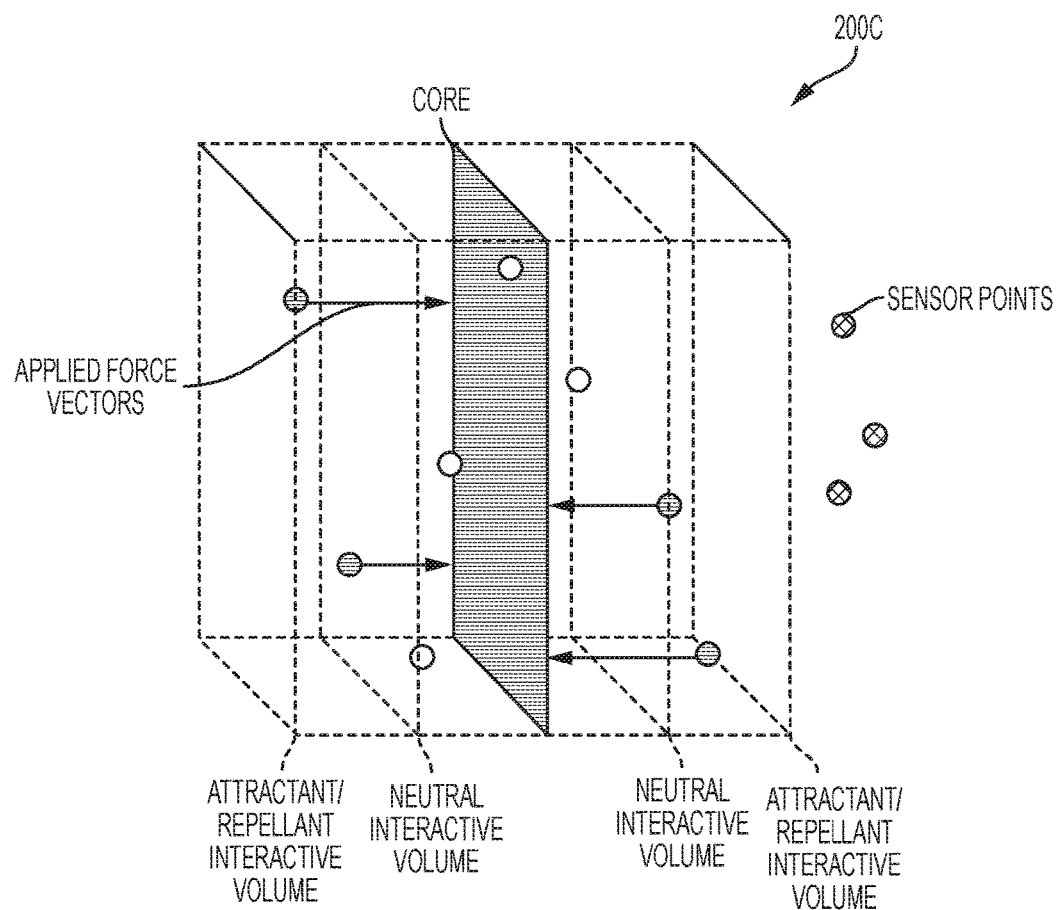
FIG. 2C shows yet another exemplary primitive that may be used to build virtual objects, in accordance with one or more implementations.
Figure 2D:
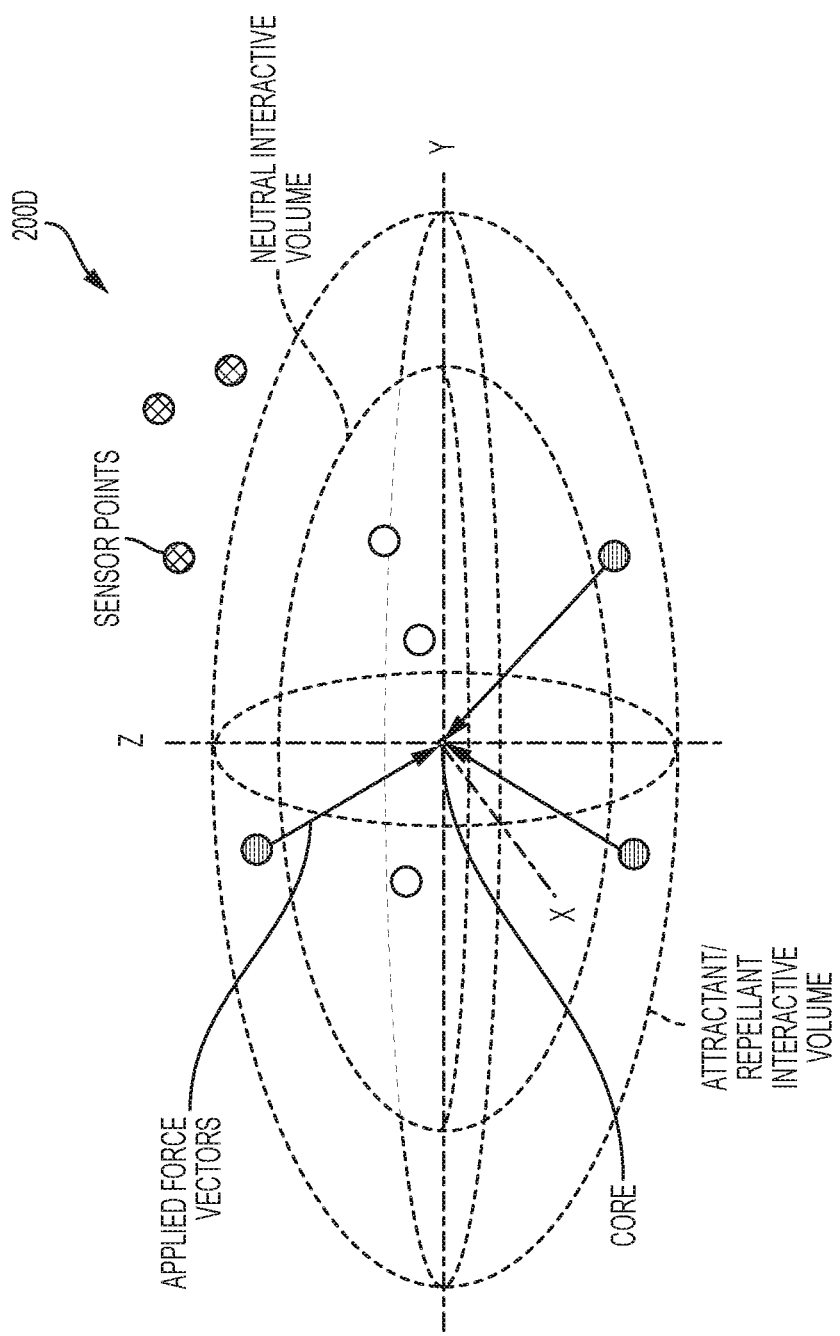
FIG. 2D shows still another exemplary primitive that may be used to build virtual objects, in accordance with one or more implementations.
Figure 2E:
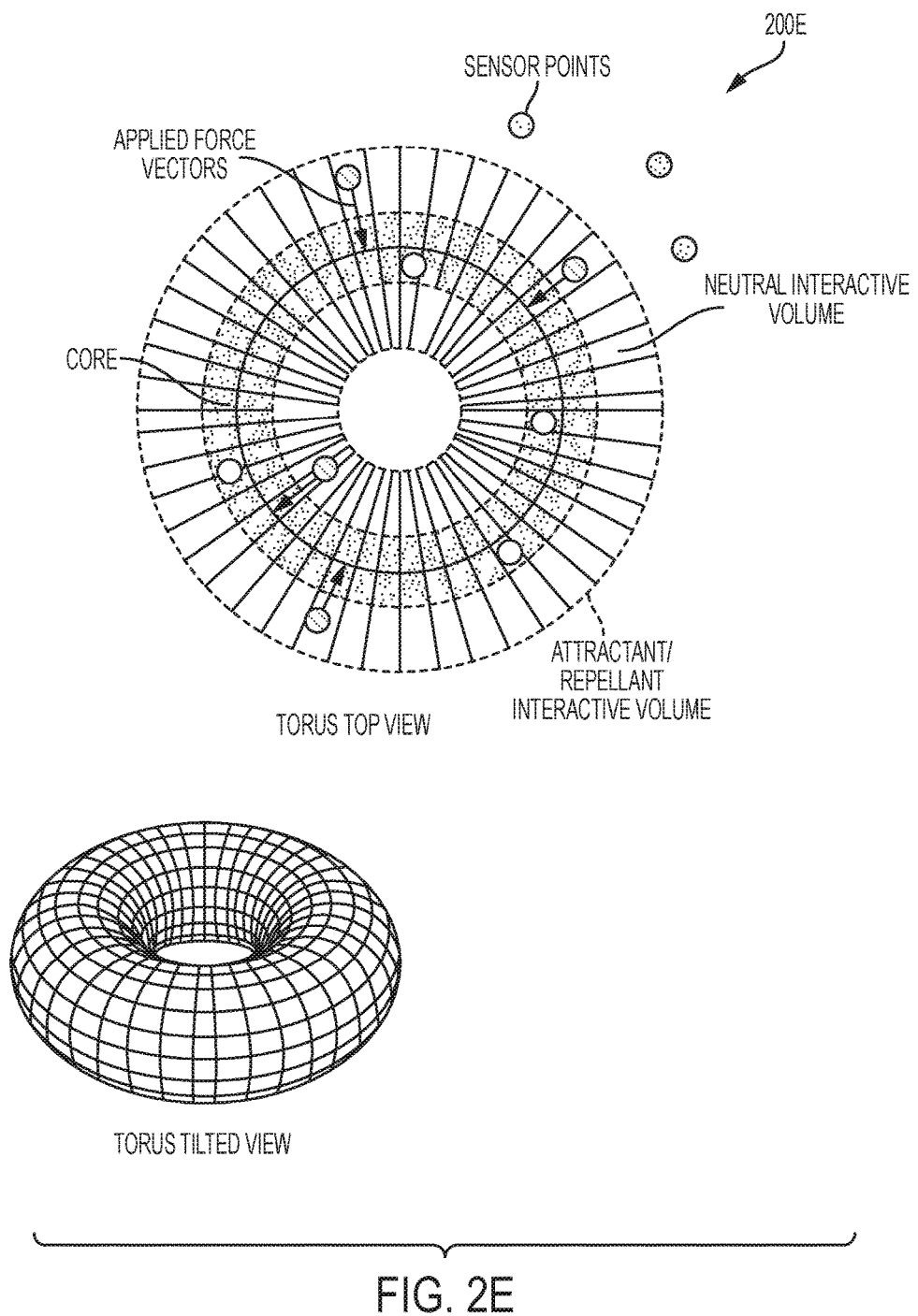
FIG. 2E shows another exemplary primitive that may be used to build virtual objects, in accordance with one or more implementations.
Figure 2F:
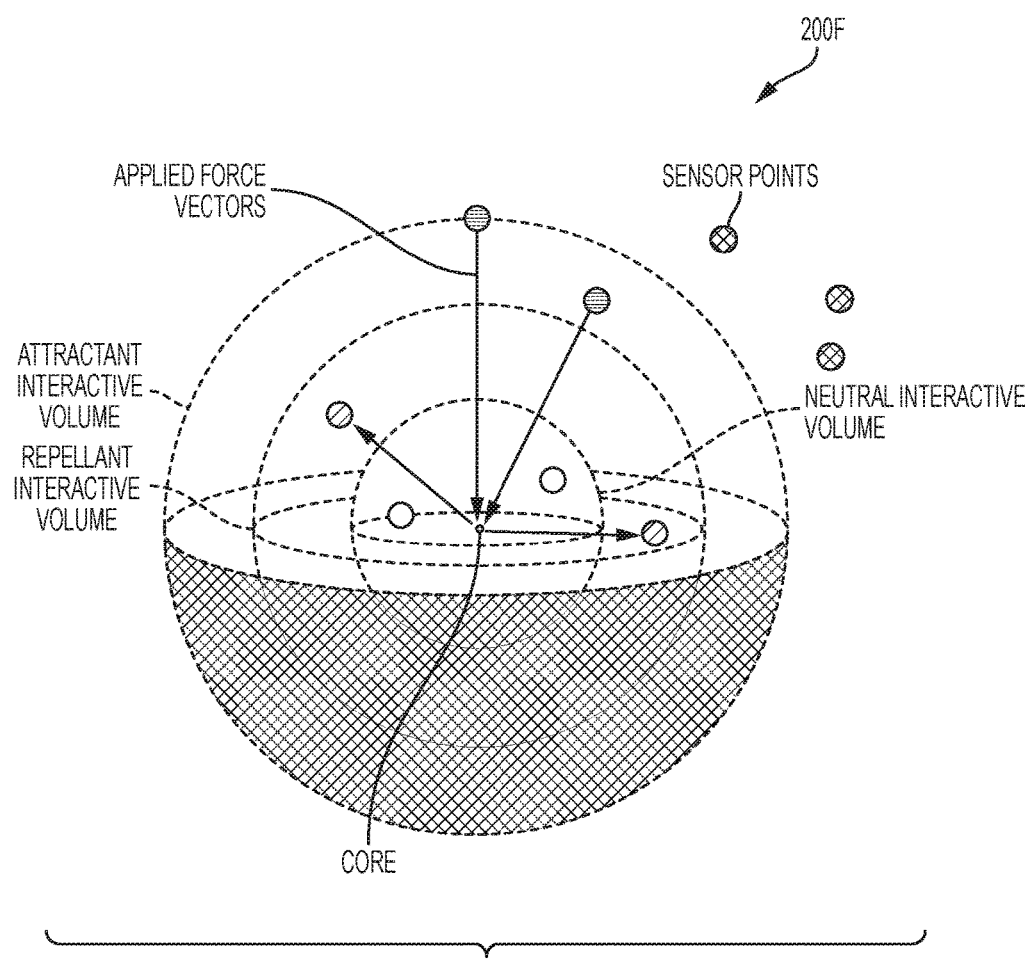
FIG. 2F shows another exemplary primitive that may be used to build virtual objects, in accordance with one or more implementations.

FIG. 2A illustrates an example of a point primitive 200A with an associated interactive volume. The point primitive 200A may represent a single point in a virtual environment and/or augmented reality environment. FIG. 2B illustrates an example of a line primitive 200B with an associated interactive volume. The line primitive 200B may represent a line or a line segment in a virtual and/or augmented reality environment. FIG. 2C illustrates an example of a plane primitive 200C with an associated interactive volume. The plane primitive 200C represents a plane or a subset of a plane (i.e., a plane type object with a boundary condition forming a closed loop, such as, for example, a circle, a triangle, a rectangle and/or other 2D polygon). FIG. 2D illustrates an example of an ellipsoid primitive 200D with an associated interactive volume. The ellipsoid primitive 200D may represent a 3D closed quadric surface analogue of an ellipse, including one or more of a tri-axial ellipsoid, oblate ellipsoid of revolution, a prolate ellipsoid of revolution, a sphere, and/or other shapes. A cylinder primitive may be a 3D object having a surface formed by points at a fixed distance from a given straight line or axis. FIG. 2E illustrates an example of a torus primitive 200E with an associated interactive volume. The torus primitive 200E may represent a 3D object having a surface of revolution generated by revolving a circle in three-dimensional space about an axis coplanar with the circle. FIG. 2F illustrates an example of a sphere primitive 200F (which is a special case of an ellipsoid primitive) with associated interactive volumes.

Additional primitives, or combination of primitives forming a superset (e.g., a rectangular frame formed by four lines joined as a rectangle as a rigid body) may be generated and/or defined. It is noted that the primitive shown an described with respect to FIGS. 2A-2F are for illustrative purposes only and are not to be considered limiting. In some implementations, primitive may have other shapes and/or forms. Modeling of a variety of differently shaped virtual objects may be accomplished by combining primitives to simulate a rigid body having corresponding one or more interactive volumes approximating the shape of a virtual object.

In some implementations, one or more values of one or more parameters may be designated as permanent or dynamic (e.g., changeable by an application at a point in time to modify a behavior and/or appearance of a virtual object within a virtual and/or augmented reality environment). For example, a charge of an interactive volume of a primitive may be changed during operation of an application from positive to negative to change the behavior of the primitive over time or in response to a particular event.

Interactive Volumes and Interactivity

As mentioned above, primitives may include one or more interaction volumes that may be used to determine whether—and under what circumstances—a primitive is interactive (e.g., the primitive may respond to a force based on its associated properties). For example, an interaction volume may be expressed by at least one value of a distance parameter and a value of an associated charge parameter. A value of a distance parameter may define a boundary formed around a primitive at a specified distance measured orthogonally from a core of a primitive. In some implementations, an interaction volume may be expressed by multiple boundaries measured orthogonally from a core of a primitive and a charge. Examples of interaction volumes in relation to various sensor input points are illustrated in FIGS. 2A-2F for the various primitive types. When one or more sensor inputs (e.g., coordinates of a point from a point cloud associated with a real world object) are within a boundary defined by an interaction volume, a primitive may become interactive and force(s) may be applied to the primitive. In some implementations, an interaction volume boundary may reduce a computational burden associated with processing of virtual objects in a virtual 3D environment and/or augmented reality environment by only determining forces and/or other computations associated with virtual object that is within range of a point cloud. As a result, a point cloud that may not be within a boundary of an interaction volume may not be involved in computations associated with the virtual object having the interaction volume.

Figure 3:
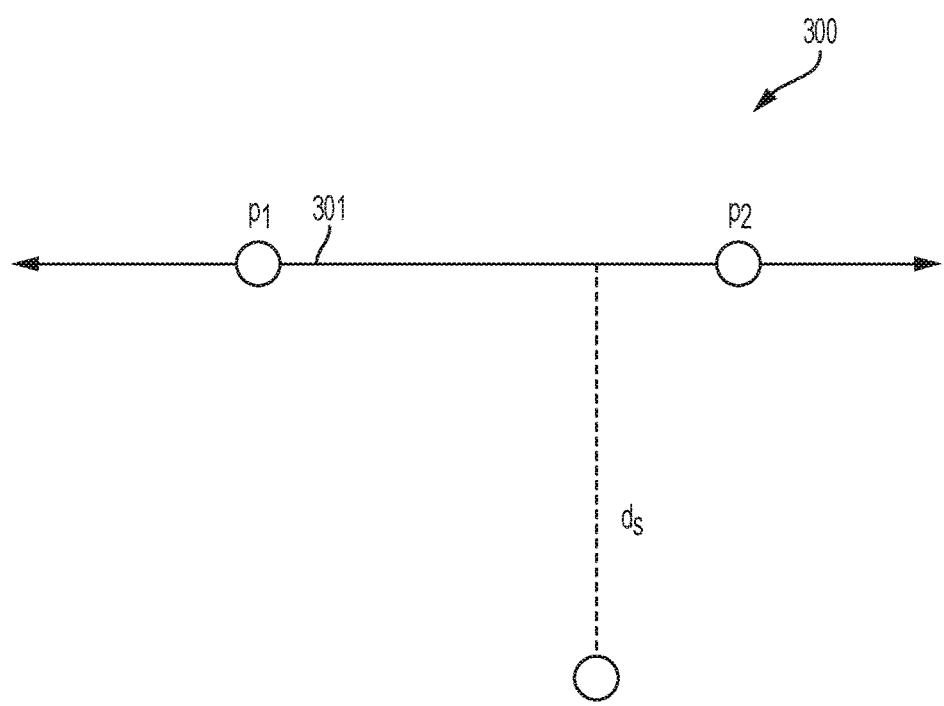
FIG. 3 illustrates an example of a boundary of an interactive volume of a primitive, in accordance with one or more implementations.

In some implementations, a primitive may be interactive when a point associated with an input from a sensor is at a distance, determined by a length of a straight line segment orthogonal to a point on a core of the primitive and extending from the core, that is less than a distance, $d_f$, corresponding to a boundary of an interactive volume of the primitive. FIG. 3 illustrates an example of a determination for a line primitive 300. As shown in FIG. 3, line primitive 300 may be expressed by two points $p_1$ and $p_2$ on the line segment 301. Point $p_1$ may have a position represented by coordinates $(x_1, y_1, z_1)$. Point $p_2$ may have a position represented by coordinates $(x_2, y_2, z_2)$. An input point, $p_{input}$, from a sensor corresponding to a real world object may have a position represented by coordinates ($x_{input}$, $y_{input}$, $z_{input}$). The shortest distance, $d_s$, from $p_{input}$ to line segment 301 may be determined as:

$$d_s = \frac{|(p_{input} - p_1) \times (p_{input} - p_2)|}{|p_2 - p_1|} \quad \text{Equation 5}$$

where primitive 300 may be interactive when $d_s < d_f$.

Virtual Object Manipulation

Figure 4:
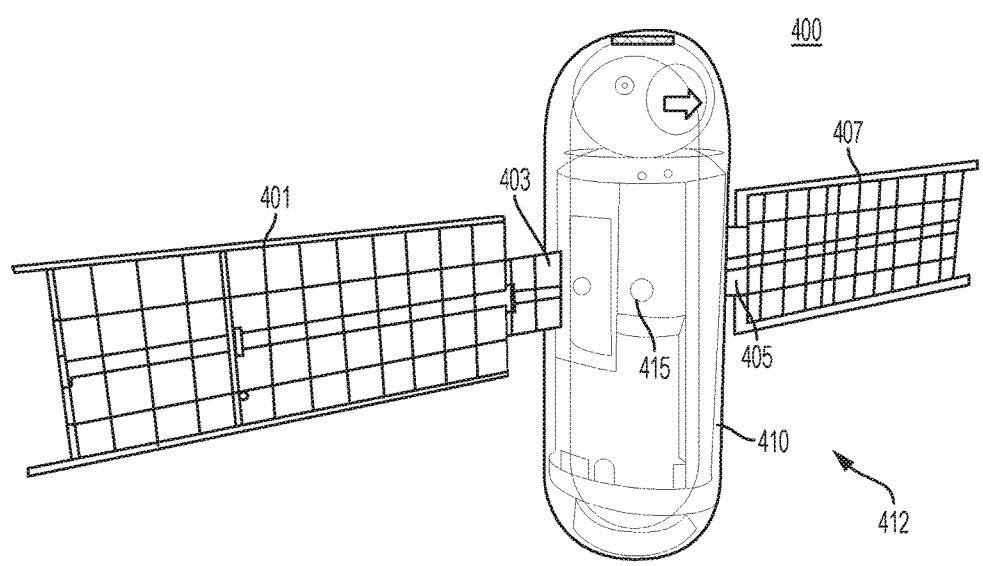
FIG. 4 illustrates an example of application of one or more primitives to content, in accordance with one or more implementations.

FIG. 4 illustrates an example of the application of primitives to define a virtual object 412 in an interactive space 400. By way of non-limiting illustration, a graphics data file may include information to render 3D graphics depicting a satellite telescope, as shown in the figure. In order to make the virtual object 412 interactive, one or more primitives may be used to define the satellite. In some implementations, one or more primitives may be utilized in a modular fashion to emulate a perceived shape of virtual content and to make virtual object 412 interactive. For example, virtual object 412 depicting a satellite as shown in FIG. 4 may be comprised of one or more of four plane primitives 401, 403, 405, 407, a cylinder primitive 410, and/or other primitives. Individual ones of the primitives may be mapped to one or more graphics files to create the visual appearance of a satellite. The virtual object 412 may have a center of mass 415 specified by a value of a center of mass parameter. Together, the primitives, graphics content, and center of mass 415 may simulate a rigid body, in which the rotation and translations of the body are coupled.

Figure 5A:
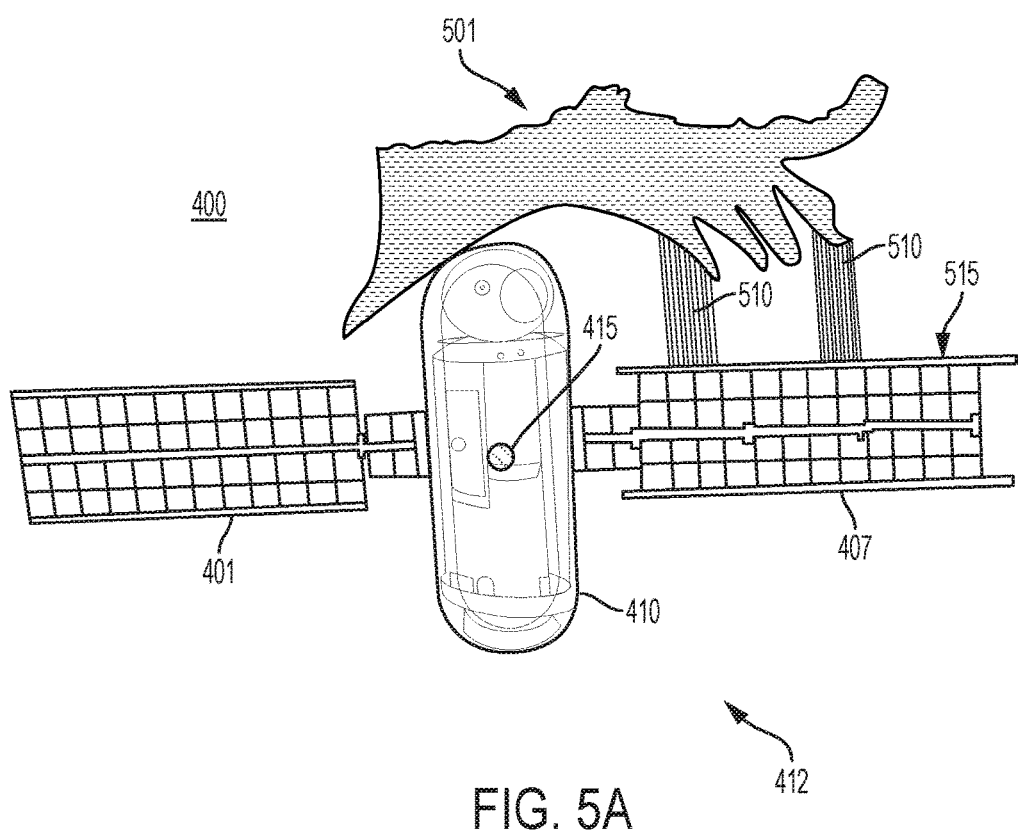
FIG. 5A illustrates an application of sensor inputs, vectors, and primitives to virtual content, in accordance with one or more implementations.

FIG. 5A illustrates an example of rendering virtual object 412 of FIG. 4 (e.g., a satellite telescope) including a visual representation of a point cloud 501 derived from sensor input (e.g., depth coordinates of a hand of user). FIG. 5A shows a first orientation of the virtual object 412. Force vectors 510 are illustrated as lines extending from one or more points of point cloud 501 to an edge 515 of primitive 407. As point cloud 501 moves towards edge 515 of primitive 407, a force may be applied to edge 515 causing primitives 401, 403, 405, 407, and/or 410 to rotate about center of mass 415 to a new orientation (FIG. 5B) in the interactive space 400. It is noted that the illustration of the force vectors 510 as lines is shown in FIG. 5A to aid understanding of the implementation of FIGS. 4, 5A, and 5B, and actual rendering may not require graphic depiction of the force (much in the way force is not seen in the real world). In some implementations, the lines may be shown if depicting the force is desired (e.g., in a user tutorial on how to interact with a virtual environment). In some implementations, point cloud 501 corresponding to sensor input may or may not be rendered or depicted. For example, in an augmented reality application, point cloud 501 may not be illustrated; the hand of a user may be directly viewed while interacting with the virtual objects. In some implementations, in a virtual reality application, point cloud 501 or some other visualization associated therewith may be rendered in a virtual environment to aid the user in controlling, manipulating, and/or interacting with virtual object 412 to show a corresponding location of the real world object translated into the virtual world.

Figure 6:
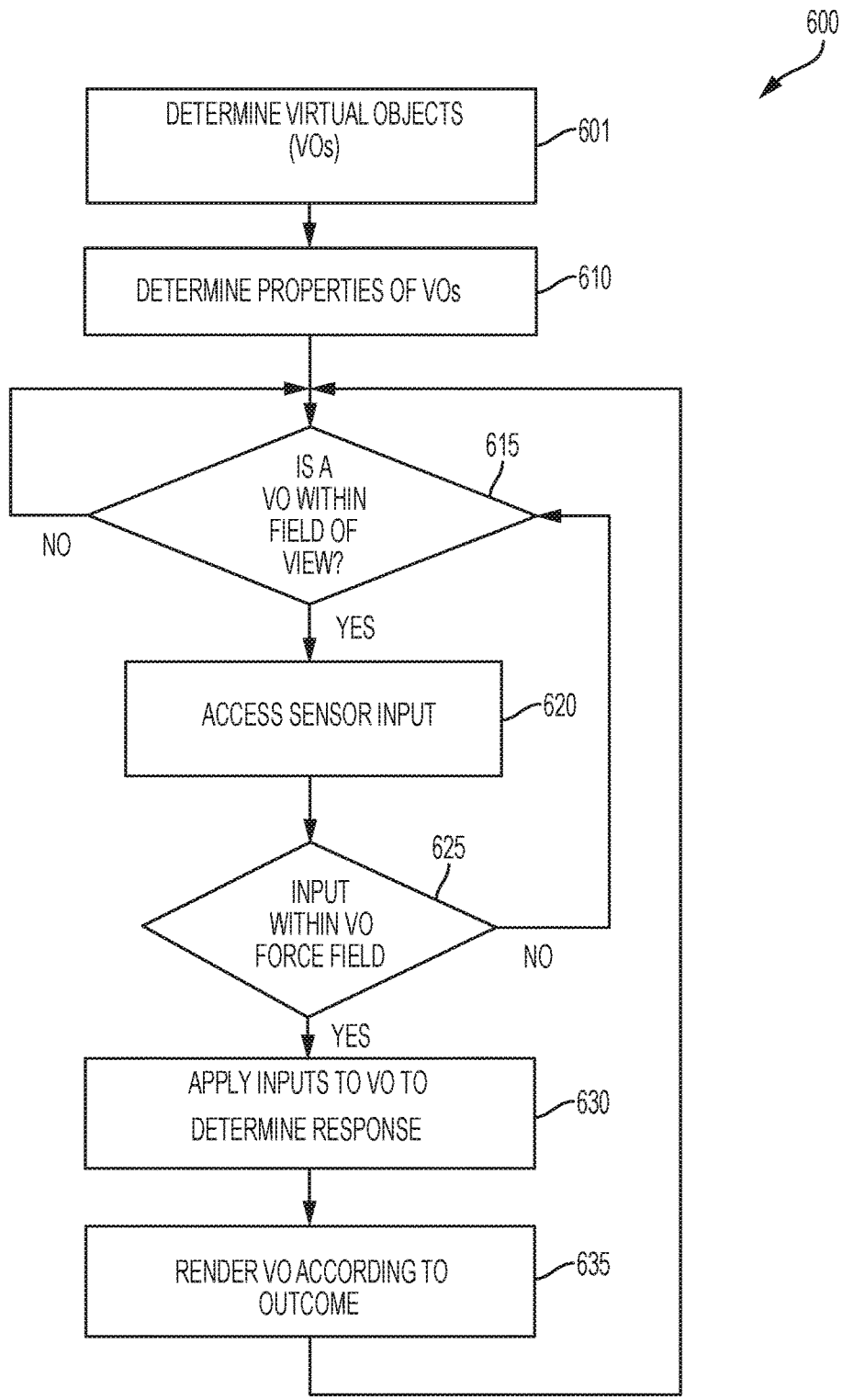
FIG. 6 is a flow chart showing an exemplary method for interacting with virtual objects.

FIG. 6 illustrates a flowchart showing an exemplary method 600 for interacting with virtual objects, in accordance with one or more implementations. The method 600 may be implemented by a processing device executing one or more computer program components. At an operation 601, one or more of the virtual objects in a 3D virtual environment may be determined. For example, one or more files corresponding to the virtual environment and/or virtual objects may be accessed from a memory device. The virtual objects may include initial coordinates within the virtual environment.

At an operation 610, properties of one or more virtual objects determined to be in the virtual environment may be accessed from a corresponding file in a memory device. For example, the primitives and their corresponding values of one or more parameters may be accessed.

At an operation 615, a determination of whether one or more virtual object is in a field of view of a sensor may be made. For example, a sensor detecting real world objects may be oriented to coincide with the field of view of a user of a head mounted display (HMD). As the sensor is pointed in a direction corresponding to the movement of the head of user, the view in a virtual environment may be mapped to coincide with the movement of the sensor and head. Detecting of real-world objects may continue with movement of the user's and/or sensor's field of view.

At an operation 620, sensor input corresponding to a field of view may be accessed. For example, frames of input from a depth sensor may be accessed. Real world objects may be mapped to the virtual 3D space. By way of non-limiting example, a hand of user may be detected and mapped or translated to coordinates of points in the virtual 3D space.

At an operation 625, a determination may be made of whether sensor input may be within an interaction volume of a virtual object. For example, a shortest distance calculation may be performed to determine whether a coordinate in the virtual space corresponding to a sensor input may be within a boundary of a virtual object as defined by an interaction volume of the virtual object. A spatial partitioning method (i.e., a process of dividing space into indexed and searchable regions) may be applied to speed up the boundary-checking process, and may reduce a computation overhead on the distance calculation. If no sensor input is detected within an interaction volume of a virtual object, the method 600 may return to operation 615.

At an operation 630, for individual virtual objects having one or more interaction volumes penetrated by one or more sensor inputs, the one or more sensor inputs may be applied to the individual virtual objects to determine how the individual virtual objects may respond. For example, a force may be determined and applied to an individual virtual object to determine a response of the virtual object to the applied force.

Figure 5B:
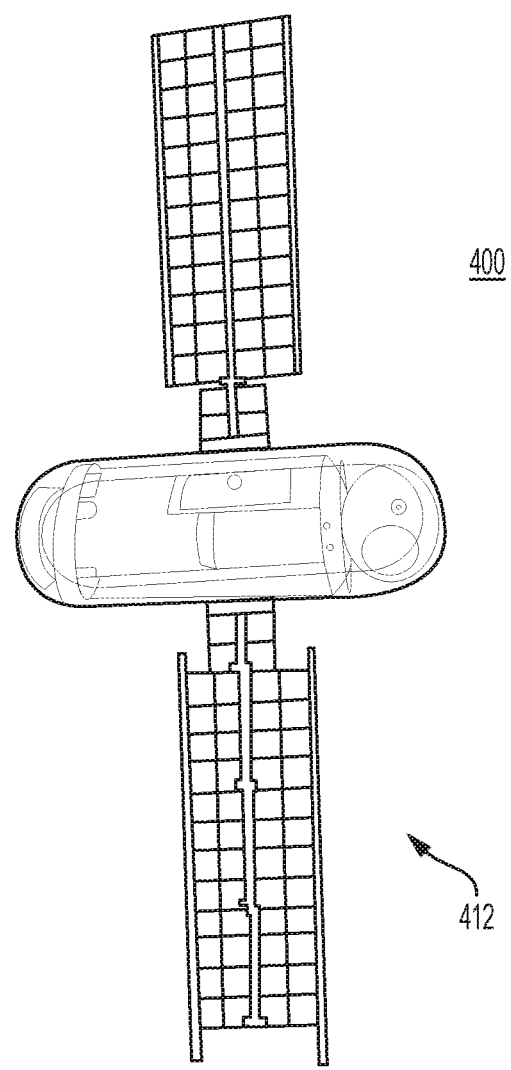
FIG. 5B illustrates another application of sensor inputs, vectors, and primitives to virtual content, in accordance with one or more implementations.

At an operation 635, individual virtual objects may be rendered according to individual outcomes of the responses determined at operation 630. The method 600 may then return to operation 615. For example, an orientation of a virtual object may be rotated around a center of mass associated with the virtual object in response to sensor input corresponding to the user's hand "pushing" on a portion of the virtual object to rotate it (e.g., as shown in FIGS. 5A and 5B).

Figure 7:
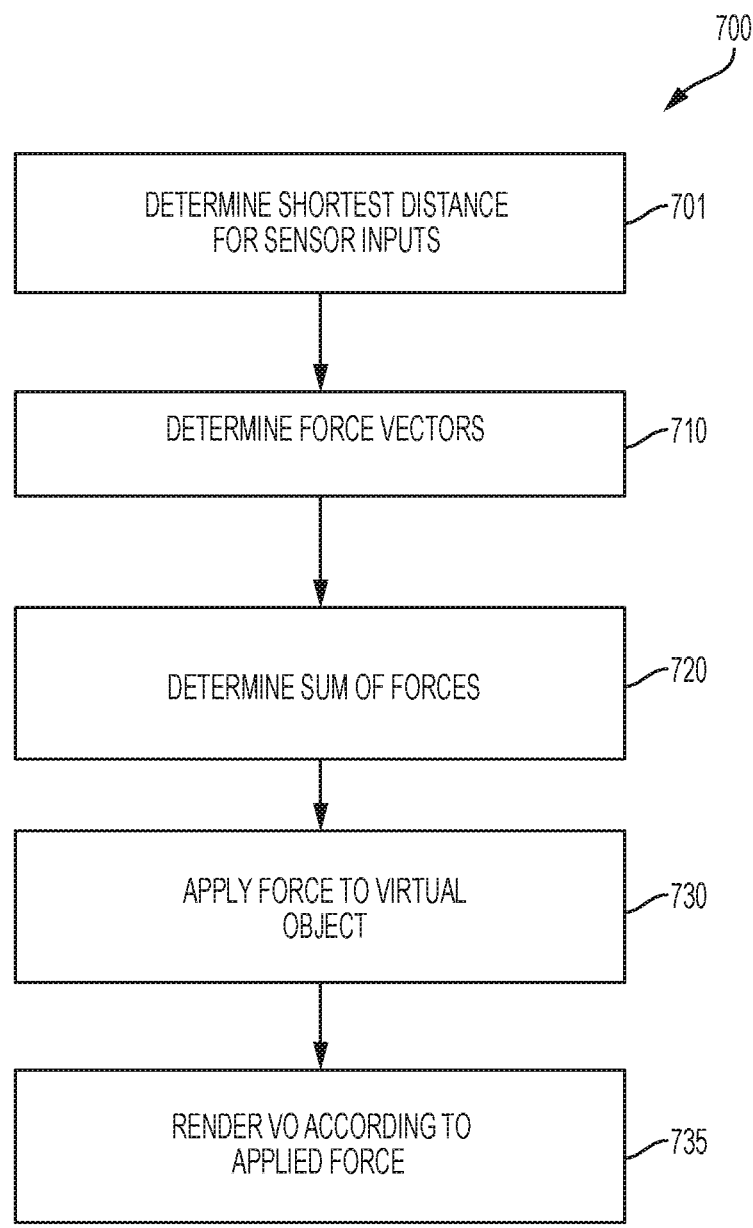
FIG. 7 is a flow chart showing an exemplary method for application of force to a virtual.

FIG. 7 is a flow chart showing one exemplary method 700 for application of sensor inputs to a virtual object. In some implementations, the method 700 may be implemented as part of operation 630 in the method 600 (FIG. 6).

At an operation 701, individual shortest distances "ds" from individual sensor inputs to individual virtual objects may be determined. For example, a length of a straight line segment orthogonal to a point on a core of a virtual object extending from the point on the core to coordinates of a point "pi" (e.g., associated with an input from a sensor) may be determined.

At an operation 710, a potential force vector for individual sensor inputs may be determined. For example, a charge and/or magnitude of an interaction volume may be determined (e.g., q1). A charge and/or magnitude of individual sensor inputs may be determined (e.g., qi). A potential force vector may be calculated as:

$$F_1 = k_e \frac{q_1 q_i}{|r_{i1}|^2} d_s \wedge i1. \qquad \text{Equation 6}$$

At an operation 720, forces for potential force vectors of sensor input within an interaction volume of a virtual object may be summed to determine a total potential force exerted on the virtual object. For example, the total force exerted on a virtual object may be calculated through the use of the equation F_f=Sum(F_i).

At an operation 730, a sum of forces may be applied to a virtual object and an outcome may be determined based on the result of the application. For example, a calculated force for individual force vectors and one or more values of one or more parameters of one or more primitives of the virtual object (e.g., constraints such as mass and center of mass) may be used as input into to a physics engine and/or other logic engine that defines the nature of a manipulation of virtual objects in a virtual and/or augmented reality environment. In some implementations, a physics engine may be a process or application including a collection of equations simulating real world physics and/or the application of forces. For example, given one or more of a force, a mass, and/or a center of mass of a virtual object, a physics engine may be configured to determine one or both of a direction of travel, and/or a distance of travel in a virtual space from the application of the force. Determinations from a physics engine may include one or more of linear momentum, angular momentum, and/or other information associated with one or more primitives by determining position and velocity of individual primitives relative to individual coordinates for individual primitive's center of mass.

At an operation 735, outcomes from applications of force may be rendered. For example, output from a physics engine describing one or more of a direction of movement, an ending coordinate, an orientation, and/or other information may be provided to a processor for translation to a graphics rendering of individual virtual objects over time. For example, an application of force to a virtual object may move the virtual object in the virtual and/or augmented reality space from a first coordinate position to a second coordinate position along a line and distance determined by a physics engine. In another example, a force may be applied to a virtual button or touch panel. The movement of the button along a direction of constraint may cause the button to be rendered as depressed and an input corresponding to depressing the button may be activated (e.g., hitting an enter button on a virtual keypad).

Slider Interface Example

FIGS. 8A, 8B, 8C, and 8D show an example of a manipulation of a slider bar interface 800 using an interaction process with application of a force, in accordance with some implementations. As shown in FIGS. 8A-8D a slider bar interface 800 includes one or more of a virtual button 801 rendered on a virtual line 810 depicting a visual display representation of a virtual user interface. For example, the position of the button 801 on the line 810 may correspond to a volume of an audio device controlled by the slider bar interface 800. As the position of the button 801 moves along the line 810, a corresponding trigger event adjusts a volume level of the audio device.

For example, a sphere primitive 815 may represent button 801. The sphere primitive 815 may be constrained to only allow movement along a single dimension (e.g., the x-axis) and thus form a slider interface in this dimension. In this example, a large drag constraint may be placed on two of the three dimensions of the virtual space, where drag.x=1, drag.y=100, drag.z=100, in order to simulate the movement along the single direction. In addition, the interaction volume 817 of sphere primitive 815 may be set, for example, the sphere.charge=+10 and sphere.boundary=1-5 cm. In addition, a trigger for an event may be defined with the following pseudo code, for example:
   if (position.cloud>interface.boundary){create_event(adjust volume)}.

Figure 8A:
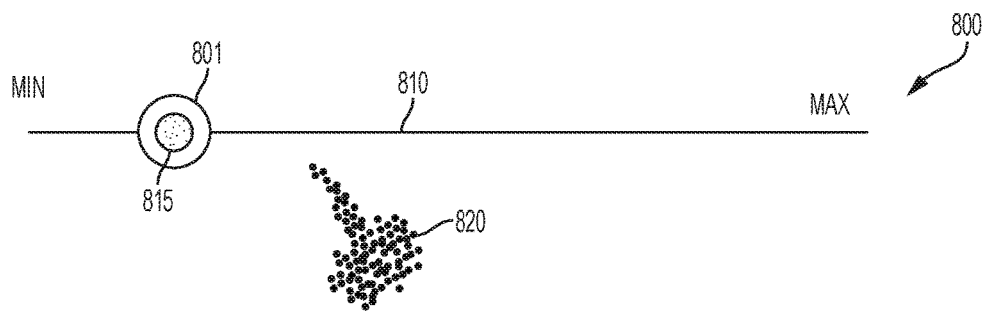
FIG. 8A shows an example of a manipulation of a slider bar interface using an interaction method with application of a force, in accordance with some implementations.
Figure 8B:
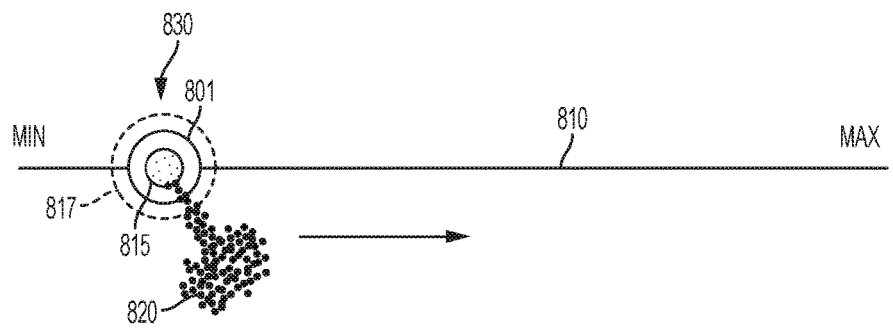
FIG. 8B shows another example of a manipulation of a slider bar interface using an interaction method with application of a force, in accordance with some implementations.
Figure 8C:
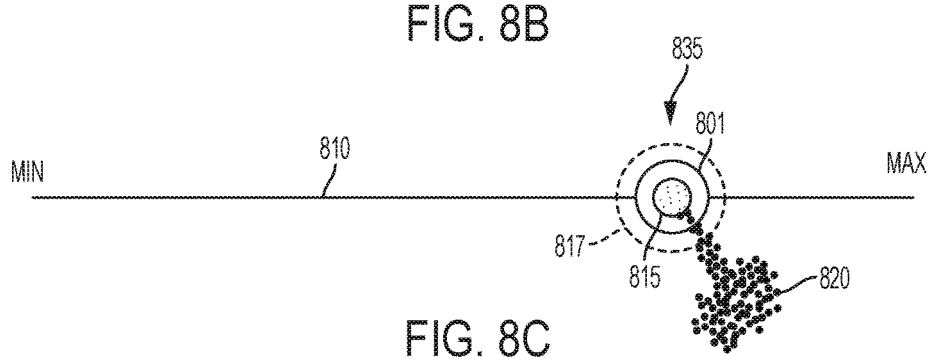
FIG. 8C shows another example of a manipulation of a slider bar interface using an interaction method with application of a force, in accordance with some implementations.

In this example, assume a point cloud 820 from an input sensor (e.g., corresponding to the hand of user) is given a charge=−10. In FIG. 8A, the point cloud 820 may be outside of the 5 cm interaction volume boundary of the button virtual object so the button 801 may not be active. In FIG. 8B, the point cloud 820 may move inside of the 1 cm to 5 cm interaction volume boundary 817. In this case, the force applied to the button 801 may be determined. Because the charges of the virtual button 801 and the point cloud 820 are opposite, a force applied to the button 801 may be attractive. Because the force is attractive, the button 801 may be thought of as "sticky"—or in other words, it may be constrained so that the button 801 moves with the point cloud 820. Therefore, as long as the point cloud 820 remains with the boundary 817, as the point cloud 820 moves, the button 801 may move with the point cloud 820. In this example, the sphere primitive 815 may be constrained only allowing movement along one axis. Therefore, as the point cloud 820 moves along the line 810 of the slider interface 800, the button 801 may move from position 830 (e.g., associated with volume level 15%) in FIG. 8B to position 835 in FIG. 8C (e.g., associated with volume level 75%). This activity may trigger, for example, the event "adjust volume" which uses the position 835 associated with the sphere primitive 815 relative to the line 810 to increase a volume of an associated audio device to 75% of max volume.

Figure 8D:
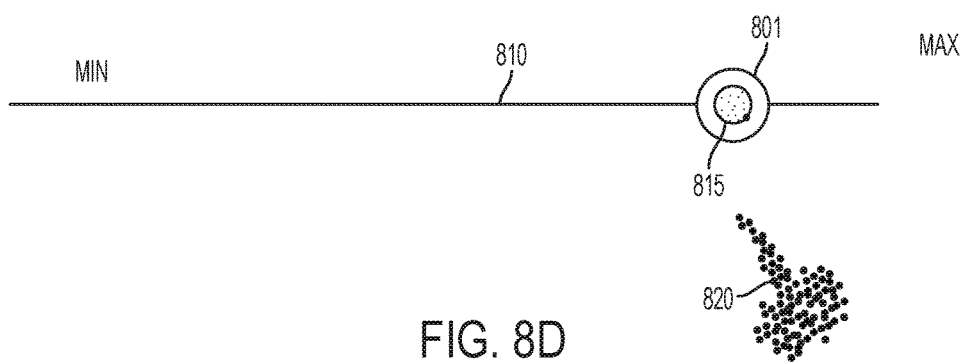
FIG. 8D shows another example of a manipulation of a slider bar interface using an interaction method with application of a force, in accordance with some implementations.

In FIG. 8D, the point cloud 820 may move outside of the 5 cm interaction volume boundary of the button 801, and the event may end, with the volume remaining at 75% because the button 801 may no longer be interacting with the point cloud 820. Of course, one skilled in the art will appreciate that, in another example, the charge associated with the point cloud 820 can be +10. In this case, the force applied by the point cloud 820 on the button 801 may be repellent to the button 801 (the charge of which is also +10, as described above). Therefore, the user input associated with the point cloud 820 can be used to "push" the button 801 along the slider to a desired position. In another example, an additional line primitive may be associated with the line 810 of the virtual volume user interface 800, and the graphics, sphere, and/or line primitives form the virtual object within a virtual 3D space. In this example, a sphere primitive may be used to adjust a volume of an interface by movement along a single axis as describe above, and the line primitive may be used to adjust the position and orientation of the visual representation of the interface within the 3D space.

Button or Touch Panel Interface

Figure 9:
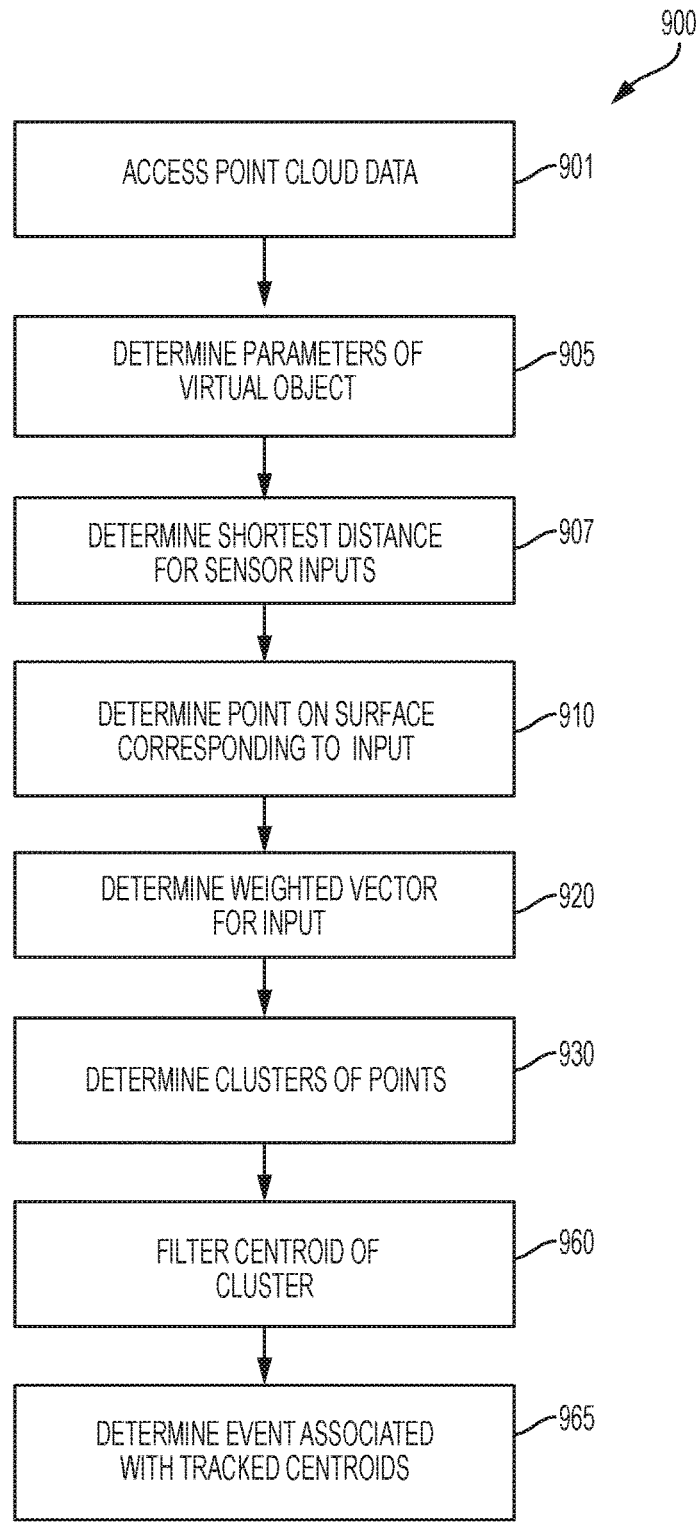
FIG. 9 illustrates a method for interaction with a virtual object, in accordance with some implementations.

FIG. 9 illustrates a method 900 for interaction with a virtual object, in accordance with some implementations.

The method 900 may be implemented by a processing device executing one or more computer program components.

In operation 901, a point cloud (e.g., three-dimensional point cloud information and/or other information) from a sensor may be received or accessed. Individual points of the cloud may correspond to a sensor output. For example, for a frame of output from a depth camera, locations of a set of points within a 3D virtual space corresponding to individual sensor input for the frame may be determined.

In operation 905, one or more parameter values of one or more parameters of a virtual object may be determined. For example, values for one or more of the primitive type parameter, the position of the primitive within the 3D virtual space, and/or the interaction volume parameters may be determined for the virtual object. In this example, a plane primitive may be used to simulate a surface of a touch panel interface (the "panel") having an interaction volume parameter with a charge value of zero and a distance value from 0 cm to 5 cm from the core of the primitive.

In operation 907, a shortest distance from points of the cloud to the panel may be calculated. For example, a line orthogonal to the surface of the primitive and intersecting a point of the cloud may be determined for individual points of the cloud.

In operation 910, individual points of the cloud within the interaction volume boundary may be back-projected onto the surface of the virtual object. For example, individual points of the cloud having a shortest distance that may be less than the distance of the boundary distance of the interaction volume may be determined. A set of points determined to be within the boundary of the interaction volume of the virtual object may be back-projected on the surface of the primitive at the point located where individual orthogonal lines corresponding to the shortest distance to a sensor input intersects the surface of the primitive of the virtual object.

In operation 920, a weighted vector (e.g., (x, y, w) where x, y may be the coordinates of the vector and w may be the weight of the interaction with the primitive) may be determined for individual back-projected points. For example, a weight w for sensor input i may be determined as $w_i = f(c) * g(d_i)$ where c is a confidence value of the point cloud data and d is the distance of the input i from the primitive, and f(x) and g(x) are penalty functions for each parameter c and d. In this example, w implements a noise filter and penalty functions to decrease the significance of the weight of an input when the data may be noisy. In one example, a penalty function observes the distribution of the points (i.e., the variance) of the point of cloud to adjust the w (e.g., when the points of the cloud are clustered tightly the variance may be considered to be lower and confidence may be higher, and when the points may be distributed variance may be greater and confidence may be lower).

In operation 930, "clusters"—a group of points that may be contained within a fixed boundary—may be determined and/or tracked from the back-projected points. When a group of back-projected points are clustered on surface of a primitive modeling a virtual object that resembles and functions as a multi-touch panel, it may indicate that a user may be interacting with the surface of the panel (e.g., entering an input of a button or adjusting the presentation of content, such as pinch to zoom). In this example, a clustering algorithm may be applied to the back-projected points to determine clusters or groups of related points and/or to track them (e.g., to determine an event related thereto such as a scroll event). To do this, first, a cluster list may be created.

For the first frame of sensor data received, the cluster list may not contain any clusters, as the clusters have not yet been calculated from the back-projected points. The back-projected points determined from the first frame may then be clustered.

In one example of the clustering process, a bounding box of a predetermined size may be used (e.g., a 3×3 cm box and/or other sizes) to determine a cluster. The primitive surface may be first scanned for back-projection points. When a back-projection point of the back-projected image is detected, it may be determined whether the point falls into the bounding box of a previously-identified cluster. If no previously-identified cluster exists around the point, a new cluster may be created, a unique ID may be assigned to the cluster, the point may be added to the cluster, and/or the ID may be added to the list. For new clusters, it may be determined if additional points are within the bounding box around the point.

For additional points within a box, the addition points may be added to the cluster ID. The scan continues until a set of points of a point cloud may be assigned to one or more cluster IDs. The clusters may then be filtered to remove clusters that may be associated with noise. For example, a cluster having too few back projection points may be removed and its ID may be deleted from the cluster list.

Individual centroids (e.g., the arithmetic mean ("average") position of the points in a cluster) may be determined for individual cluster IDs and individual position of the individual centroids of the individual clusters may be stored with the corresponding cluster ID. A centroid may be considered a location of the cluster on the panel and/or other virtual object.

A cluster list with the IDs and locations of individual clusters may be matched against a cluster list derived from a previous input frame to determine whether one or more individual clusters correspond to a previously determined cluster. For example, if a distance between locations of two clusters is less than a size of the cluster bounding box, the clusters may be considered to be matching clusters. In this case, the ID of a current cluster may be removed from the list, and the position of the centroid of the current cluster (e.g., the location on the panel) of the cluster position may be added to the ID for the matching and previously determined cluster. For a given cluster not matching a previous cluster, a unique ID may be preserved in the list. In this manner, the movement of a cluster may be traced from one sensor input frame to a next.

In operation 960, individual locations saved for individual clusters of individual IDs in the list may be filtered. For example, a motion filter, for example, such as Kalman filter or the like may be applied to individual tracked locations associated with individual IDs to reduce effects, such as jitter. The filtered location may be then saved to the cluster list.

In operation 965, it may be determined whether an event associated with one or more centroids stored in a cluster list is triggered. For example, in an implementation of multi-touch panel virtual object, position of one or more tracked centroids may indicate a trigger event, such as one or more of a swipe, a tap, a multi-finger gestures (e.g., a pinch to zoom event), and/or other events. By way of non-limiting illustration, movement of a cluster along a line for a predetermined distance in a common direction may indicate that a scroll up event may have been triggered causing the content presented in association with the virtual panel to scroll up.

The process for operations 901-965 may be continually repeated for each frame input from one or more sensor.

FIGS. 10A, 10B, 10C, 10D, 10E, 10F. illustrate an example of the interaction process of FIG. 9 to a virtual 3D environment for interaction with a virtual object, such as, for example, a button or user interface of a touch panel.

Figure 10A:
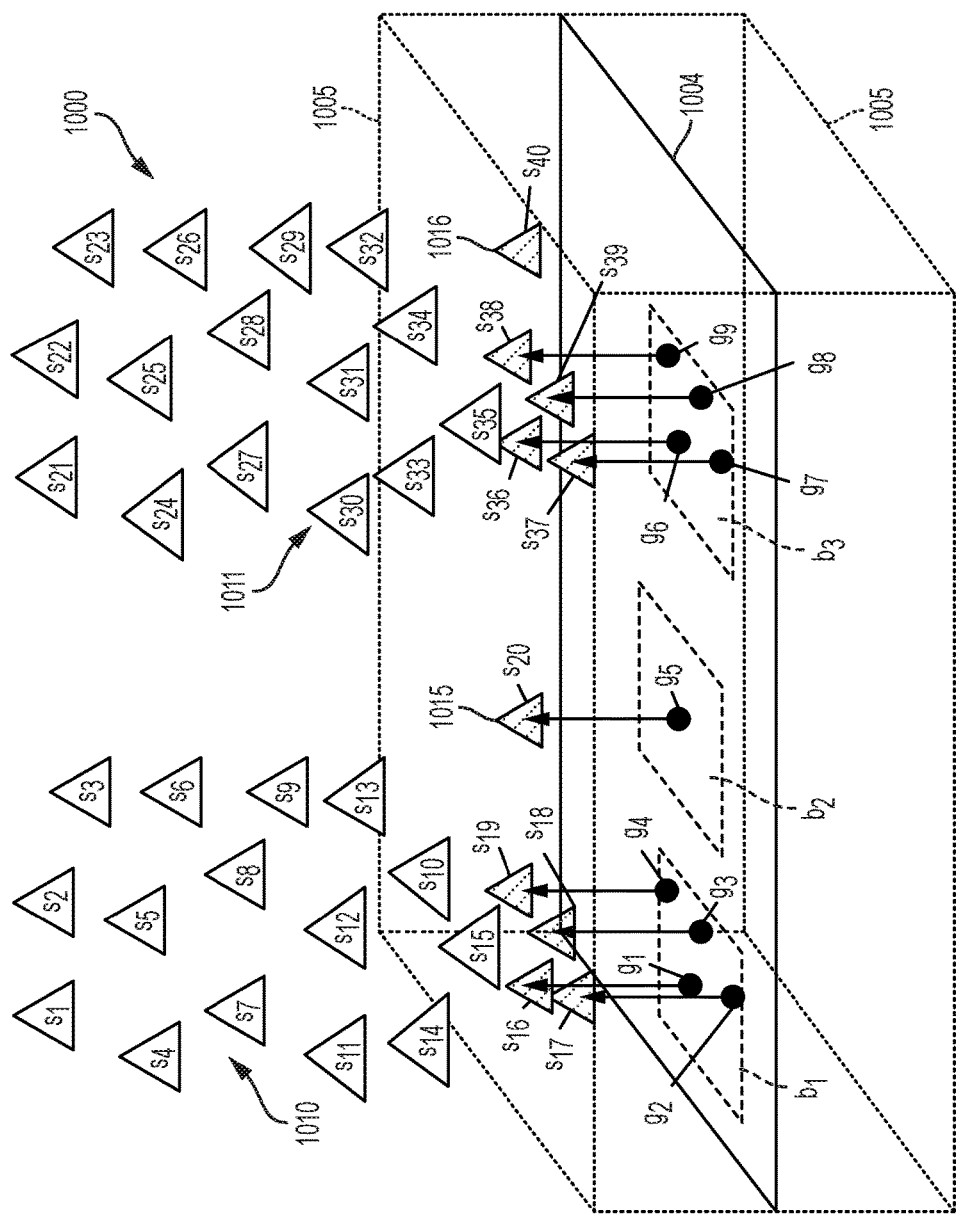
FIG. 10A illustrates an example of the interaction method of FIG. 9.

FIG. 10A shows a touch panel 1000 comprising a plane primitive 1004. The plane primitive 1004 may have an interaction volume 1005 boundary. By way of non-limiting illustration, the boundary may be at a range of 5 cm, and/or other ranges. The interaction volume may have a charge of 0. In some implementations, lines forming an outer perimeter of the plane primitive 1004 may be implemented with the line primitives having an interaction volume boundary (e.g., from 1 cm to 2 cm) and charge (e.g., +10) allowing the position and orientation of the plane primitive 1004 to be moved, positioned, and/or oriented within the 3D space using a force application (e.g., as described above in connection with FIGS. 1-7 (and not depicted in the example shown in FIGS. 10A-10F). Content (e.g., a web page) may be rendered in the plane associated with the core of the plane primitive 1004 at a position corresponding to the position of the plane within the 3D virtual space to provide a touch panel webpage interface implementation. For example, the plane associated with the core of the plane primitive 1004 may be associated with a web address.

At a time t0 there may be no sensor input and a gesture input list may have no elements. At time t1, an input frame from one or more depth sensors may be received. The input received may correspond to the input illustrated in FIG. 10A. As shown in FIG. 10A, two point clouds, point cloud 1010 (e.g., {s1-s19}) and point cloud 1011 (e.g., {s21-s39}) are shown. The two point clouds 1010 and 1011 may be associated with the sensor input corresponding to two fingers of a user (e.g., a thumb and index finger of the same hand). There may be some random points 1015 (e.g., s20), 1016 (e.g., s40) associated with a noise input from the sensor (e.g., infra-red reflectance detected by the sensor from the environment around the user's hand). One or more points (e.g., four points) from point cloud 1010 (e.g., {s16-s19}), one or more points (e.g., four points from point cloud 1011 (e.g., {s36-s39}) and the points 1015 (e.g., s20), 1016 (e.g., s40) associated with noise may be within the interaction volume 1005 of the plane primitive of the virtual touch panel 1000.

The points within the boundary may be back-projected onto the plane associated with the primitive 1004. For example, individual shortest distances to the primitive 1004 may be determined for individual sensor inputs within the interaction volume 1005 boundary of the primitive 1004. In this example, individual lines drawn orthogonal to the plane of the primitive 1004 and intersecting individual ones of the sensor inputs (S16i, S17, S18, S19, S20, S36, S37, S38, S39, and S40) may be determined. A corresponding point may be back-projected onto the plane associated with the primitive 1004 at the point where individual orthogonal lines may interest the primitive 1004 (e.g., g1, g2, g3, g4, g5, g6, g7, g8, g9, g10). Individual weighted vectors may be determined for individual back projected points. The back projected points may be filtered to remove poorly weighted points. For example, the weight w for a back projected point associated with input point 1016 may be below a threshold, may be determined to be noise, and/or may be removed (consequently no back-projected point for input point 1016 is shown in FIG. 10A).

The primitive 1004 may be scanned for other remaining back projected points and the points may be grouped into clusters. Scanning from left to right, bottom to top, and/or in other scan directions, a point $g_1$ may be located. In this example, a cluster box for the interface may be used. By way of non-limiting illustration, the cluster box may be set to a box having dimensions 3 cm×3 cm, and/or other dimensions. A first box $b_1$ may be assigned to the point $g_1$, and cluster ID B1 may be generated and added to a cluster list. The primitive 1004 may be scanned to determine other back-projected points that may be within the box surrounding point $g_1$. In this example, additional back-projected points $g_2$, $g_3$ and/or $g_4$ may be determined to be within the box, and points $g_1$, $g_2$, $g_3$ and/or $g_4$ may be stored in association with unique ID B1 in the cluster list.

The scanning continues, determining clusters ID B2 for box $b_2$ with point $g_5$, and ID B3 for box $b_3$ with points $g_6$, $g_7$, $g_8$, and/or $g_9$. The boxes $b_1$-$b_3$ may be filtered. For example, box $b_2$ may be determined to include a single point and may be eliminated as noise and the ID B2 may be deleted from the list.

Figure 10B:
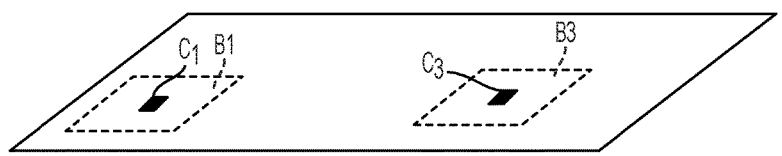
FIG. 10B illustrates another example of the interaction method of FIG. 9.

For the remaining boxes B1 and B3, centroids c1 and c2, receptively, may be determined as shown in FIG. 10B. The positions of the centroids may be stored in a cluster list associated with the IDs B1 and B3, respectively. After t1, the cluster list may be defined as shown in table 1:

TABLE 1

| B1 | $c_1 (x_1, y_1)$ |
|---|---|
| B3 | $c_3 (x_3, y_3)$ |

Figure 10C:
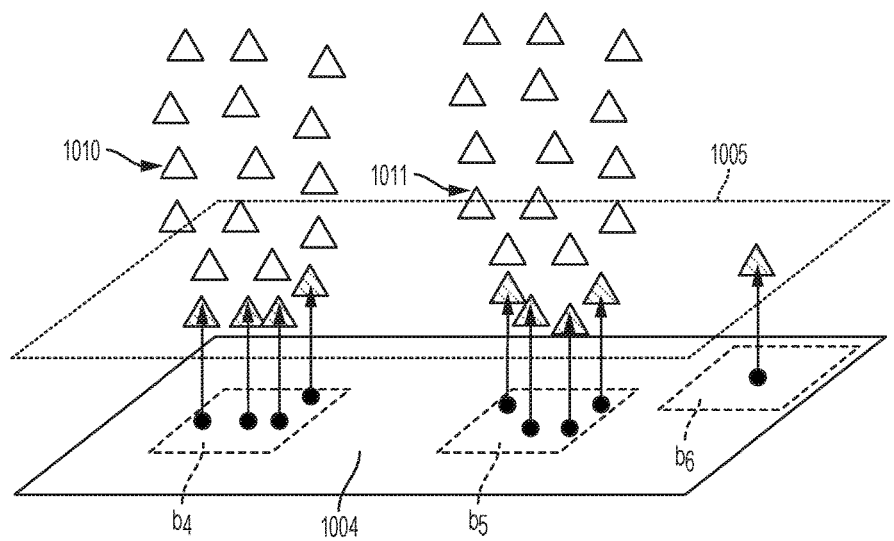
FIG. 10C illustrates another example of the interaction method of FIG. 9.
Figure 10D:
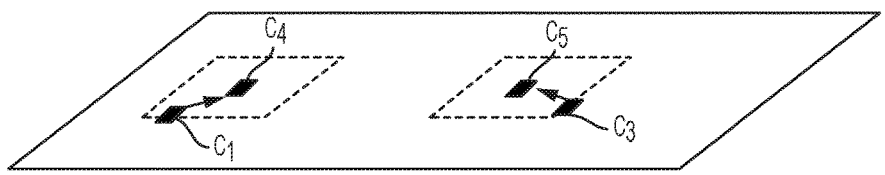
FIG. 10D illustrates another example of the interaction method of FIG. 9.

At a time $t_2$, an input frame from the one or more depth sensors may be received, corresponding to input illustrated in FIG. 10C. The process presented herein may be repeated, resulting in new IDs B4 and B5 for the new input points and boxes $b_4$ and $b_5$ with centroids $c_4$ and $c_5$, as shown in FIG. 10D. At this point in time, the cluster list may be defined as shown in table 2:

TABLE 2

| B1 | $c_1 (x_1, y_1)$ |
|---|---|
| B3 | $c_3 (x_3, y_3)$ |
| B4 | $c_4 (x_4, y_4)$ |
| B5 | $c_5 (x_5, y_5)$ |

However, a distance between $c_1 (x_1, y_1)$ and $c_4 (x_4, y_4)$ and a distance between $c_3 (x_3, y_3)$ and $c_5 (x_5, y_5)$ may be less than a size of a bounding box (e.g., 3 cm×3 cm). Therefore, it may be determined that these centroids may be part of the same cluster. Consequently, their unique IDs may be removed and their positions may be added to unique IDs B1 and B3 respectively, as shown in Table 3:

TABLE 3

| B1 | $c_1 (x_1, y_1), c_4 (x_4, y_4)$ |
|---|---|
| B3 | $c_3 (x_3, y_3), c_5 (x_5, y_5)$ |

Figure 10E:
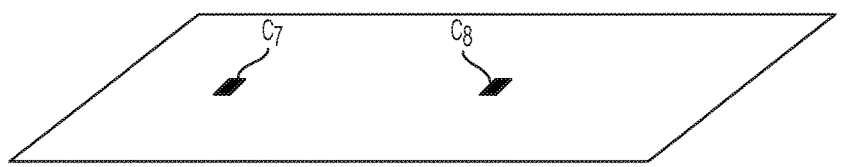
FIG. 10E illustrates another example of the interaction method of FIG. 9.

Similarly, in FIG. 10E, at a time t3, centroids c7 and c8 for unique IDs B7 and B9 may be determined. However, a distance between c4 ($x_4$, $y_4$) and c7 ($x_7$, $y_7$) and a distance between c5 ($x_5$, $y_5$) and c8 ($x_8$, $y_8$) may be less than a size of a bound box. Therefore, it may be determined that these centroids may be part of a same cluster and their unique IDs may be removed and their positions may be added to unique IDs B1 and B3 respectively, as shown in Table 4:

TABLE 4

| | |
|---|---|
| B1 | $c_1 (x_1, y_1), c_4 (x_4, y_4), c_7 (x_7, y_7)$ |
| B3 | $c_3 (x_3, y_3), c_6 (x_6, y_6), c_8 (x_8, y_8)$ |

Figure 10F:
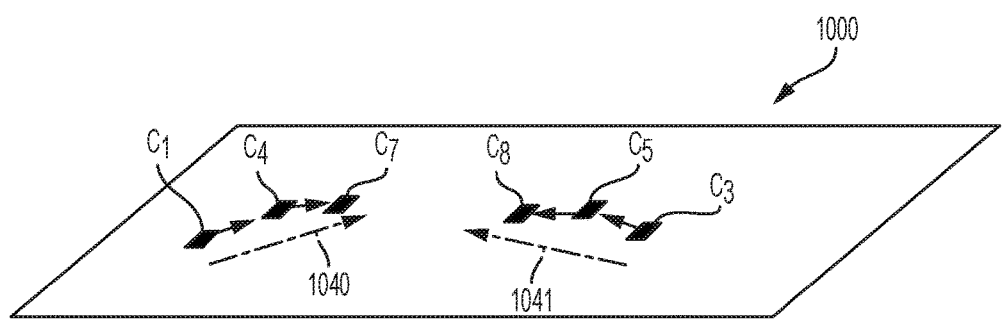
FIG. 10F illustrates another example of the interaction method of FIG. 9.

As points may be added to the table and the table may be processed and filtered, the data from the table may be continually input to a gesture algorithm or engine to determine if an event may be triggered (e.g., through the execution of a recognized "gesture"). As shown in FIG. 10F, at t3, it may be determined that centroid locations for individual unique IDs indicate that locations forming two lines 1040, 1041 moving towards each other over a sufficient distance. This may trigger a pinch to zoom event causing the content associated with the plane primitive 1004 to zoom out (or change in other ways). As a result, the content may be resized in rendering on the virtual panel. The above described manipulation of computer-generated elements in a virtual 3D space—based on, for example, input translated from the real world 3D point data observed by at least one sensor and various interfaces—may be implemented as part of an overall virtual 3D space interface and combined therein with other tools for manipulating the 3D space. For example, a gesture based interface may be used in conjunction with a force-based system for manipulation of virtual objects (as described above). For example, in a gestured based interface, a point cloud may be processed to determine one or more gestures corresponding to the movement of the point cloud.

In this example, a recognized gesture may be used to manipulate a virtual object when a point cloud may be outside an interaction volume of a virtual object. For example, when a point cloud acts in a predetermined manner, for example, hovering in proximity to a virtual object outside of the virtual object's interaction volume, the point cloud may be observed to determine a gesture being performed. For example, movement of the point cloud may be processed to determine a "grab" gesture (e.g., corresponding to opening and closing of a hand) and/or other gestures. The grab gesture may be used to select or grasp a virtual object in the virtual 3D space. Once grasped, the virtual object may be interacted with and/or manipulated (e.g., moved, repositioned, activated, and/or the like). Further description of implementations associated with a "grab" gesture may be found in more detail herein (see, e.g., FIG. 18). In the same example, when a point cloud enters an interaction volume of a virtual object, the virtual object may be manipulated based on calculated forces and the primitives of the virtual object. In this manner, a virtual object may be manipulated based on a gesture based input or a force based determination. One example of a gesture based interface is described in U.S. patent application Ser. No. 14/147,199, titled "Extramissive Spatial Imaging Digital Eye Glass Apparatuses, Methods and Systems for Virtual or Augmediated Vision, Manipulation, Creation, or Interaction with Objects, Materials, or Other Entities," filed Jan. 3, 2014, which is incorporated herein by reference in its entirety.

System Components

Figure 11:
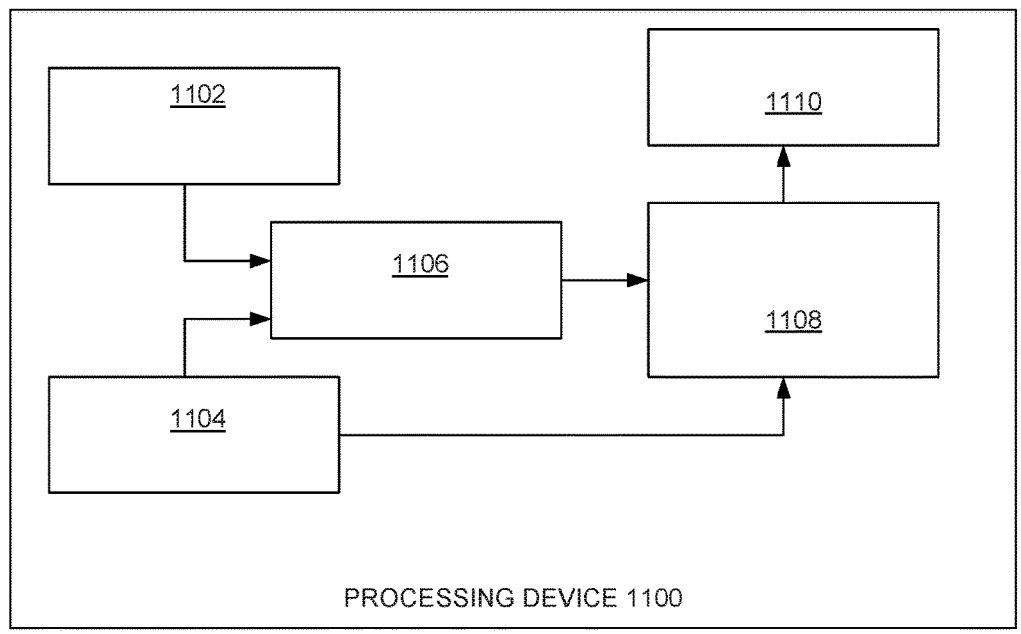
FIG. 11 illustrates examples of components of a processing system used to facilitate interactions with an interactive space, in accordance with one or more implementations.

FIG. 11 shows a block diagram illustrating one or more components of a processing device 1100. The processing device 1100 may include one or more of a depth sensor input system 1102, a virtual object properties system 1104, a vector determination system 1106, a physics engine/event processor 1108, a display rendering system 1110, and/or other components. One or more of the components of the processing device 1100 may correspond to one or more of the components of system 100, shown in FIG. 24, and vis versa.

As shown in FIG. 11, inputs from a depth sensor input system 1102 and values of one or more parameters for a virtual object provided to the virtual object properties system 1104 may be provided as inputs to the vector determination system 1106. In some implementations, vector determination system 1106 may implement one or more vector determinations derived by the methods 600 (FIG. 6), 700 (FIG. 7), and/or 900 (FIG. 9). The determined vectors along with the values of the one or more parameters may be provided as inputs to physics engine/event processor 1108 (e.g., which may comprise one or more of a physics engine, an event engine, a gesture engine, and/or other defined logic engine to determine events and/or to render content associated with one or more virtual objects within a 3D virtual environment). The output of a logic engine may be provided to another program or application to cause rendering of content associated with an event for viewing by a user. For example, the output may be provided to display rendering system 1110 for rendering in a display or other visual output device. In this manner, input corresponding to real world objects may be used to influence and/or manipulate virtual objects based on the concepts using one or more charges and one or more interaction volumes.

Figure 12:
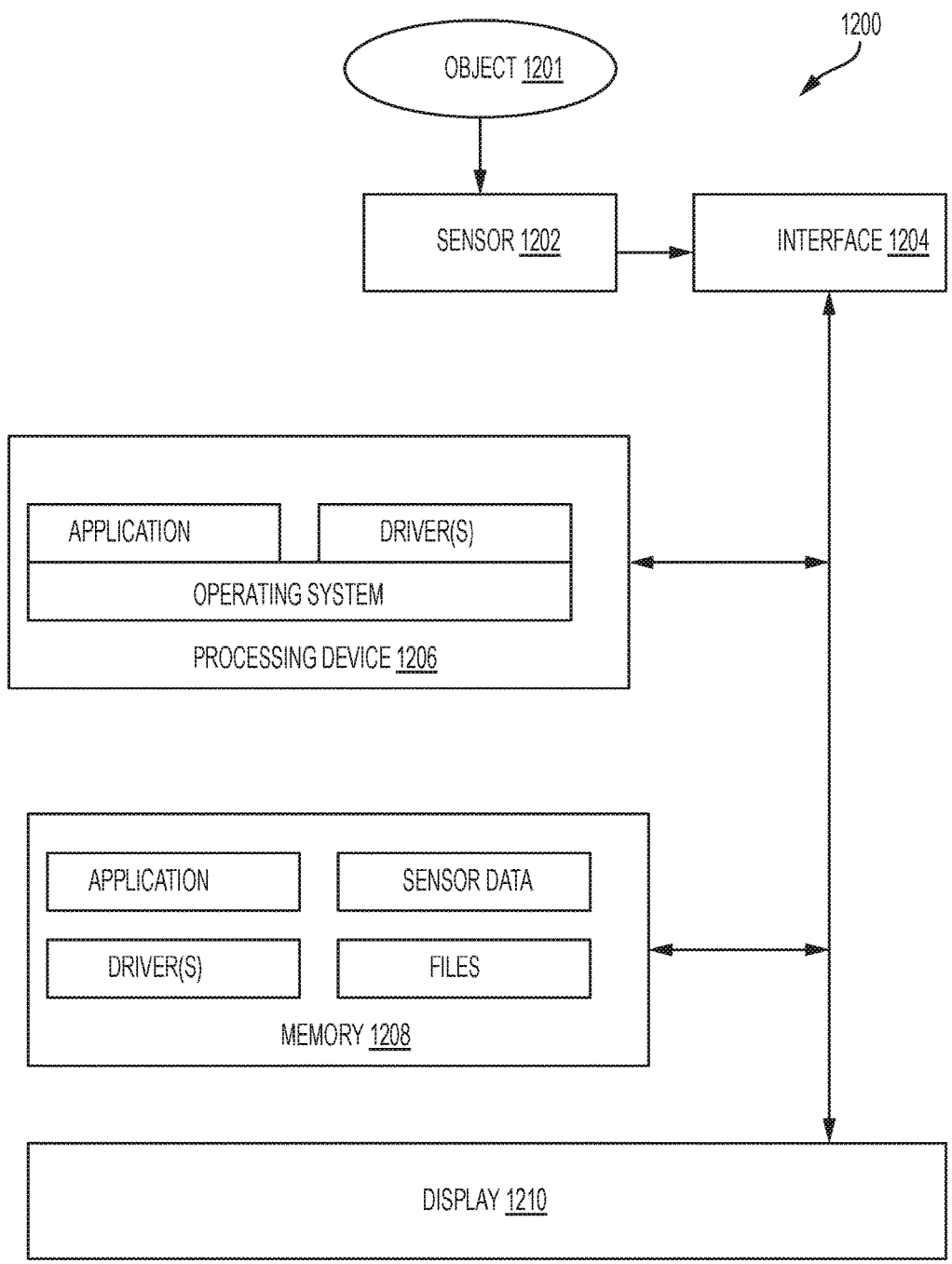
FIG. 12 illustrates examples of components of a system for manipulation a virtual object, in accordance with one or more implementations.

FIG. 12 shows a block diagram illustrating one or more components of a 3D virtual environment system 1200 for manipulation of a virtual object. As shown in FIG. 12, a real world object 1201 may be detected by a sensor 1202. For example, the sensor may be one or more depth sensors, including one or more of a depth camera, time of flight camera, and/or other sensors. The sensor input may be provided via an interface 1204 (e.g., a wireless interface or wired interface) and/or a communications path (e.g., a communication bus) to a processing device 1206 implementing a virtual 3D environment application.

The processing device 1206 may operate one or more applications including one or more of an operating system, a virtual 3D environment application, a physic engine and/or a gesture engine (e.g., if not included in the 3D environment application), various drivers (e.g., for the interfaces and communications of the system) in addition to other programs, for example, a browser application.

A storage device may be provided. The storage device may comprise a memory 1208 configured to store one or more of the virtual environment application, sensor data, data files, drivers, and/or other applications and/or information used by the system 1200. The processing device 1206 may process the sensor data to implement the 3D environment, which may be output to a display 1210 device for presentation to a user of the system 1200.

Figure 13A:
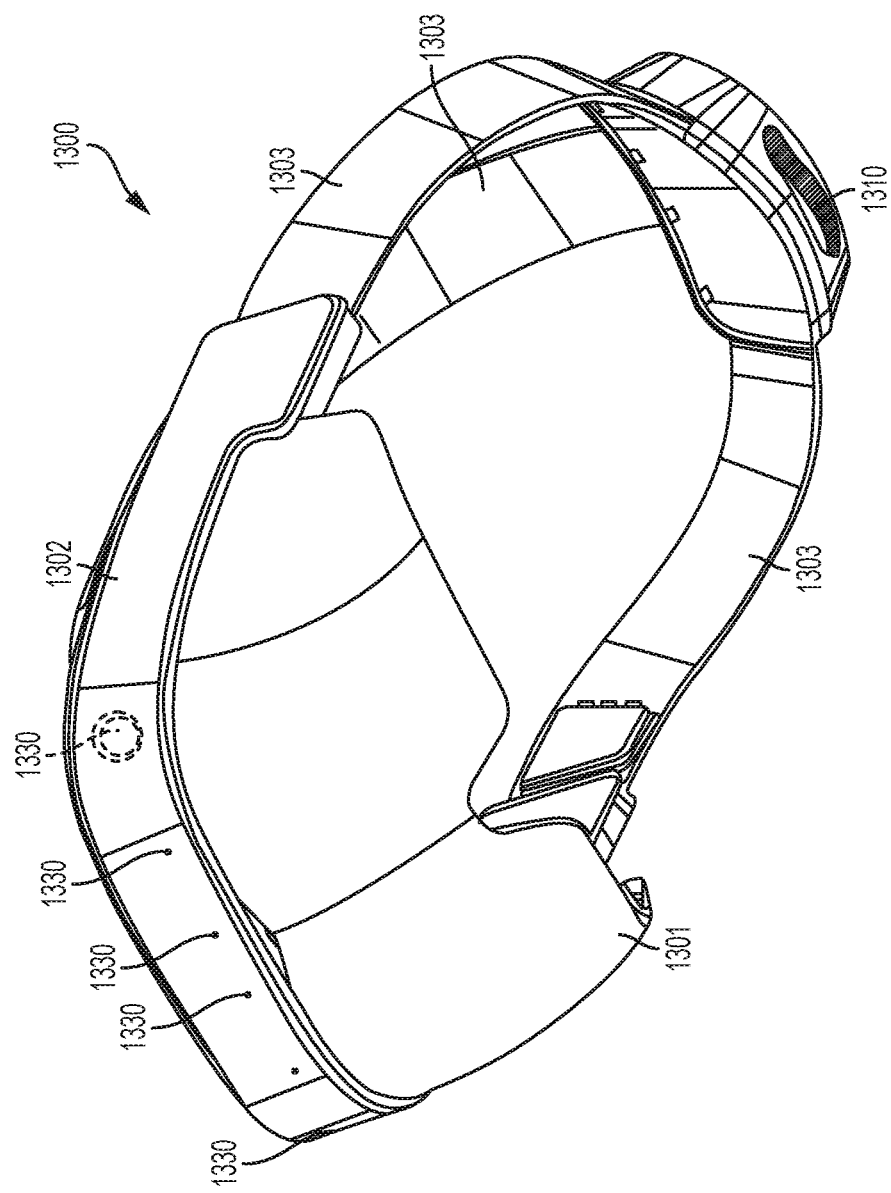
FIG. 13A illustrates an example of head mounted display components of a system for manipulation of a virtual object, in accordance with one or more implementations.
Figure 13B:
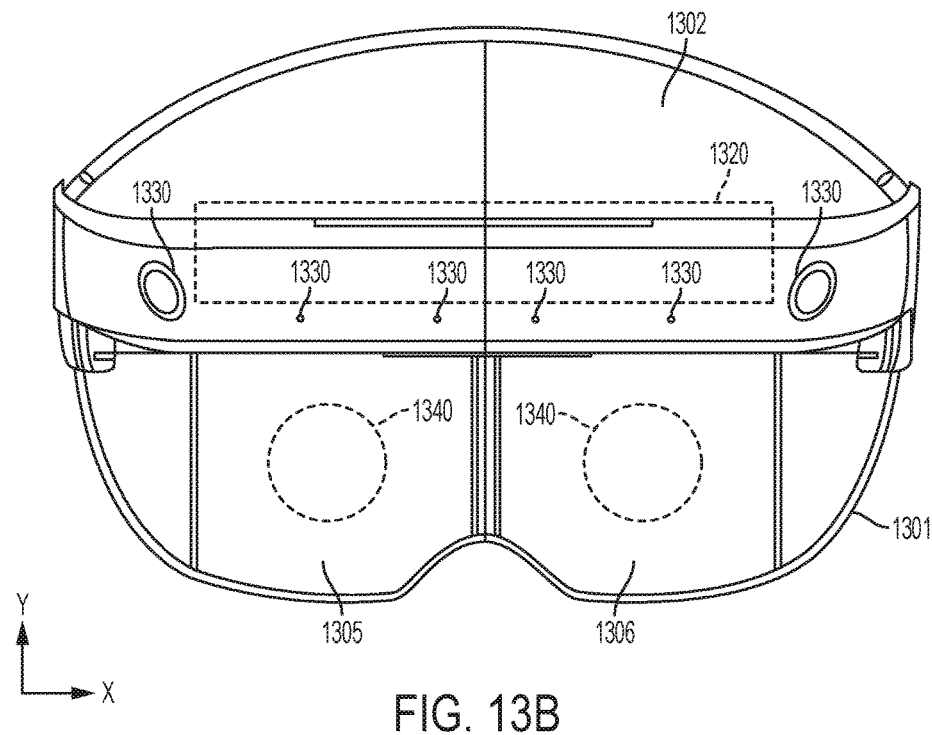
FIG. 13B illustrates another example of head mounted display components of a system for manipulation of a virtual object, in accordance with one or more implementations.
Figure 13C:
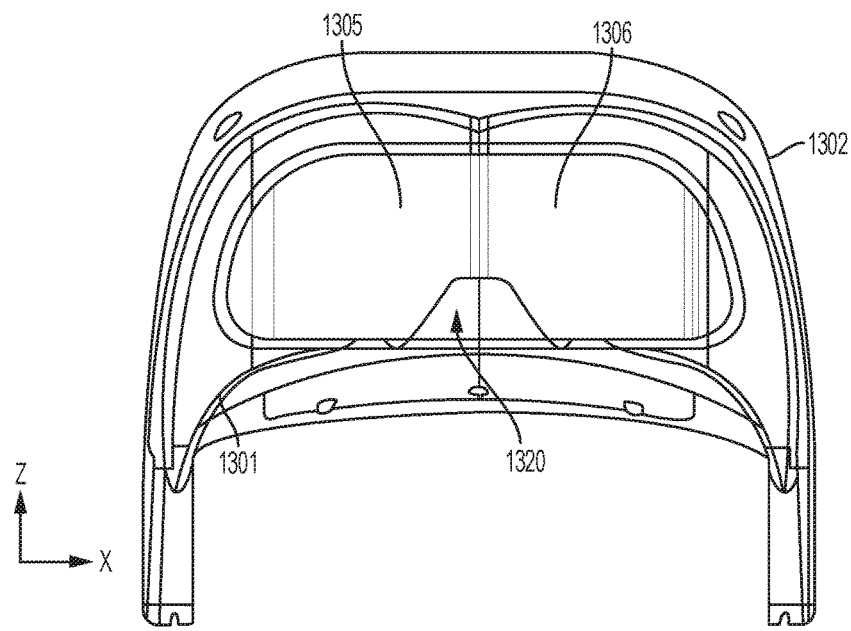
FIG. 13C illustrates another example of head mounted display components of a system for manipulation of a virtual object, in accordance with one or more implementations.

FIGS. 13A, 13B, 13C show examples of an implementation of one or more components of the system 1200 of FIG. 12 in a head mounted display (HMD) 1300.

The HMD 1300 may allow manipulation of virtual objects by a user wearing the HMD 1300.

FIGS. 13A, 13B, 13C shows a perspective view, front view, and bottom view, respectively, of an implementation of HMD 1300. As shown the HMD 1300 may include one or more of a visor 1301 attached to a housing 1302, straps 1303, a mechanical adjuster 1310 used to adjust the position and fit of the HMD to provide comfort and optimal viewing by a user of the HMD 1300, and/or other components. The visor 1301 may include one or more optical elements, such as an image combiner. The image combiner may include a shape and one or more reflective coatings that may reflect an image from an image source 1320 to the eyes of the user. In one example, a coating may be partially reflective allowing light to pass through the visor 1301 to the user and thus create a synthetic image in the field of view of the user overlaid on the user's view of the real-world environment to provide an augmented reality user interface. The visor 1301 may be made from a variety of materials, including, but not limited to one or more of acrylic, polycarbonate, PMMA, plastic, glass, and/or other materials. The visor 1301 may be formed by techniques including one or more of thermoformed, single diamond turned, injection molded, and/or other techniques. The forming of visor 1301 may position the optical elements relative to an image source and eyes of the user, and facilitate attachment to the housing 1302 of the HMD.

In one implementation, the visor 1301 may include two optical elements and/or other quantities of optical elements. The optical element(s) may include image regions 1305 and 1306 or clear apertures. In this example, the visor 1301 may include one or more of a nasal or bridge region, two temporal regions, and/or other features. In FIG. 13B, individual image regions may be aligned with the positions 1340 of individual eyes of a user to reflect an image provided from the image source 1320 to individual eyes of a user of the HMD. A bridge or nasal region may be provided between the two image regions to connect two image regions 1305 and 1306. The image regions 1305 and 1306 may mirror each other through the y-z plane that bisects the nasal rejoin. In one implementation, the temporal region may extend to an outer edge of the image region wrapping around the eyes to the temple housing of the HMD to provide for peripheral vision and offer support of the optical elements such that the image regions 1305 and 1306 may not require support from a nose of a user wearing the HMD.

In an implementation, the housing may include a molded section to roughly conform to the forehead of a user and/or may be custom-fitted for a specific user or group of users. The housing may include various electrical components, such as one or more of one or more sensors 1330, a display, a processor, a power source, interfaces, a memory, various inputs (e.g., buttons and controls) and outputs (e.g., speakers) and controls, related connections and data communication paths, and/or other components.

Figure 13D:
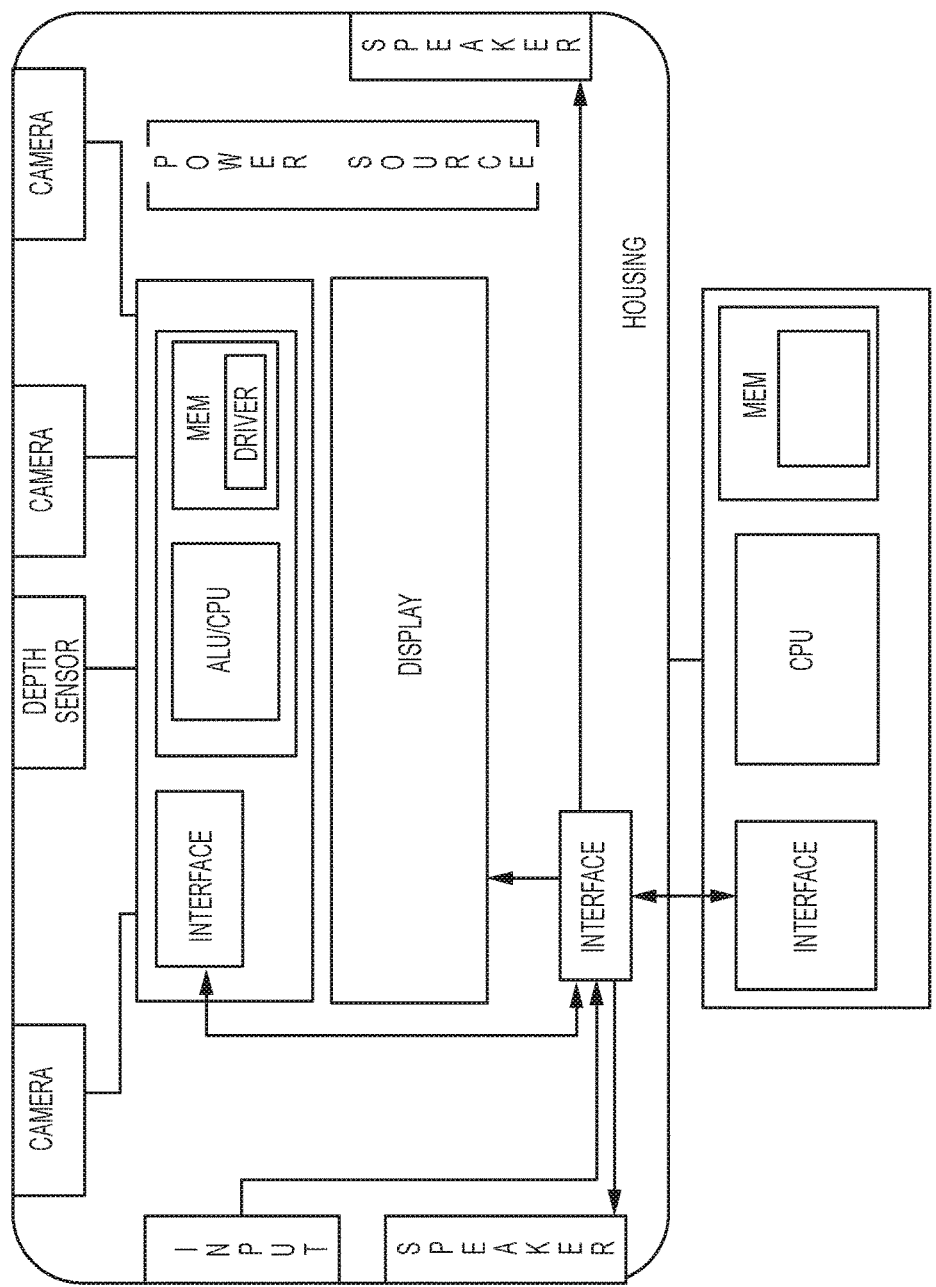
FIG. 13D illustrates another example of head mounted display components of a system for manipulation of a virtual object, in accordance with one or more implementations.
Figure 13E:
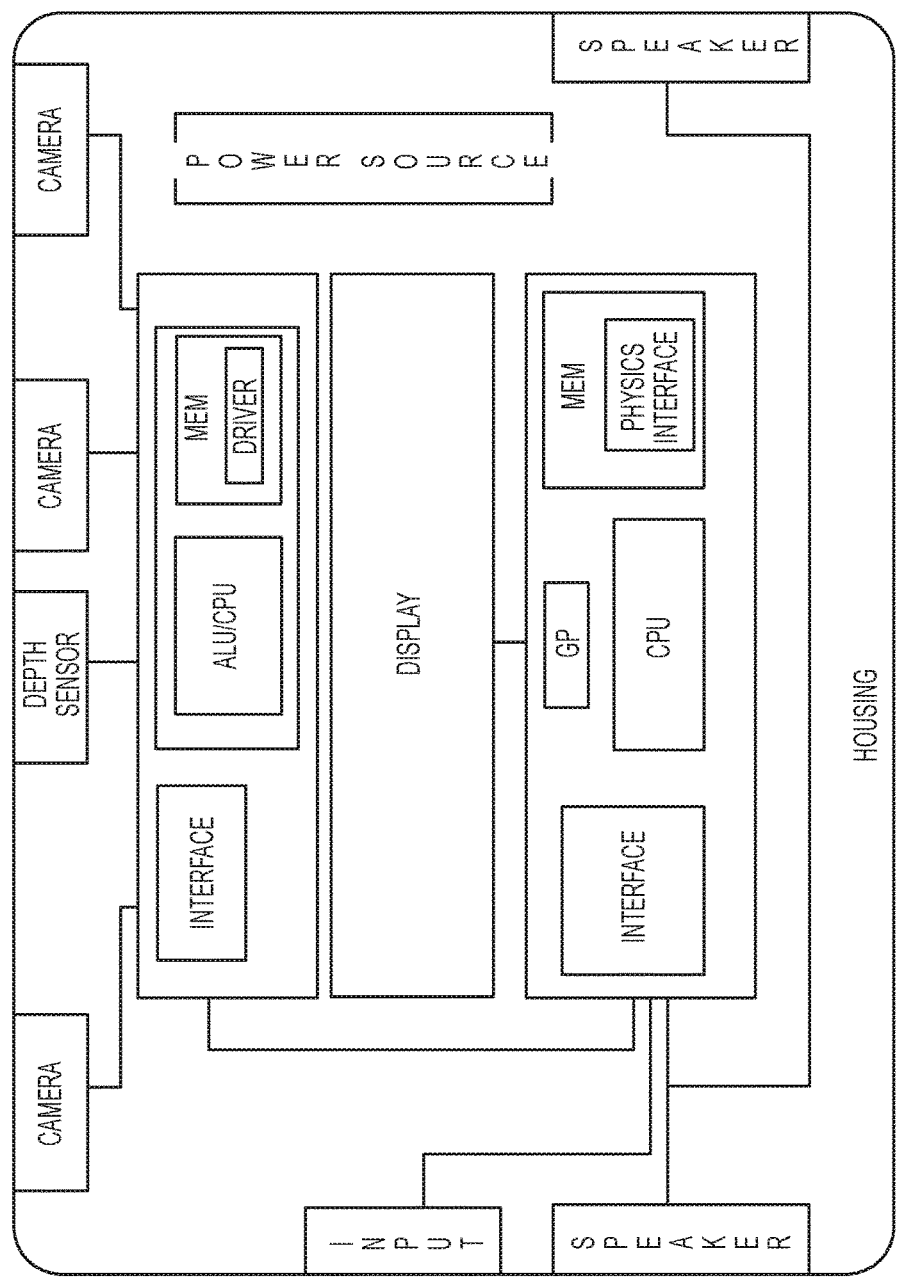
FIG. 13E illustrates another example of head mounted display components of a system for manipulation of a virtual object, in accordance with one or more implementations.

FIG. 13D shows an example implementation in which a processing device may be implemented outside of housing 1302 and may be connected to components of the HMD using an interface (e.g., a wireless interface, such as Bluetooth or a wired connection, such as a USB wired connector), FIG. 13E shows an implementation in which the processing device may be implemented inside of the housing 1302.

Referring FIGS. 13A-C, housing 1302 may be configured to position one or more sensors 1330 that detect the environment around the user. In one example, one or more depth sensors may be positioned to detect objects in the user's field of vision.

The housing may also be configured positions the visor 1301 relative to the image source 1320 and the user's eyes. In one example, the image source 1320 may be implemented using one or more displays. For example, the image source 1320 may be a single display. If an optical element 1305 and 1306 of the visor 1301 provided for each eye of a user, the display may be partitioned into at least two halves. For example, individual ones of the halves may display individual image intended for a separate eye. In another example, two displays may be provided. In this example, individual ones of the displays may be paired with a corresponding optical element or image area. Individual pairs may provide an individual image to an eye of the user. Examples of displays include one or more of a liquid crystal display (LCD), a Light Emitting Diode (LED) display, a flexible organic LED (OLED) display, a Liquid Crystal on Silicon (LCoS or LCOS), and/or other displays. In one example, a single 4.5- to 5.2-inch diagonal Liquid Crystal Display (LCD) may be used. In another example, dual 2.8-3.4-inch diagonal LCDs, one for each eye, may be used.

In an implementation, a display may be part of a mobile phone or other mobile device that may be separate from, but placed within and/or affixed to, the HMD and/or HMD housing. The mobile device may be subsequently detachable or removable therefrom. For example, a user-accessible opening may be provided to accept and/or position a mobile phone or other mobile device with a display to provide an image source for the HMD. In this example, a hatch and/or a slot may be configured to accept the mobile phone or other mobile device. The hatch and/or slot may provide access to one or more supports. The one or more supports may include one or more of a guide, a rail, one or more walls, or a shelf to position the display of the mobile device or mobile phone outside the field of view and at the geometries according to the descriptions and examples provided herein. In yet another example, an opening may provide one or more fasteners, such as a clip or deformable member that may accept and/or detachably lock and position the display of the mobile device or mobile phone outside the field of view and at the geometries allowing reflection to the user's eyes.

As shown in FIGS. 13D and 13E, a processing device may implement one or more applications or programs. In one example, the processing device includes an associated memory storing one or more applications implemented by the processing device. Executing of one or more applications by the processing device may generate digital image data. The digital image data may depict one or more of graphics, a scene, a graphical user interface, a computer game, a movie, content from the Internet, such as web content accessed from the World Wide Web, and/or other content to be presented to a viewer of the wearable HMD. Examples of applications include one or more of media players, mobile applications, browsers, video games, and/or graphic user interfaces. Virtual objects corresponding to output of one or more applications may be made interactive through use of a 3D environment application. The application may implement one or more methods 600, 700, and/or 900 described herein.

One example of a head mounted display system and components thereof is described in U.S. patent application Ser. No. 14/945,372 titled "Wide Field of View Head Mounted Display Apparatuses, Methods and Systems" filed Nov. 18, 2015, which is herein incorporated by reference in its entirety.

As described herein, one or more for a wearable AR system may be implemented using one or more of digital electronic circuitry, or in computer hardware, firmware, software, and/or combinations of them in conjunction with various combiner imager optics. The techniques may be e implemented as a computer program product, i.e., a computer program tangibly embodied in a non-transitory information carrier, for example, in one or more of a machine-readable storage device storing machine-readable instructions, in machine readable storage medium, in a computer-readable storage device, in computer-readable storage medium for execution by, or to control the operation of, data processing apparatus or processing device, for example, a programmable processor, a computer, or multiple computers. A computer program may be written in a form of programming language, including compiled or interpreted languages, and it can be deployed in a form, including as a stand-alone program or as a module, component, subroutine, and/or other unit suitable for use in the specific computing environment. A computer program may be deployed to be executed by one component or multiple components of a system.

The exemplary processes and others may be performed by one or more programmable processing devices or processors executing one or more computer programs to perform the functions of the techniques described above by operating on input digital data and generating a corresponding output. Method steps and/or techniques may be implemented as, special purpose logic circuitry, e.g., an FPGA (field programmable gate array) or an ASIC (application-specific integrated circuit).

Processing devices or processors suitable for the execution of a computer program include, by way of example, both general and special purpose microprocessors, and any one or more processors of any kind of digital computer. Generally, a processor may receive instructions and data from a read-only memory or a random access memory or both. The elements of a computer may be a processor for executing instructions and one or more memory devices for storing instructions and data. The processing devices described herein may include one or more processors and/or cores. Generally, a processing device may also include, or be operatively coupled to receive data from or transfer data to, or both, one or more mass storage devices for storing data, such as one or more of magnetic, magneto-optical disks, and/or optical disks. Non-transitory information carriers suitable for embodying computer program instructions and data include all forms of non-volatile memory, including by way of example semiconductor memory devices, such as, EPROM, EEPROM, and flash memory or solid state memory devices; magnetic disks, such as internal hard disks or removable disks; magneto-optical disks; and CD-ROM and DVD-ROM disks. The processor and the memory may be supplemented by, or incorporated in special purpose logic circuitry.

An HMD may include various other components including various optical devices and frames or other structure for positioning or mounting the display system on a user allowing a user to wear the vision system while providing a comfortable viewing experience for a user. The HMD may include one or more additional components, such as, for example, one or more of one or more power devices or connections to power devices to power various system components, one or more controllers/drivers for operating system components, one or more output devices (such as a speaker), one or more sensors for providing the system with information used to provide an augmented reality to the user of the system, one or more interfaces from communication with external output devices, one or more interfaces for communication with an external memory devices or processors, one or more communications interfaces configured to send and receive data over various communications paths, and/or other components. One or more internal communication links or busses may be provided in order to connect the various components and facilitate reception, transmission, manipulation and/or storage of information and programs.

In order to address various issues and advance the art, the entirety of this application (including the Cover Page, Title, Headings, Detailed Description, Claims, Abstract, Figures, Appendices and/or otherwise) shows by way of illustration various implementations in which the claimed inventions may be practiced. The advantages and features of the application are of are representative sample of embodiments only, and are not exhaustive and/or exclusive. They are presented only to assist in understanding and teach the claimed principles. It should be understood that they are not representative of all claimed inventions. The disclosure includes other inventions not presently claimed. Applicant reserves all rights in those presently unclaimed inventions including the right to claim such inventions, file additional applications, continuations, continuations in part, divisions, and/or the like thereof. As such, it should be understood that advantages, embodiments, examples, functional, features, logical, organizational, structural, topological, and/or other aspects of the disclosure are not to be considered limitations on the disclosure as defined by the claims or limitations on equivalents to the claims.

Figure 14A:
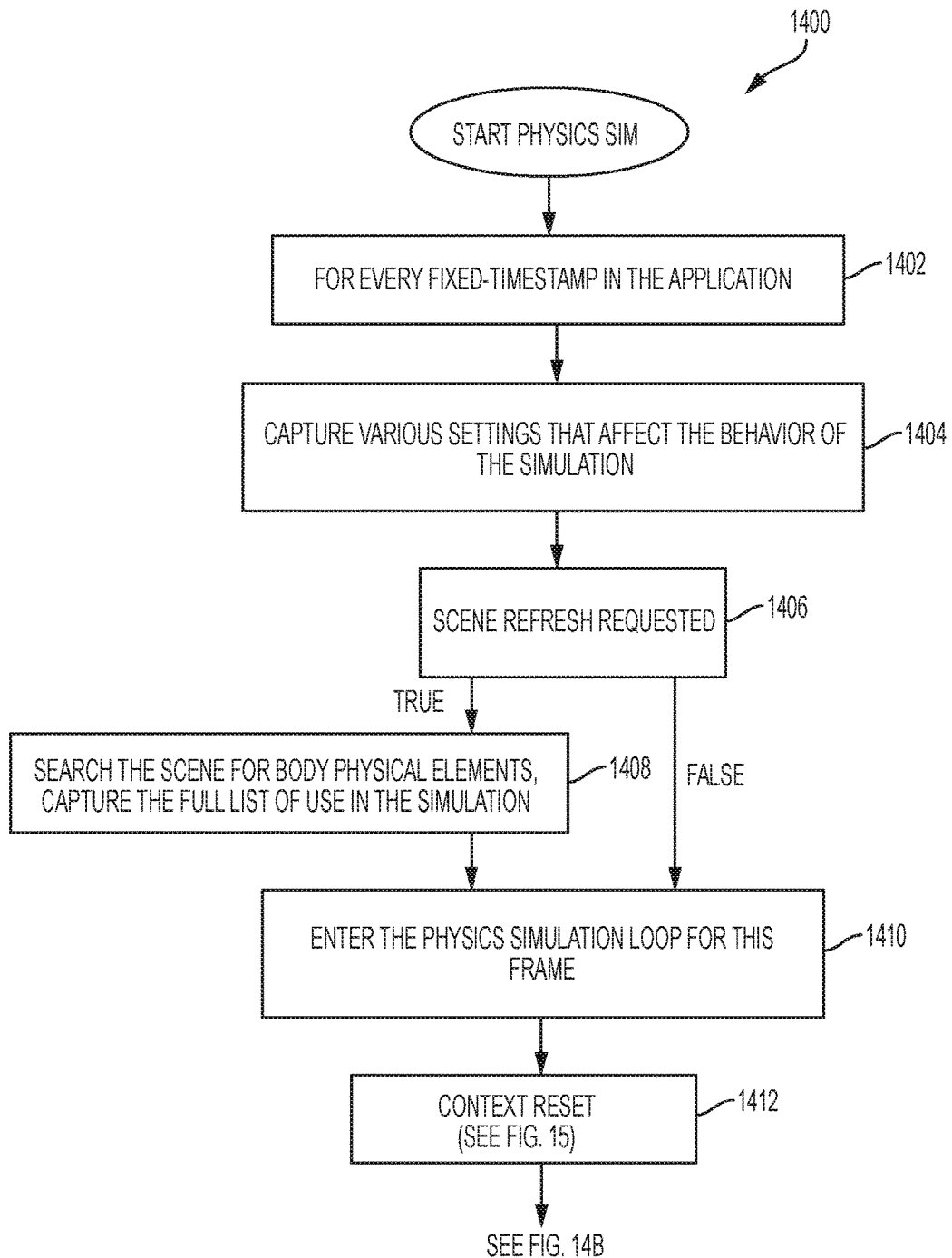
FIG. 14A illustrates at least part of a method for simulating physical elements in an interactive space, in accordance with one or more implementations.
Figure 14B:
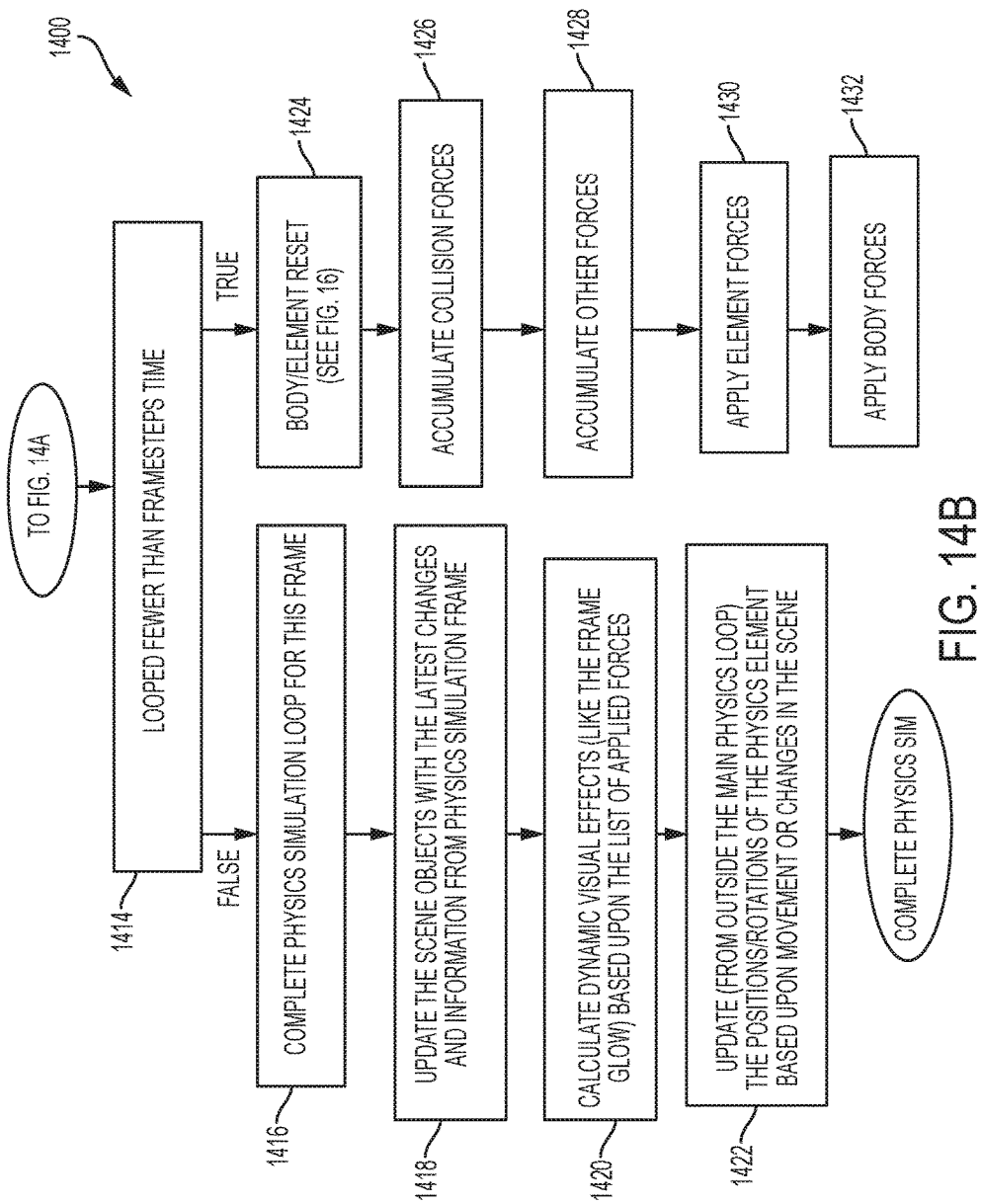
FIG. 14B illustrates at least part of a method for simulating physical elements in an interactive space, in accordance with one or more implementations.

FIGS. 14A and 14B illustrate a method 1400 for simulating physical elements in a virtual environment, in accordance with one or more implementations. In some implementations, the method 1400 corresponds to a flow/structure of a simulation.

At an operation 1402, individual fixed timestamp frames in an application may be identified.

At an operation 1404, one or more settings that may affect a behavior of a simulation may be captured. Examples of settings include FrameSteps, ForceExponent, ConflictExponent, ConflictMinimum, DynamicDownsample, AllowAttractGrab, and/or other settings.

At a decision point 1406, it may be determined whether or not a scene refresh may be requested. If so (e.g., "True"), the method 1400 may continue to an operation 1408. At operation 1408, the scene may be searched for Body physics elements (e.g., a primitive). A full list of body physics elements may be captured for use in the simulation.

If the scene refresh is not requested (e.g., "False"), the method 1400 may continue to an operation 1410. At operation 1410, a physics simulation loop may be entered for an identified frame. The method 1400 may continue to an operation 1412, in which a context reset may be performed. In some implementations, the context reset may be performed in accordance with the method 1500, shown in FIG. 15.

In FIG. 14B, method 1400 may continue to a decision point 1414. At point 1414, it may be determined whether or not the physics simulation loop has been looped less than a specified number of times (e.g., a FrameSteps number of times). If it is determined that the physics simulation loop has been looped less than a specified number of times (e.g., "True"), the method 1400 may continue to an operation 1424. At operation 1424, a body or element reset may be performed. In some implementations, the body and/or element reset may be performed in accordance with method 1600, shown in FIG. 16.

At an operation 1426, collision forces may be accumulated. Collision forces may be initially accumulated as a list. A physical interaction between two elements (e.g., a box, a sphere, a capsule, a point in the hand cloud, etc.) may generate a force, which occurs at a position. A strength of the force may be is based on a distance between the two elements. This information may be bundled together as new "force" item in the element's list of received forces. Later (e.g., operations 1430 and 1432), method 1400 may iterates through this list of forces, and may apply them to an element. Applying a force with both a strength and position (which may be different from the element's center of gravity) may cause an element to move and/or rotate. At an operation 1428, other forces may be accumulated. At an operation 1430, element forces may be applied. At an operation 1432, body forces may be applied. The method 1400 may return to the decision point 1414.

If it has been determined that the physics simulation loop has not been looped less than a specified number of times (e.g., "False"), the flowchart 1400 may continue to an operation 1416.

At operation 1416, the physics simulation may be completed for an identified frame. At an operation 1418, the scene may be updated with the latest changes and/or information from the current physics simulation frame. At an operation 1420, dynamic visual effects may be calculated based upon a list of applied forces. Dynamic visual effects may include providing color effects and/or other visual effects at points of simulated content between a user hand and a virtual object, and/or other visual effects. At an operation 1422, the positions and/or rotations of the physics elements may be updated based upon movement or changes in the scene.

Figure 15:
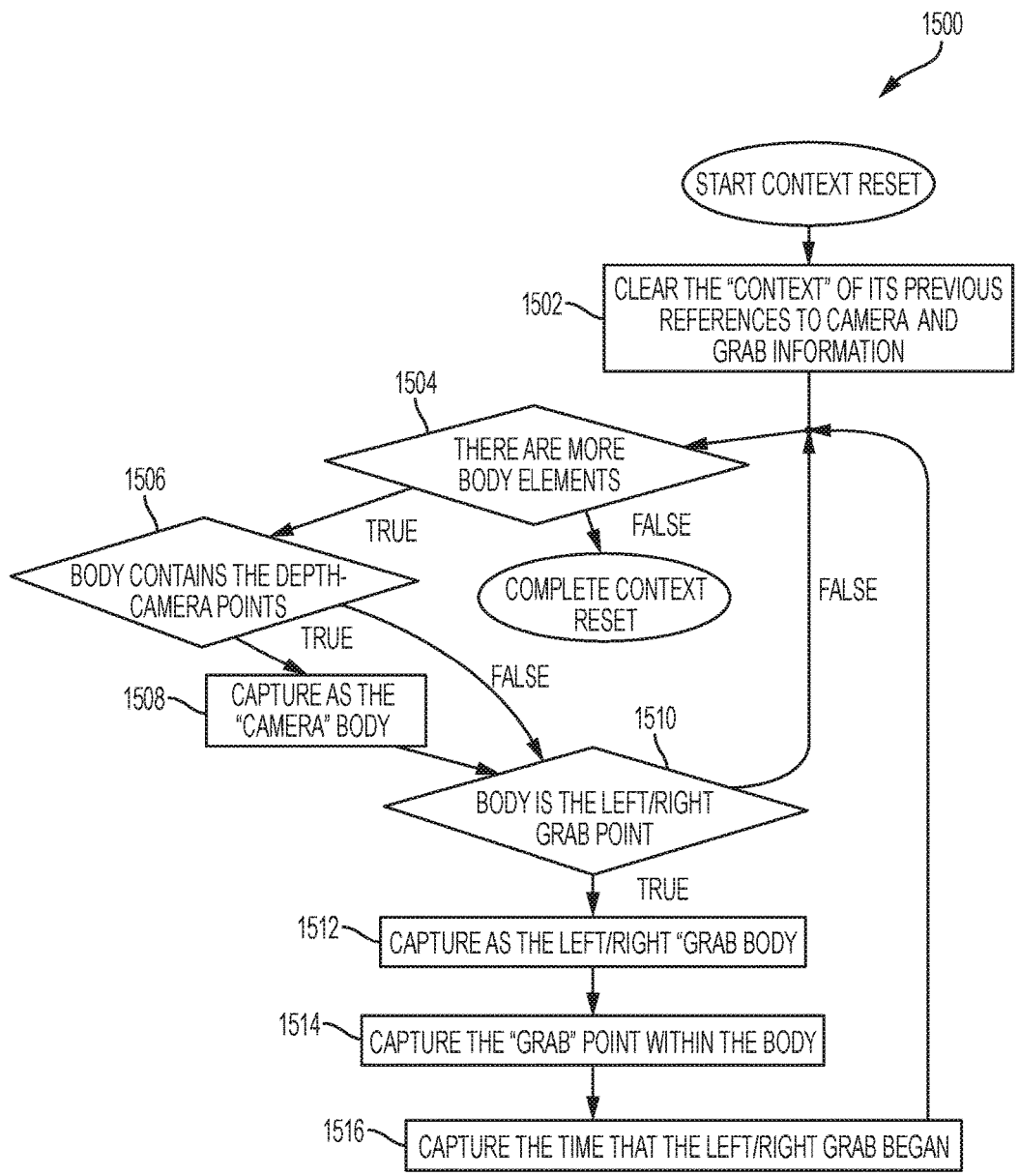
FIG. 15 illustrates a method for resetting a context of an interactive space, in accordance with one or more implementations.

FIG. 15 illustrates a method 1500 for resetting a context of a virtual environment, in accordance with one or more implementations. In some implementations, the method 1500 corresponds to allowing certain information to be captured (one time per frame) for reuse across the rest of a simulation frame (with its multiple passes).

At an operation 1502, a context of previous references to a camera may be cleared and information may be obtained. The method 1500 may proceed to a decision point 1504. At point 1504, it may be determined whether there are more body elements. If it is determined that there is not more body elements (e.g., "False"), method 1500 may terminate.

If it is determined that there may be more body elements (e.g., "True"), method 1500 may proceed to an operation 1506. At operation 1506, it may be determined whether or not a body contains one or more depth camera points. If it is determined that a given body contains one or more depth camera points (e.g., "True"), the method 1500 may proceed to an operation 1508. If it is determined that the body does not contain one or more depth camera points (e.g., "False"), method 1500 may proceed to a decision point 1510.

At the operation 1508, a body containing one or more depth camera points may be captured as a "camera body." A physics body may have "rigidbody" functionality, meaning that the body (and all of its child elements) may move together as a unit. The "camera" body, however, may not have this physics functionality, since the information may come from the real-world, e.g., sensor output from a depth camera, and thus may not react to virtual-world physics forces. At the decision point 1510, it may be determined whether the body may be a left or a right grab point. If not (e.g., "False"), the method 1500 may return to decision point 1504. If the body is the left or the right grab point (e.g., "True"), the method 1500 may continue to an operation 1512. At operation 1512, the left/right "grab" may be captured as the body. At an operation 1514, the "grab" point may be captured within the body. At an operation 1516, the time that the left/right grab began may be captured. The method 1500 may return to the decision point 1504.

Figure 16:
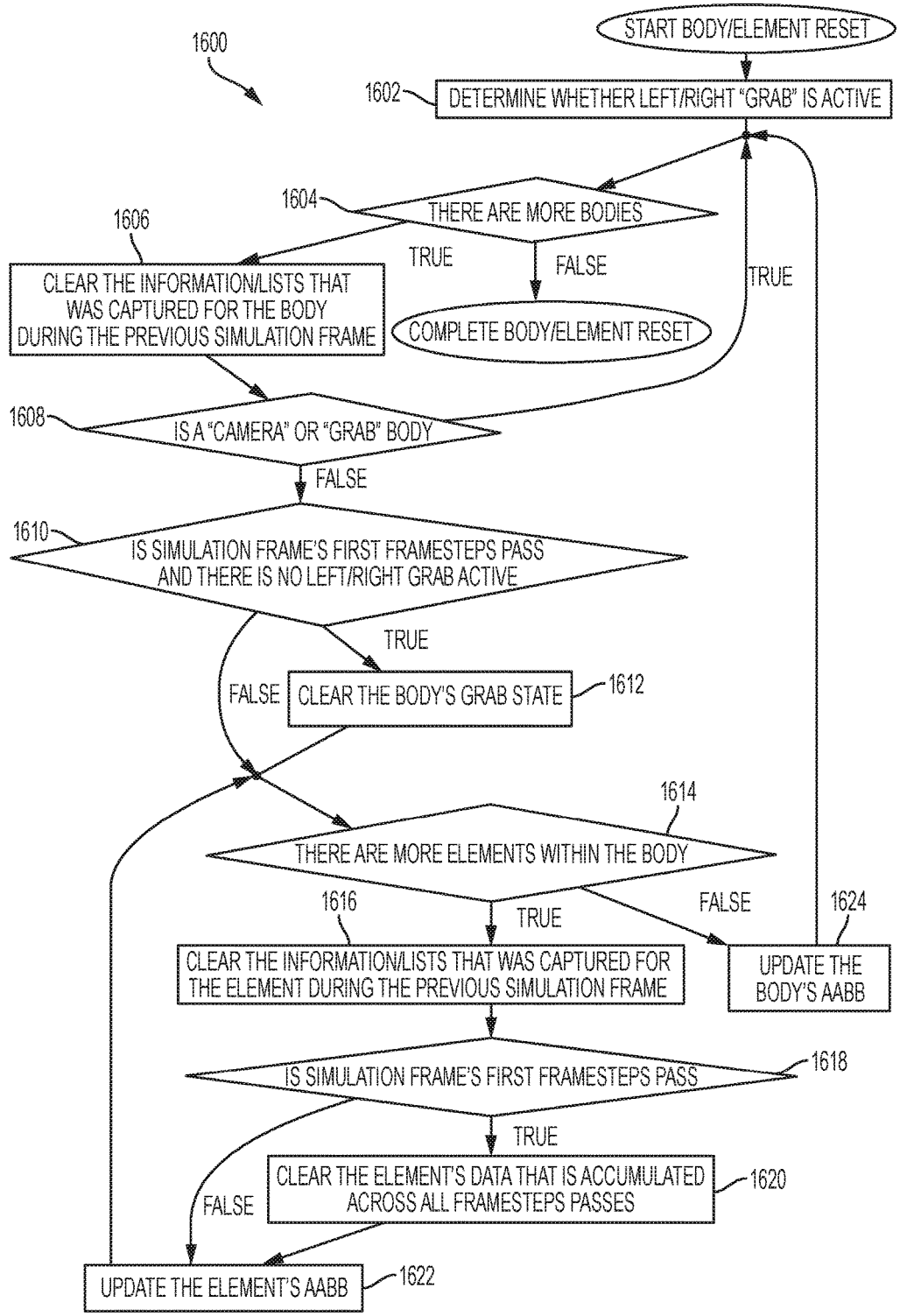
FIG. 16 illustrates a method for resetting elements in an interactive space, in accordance with one or more implementations.

FIG. 16 illustrates a method 1600 of resetting elements in a virtual environment, in accordance with one or more implementations. In various implementations, the method 1600 may facilitate allowing a simulation to clear state and/or information that may have been captured in a previous simulation frame. A state and/or other information may be reset at a beginning (rather than at the end) so that an application outside the physics simulation may have a chance to access and/or use it (e.g., for dynamic visual effects, and/or other uses).

At an operation 1602, it may be determined that the left or right "grab" may be active. At a decision point 1604, it may be determined whether or not there may be more bodies. If not (e.g., "False"), the method 1600 may terminate.

If it may be determined that there are more bodies (e.g., "True"), the method 1600 may continue to an operation 1606. At operation 1606, information/lists that may have been captured for a given body during a previous simulation frame may be cleared. The method 1600 may continue to a decision point 1608. At point 1608, it may be determined whether or not a camera or a grab body may have been obtained. If not (e.g., "True"), the method 1600 may return to decision point 1604. If a camera or a grab body may have been obtained (e.g., "False"), the method 1600 may continue to a decision point 1610. At point 1610, it may be determined whether or not a simulation frame's first FrameSteps pass and there is no left/right grab active. If so (e.g., "True"), the method 1600 may continue to an operation 1612. At operation 1612, a body's grab issue may be cleared. If not (e.g., "False"), the method 1600 may continue to a decision point 1614. At point 1614, it may be determined if there may be more elements within a given body. If not (e.g., "False"), the method 1600 may continue to an operation 1624. At operation 1624, a given body's axis-aligned bounding box (AABB) may be updated.

If there are more elements within the body (e.g., "True"), the method 1600 may continue to an operation 1616. At operation 1616, information/lists that may have been captured for an element during a previous simulation may be cleared. At a decision point 1618, it may be determined whether or not it may be a frame's first FrameSteps pass. If so (e.g., "True"), the method 1600 may continue to an operation 1620. At operation 1620, a given element's data that may be accumulated across one or more FrameSteps passes. If it is determined that it is not the frame's first FrameSteps pass (e.g., "False"), the method 1600 may continue to an operation 1622. At operation 1622, a given element's AABB may be updated.

Figure 17A:
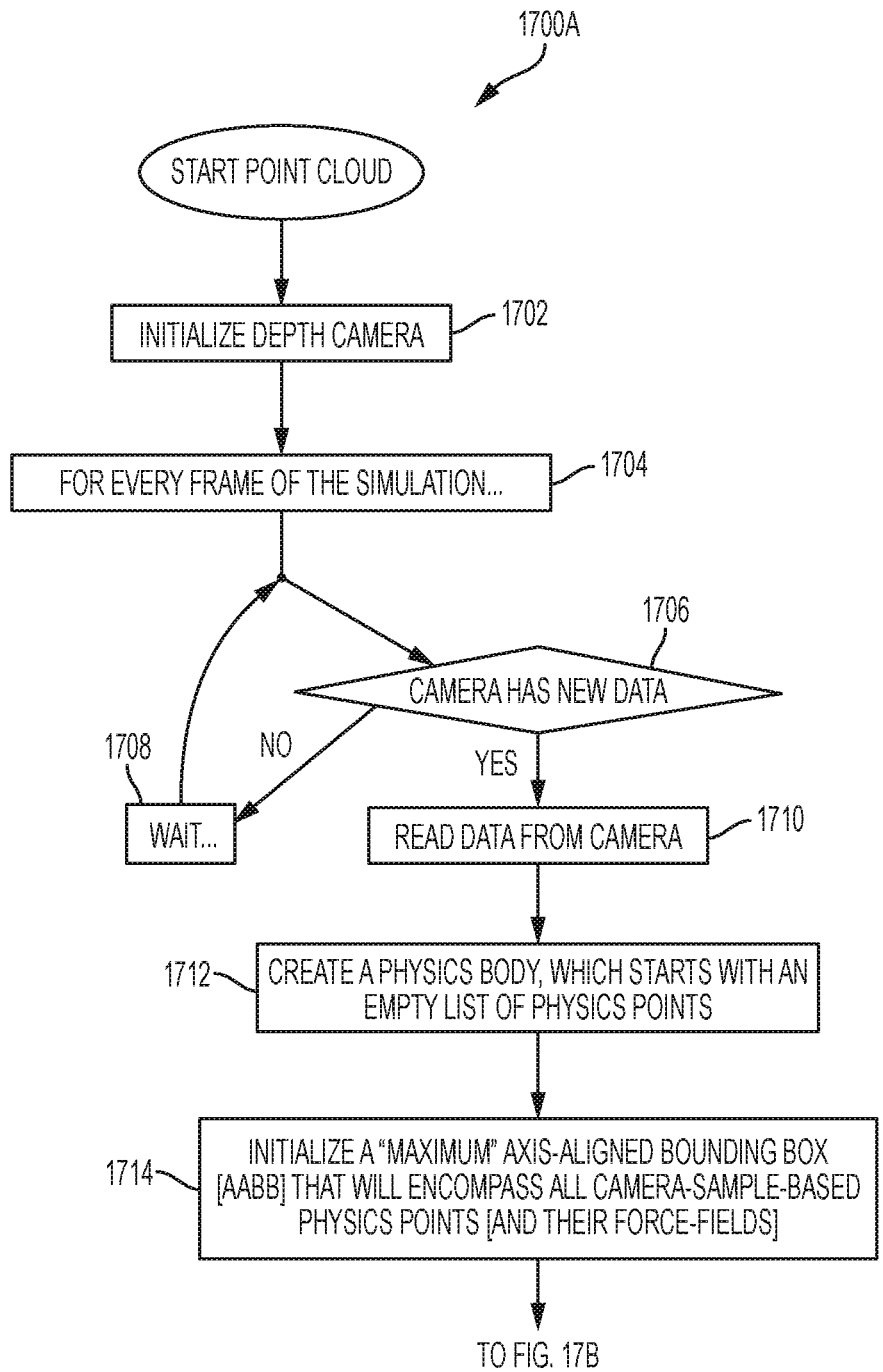
FIG. 17A illustrates at least part of a method for using point clouds to determine interactions in an interactive space, in accordance with one or more implementations.
Figure 17B:
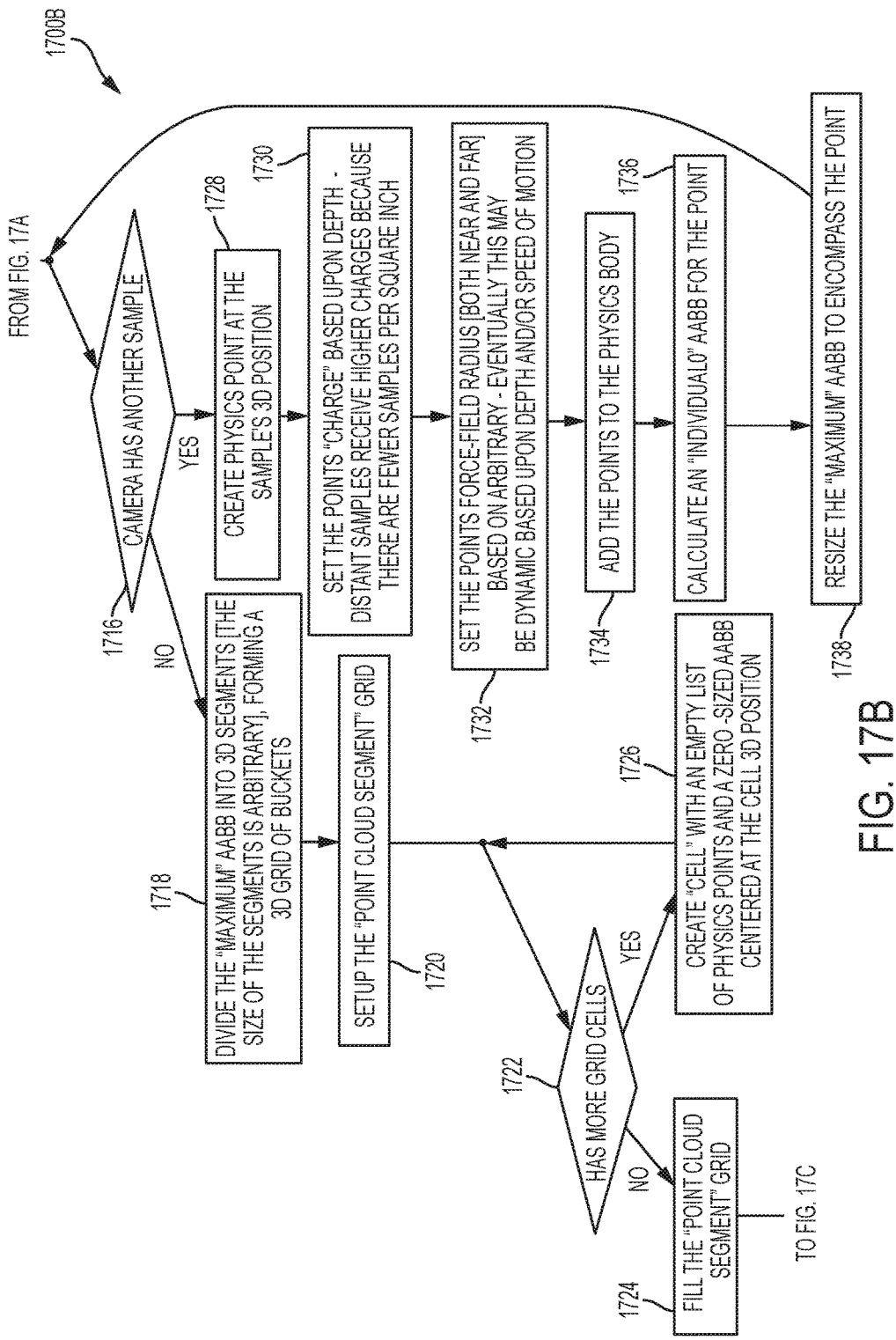
FIG. 17B illustrates at least part of a method for using point clouds to determine interactions in an interactive space, in accordance with one or more implementations.
Figure 17C:
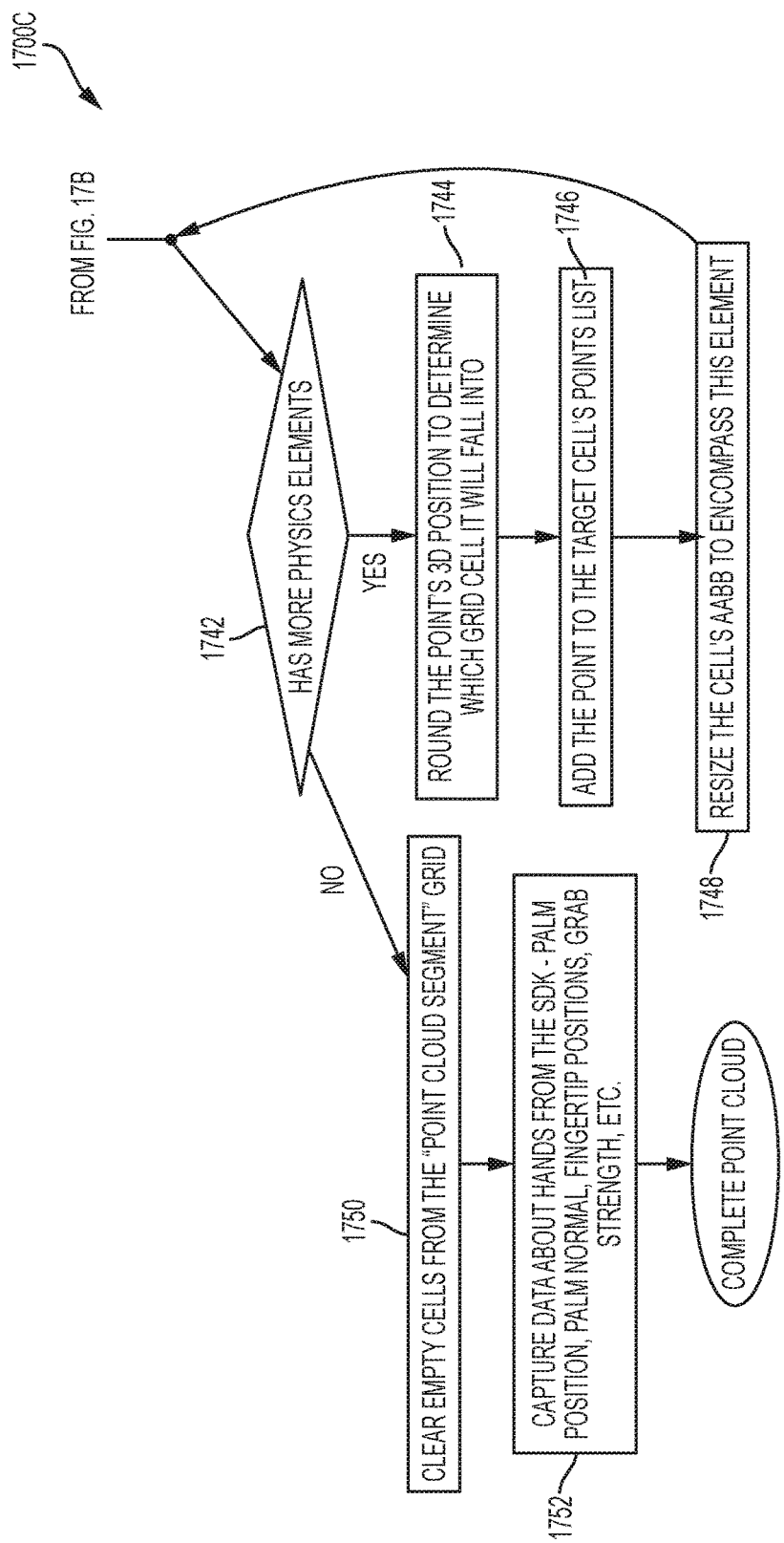
FIG. 17C illustrates at least part of a method for using point clouds to determine interactions in an interactive space, in accordance with one or more implementations.

FIGS. 17A, 17B, and 17C illustrate methods 1700A, 1700B, and 1700C, respectively, for using point clouds (e.g., three-dimensional point cloud information and/or other information) to determine interactions in a virtual environment, in accordance with one or more implementations.

In some implementations, methods 1700A, 1700B, and/or 1700C may facilitate conversion of depth camera samples into "physics" point elements. The points may be segmented into groups. The individual groups of points may be later used in a simulation for performance/optimization. In some implementations, individual point cloud elements may have an interaction volume, e.g., similar to a "point" element that a user may add manually to a scene. The physics simulation may treat a "hand point" vs. "scene point" interaction in the same or similar way that it treats a "scene point" vs. "scene point" interaction. These points may be contained with a Body (in the same or similar way "scene" points are within a Body). The Body may comprise a main container for groups of elements that move/rotate/behave as a rigid and/or semi-rigid unit.

Referring to method 1700A in FIG. 17A, at an operation 1702, a depth camera may be initialized. At an operation 1704, individual frames of a simulation may be analyzed. At a decision point 1706, it may be determined if the camera has obtained new data. If not (e.g., "No"), the method 1700A may proceed to an operation 1708. At operation 1708, method 1700A may become idle and wait. If so (e.g., "Yes"), method 1700A may proceed to an operation 1710. At operation 1710, information from the camera may be read. At an operation 1712, a physics Body may be created. In some implementations, creation may start with an empty list of physics Points. The method 1700A may continue to an operation 1714. At operation 1714, a "maximum" axis-aligned bounding box (AABB) that may encompass a set of camera-Sample-based physics Points (and their force-fields) may be initialized.

Referring to FIG. 17B, method 1700A (FIG. 17A) may continue to a decision point 1716 in method 1700B. At point 1716, it may be determined whether the camera has one or more other samples. If it may be determined that the camera does not have one or more other samples (e.g., "No"), method 1700B may proceed to an operation 1718. At operaton 1718, a "maximum" AABB may be divided into 3D segments (the size of the segments may be arbitrary), forming a 3D grid of buckets. At an operation 1720, a "point cloud segment" grid may be set up. At a decision point 1722, it may be determined whether or not the system has more grid cells. If it is determined that the system may have more cell grids, method 1700B may continue to an operation 1726. At operation 1726, a "cell" may be created with an empty list of physics Points and/or a zero-sized AABB centered at the cell 3D position. If it is determined that the system does not have more cell grids, method 1700B may continue to an operation 1724. At operation 1724, the "point cloud segment" grid may be filled. The method 1700B then continues to a decision point 1742 of method 1700C (FIG. 17C).

In FIG. 17B, at point 1716, if it is determined that the camera has another sample, method 1700B may proceed to an operation 1728. At operation 1728, a physics point may be created at the Sample's 3D position. At an operation 1730, the Point's "charge" may be set upon depth distant Samples receiving higher charges because there may be fewer samples per unit area (e.g., per square inch). At an operation 1732, the Point's interactive volume radius may be set (both near and far) based on one or more settings. It is noted that this may be dynamic based upon depth and/or speed of motion. At an operation 1734, the point may be added to the physics body. At an operation 1736, an "individual0" AABB may be calculated for the point. At an operation 1738, the "maximum" AABB may be resized to encompass the Point.

Referring to method 1700C in FIG. 17C, at decision point 1742, it may be determined whether or not the system has one or more physics elements. If it is determined that the system has one or more physics elements (e.g., "Yes"), method 1700C may continue to an operation 1744. At operation 1744, a Point's 3D position may be rounded to determine which grid cell it may fall into. At an operation 1746, the point may be added to a target cell's points list. At an operation 1748, a target cell's AABB may be resized to encompass this element. The method 1700C may return to decision point 1742.

At decision point 1742, if it is determined that the system does not have one or more physics elements (e.g., "No"), method 1700C may continue to an operation 1750. At operation 1750, empty cells may be cleared from the "point cloud segment" grid. At an operation 1752, information about hands may be captured. Examples of information about hands may include information related to one or more of palm position, palm normal, fingertip positions, grab strength, and/or other information. The method 1700C may then terminate.

Figure 18:
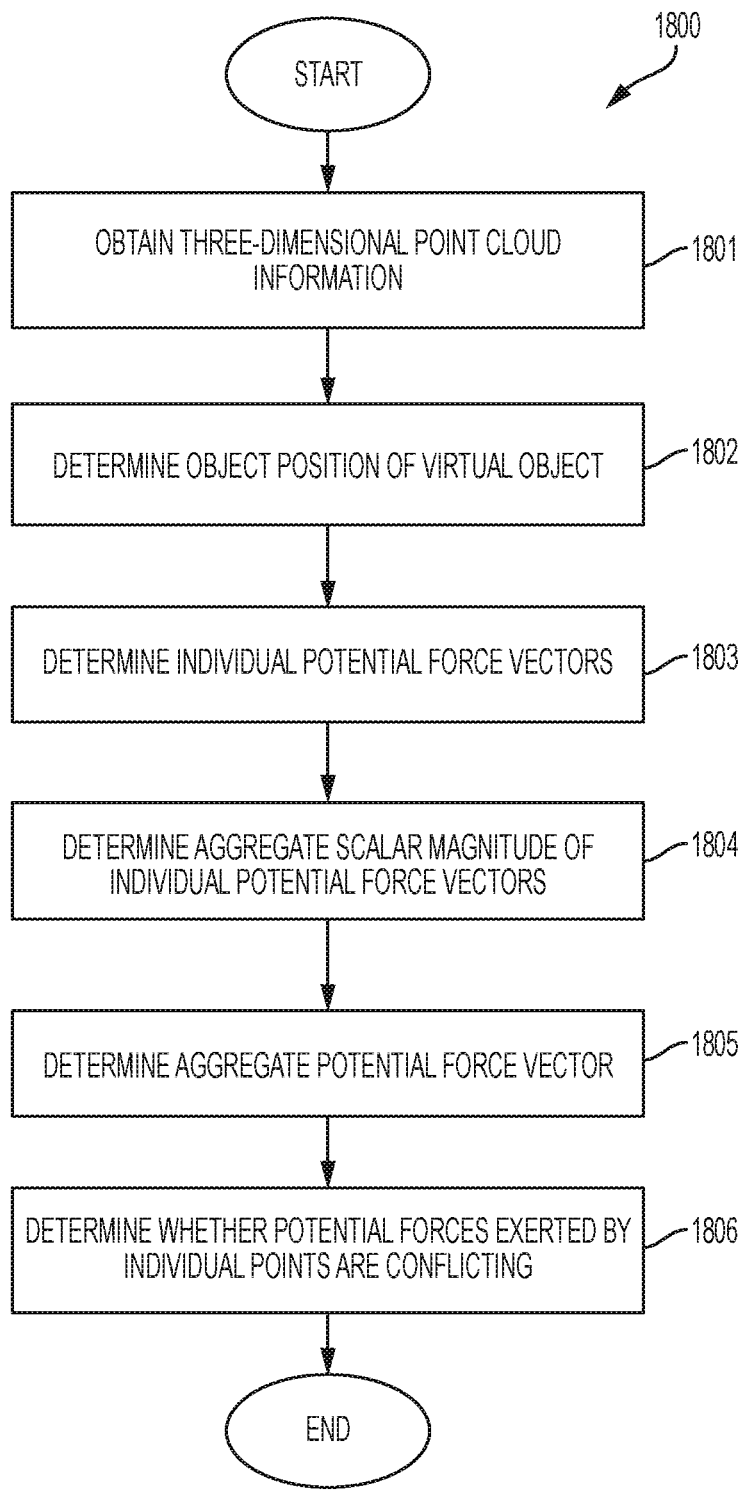
FIG. 18 illustrates a method for simulating user interaction with virtual objects in an interactive space.

FIG. 18 illustrates a method 1800 of simulating user interaction with virtual objects in an interactive space (e.g., augmented reality space). Method 1800 may be implemented in one or more processing devices such as processing devices shown in FIGS. 13D and/or 13E and/or other processing device(s). By way of non-limiting example, a processor and/or other processing device may be configured by machine-readable instructions. The machine-readable instructions may include one or more computer program components. Individual computer program components and/or sets of computer program components may be configured to carry out one or more operations of method 1800 described herein. Method 1800 may be particularly advantageous when a user interaction may be associated with a manner of interaction that comprises a "grab" gesture and/or other gestures. By way of non-limiting example, individual points within a detected point cloud may be associated with fingers and/or other portions of a user's hand. During a "grab" gesture, movement of individual points in the detected point cloud may convey a wrapping of the users fingers and/or other portions of the users' hand around a virtual object. Individual potential force vectors determined for individual ones of the points may be determined to conflict with one or more other force vectors. In some implementations, conflict between vectors may refer to vector directions of conflicting vectors opposing one another other and/or substantially opposing one another. A behavior of a virtual object resulting from conflicting force interactions may be movement that is one or more jittery, jumpy, and/or other movement that may be unwanted. Such unwanted movement may be compensated for.

To compensate for unwanted movement, when a user interaction may be identified as a "grab" gesture (e.g., by virtue of associating points with conflicting potential force vectors), it may be beneficial to modify individual force vectors associated with one or more points. Modification may include reducing individual magnitudes of individual force vectors and/or other modifications. In particular, the modifications may be configured such that resultant unwanted movement may be dampened, eliminated, and/or substantially eliminated (e.g., reducing visible jitteriness and/or jumpiness of the virtual object).

At an operation 1801, three-dimensional point cloud information may be obtained. The three-dimensional point cloud information may be obtained from a three-dimensional volumetric imaging sensor and/or other sensing devices. The three-dimensional point cloud information may convey three-dimensional coordinates of points within the augmented reality space. In some implementations, the points may include a first set of points and/or other sets of points.

At an operation 1802, object position of one or more virtual objects may be determined. An object position of a virtual object may be defined by three-dimensional coordinates within an augmented reality space.

At an operation 1803, individual potential force vectors for potential forces exerted on the virtual object by individual points in the first set of points and/or other sets of points may be determined. An individual potential force vector may be defined by one or more of a magnitude, a direction, and/or other information. The magnitude of an individual potential force vectors may be a function of one or more of distances between the individual points in the first set of points and/or other sets of points and the virtual object, and/or other information.

At an operation 1804, an aggregate scalar magnitude of the individual potential force vectors may be determined. The aggregate scalar magnitude may be determined by scalar addition of the scalar magnitudes of the individual potential force vectors, and/or by other techniques. By way of non-limiting illustration, operation 1804 may include summing force vector lengths (e.g., via scalar addition).

At an operation 1805, an aggregate potential force vector may be determined. The aggregate potential force vector may be determined by aggregating the magnitudes and/or directions of the individual potential force vectors, and/or by other techniques. By way of non-limiting example, the aggregate potential force vector may be determined by vector addition, and/or other techniques. By way of non-limiting illustration, operation 1805 may include summing force vectors (e.g., via vector addition) and/or determining the length of the resulting vector. At operation 1805, the vector addition may be important because vectors may cancel each other out. For example, left <−1, 0, 0>+right <1, 0, 0>=zero <0, 0, 0>(results in <length 0>). This cancelling-out may not occur during operation 1804, because vector lengths/magnitudes may be positive. For example, left <length 1>+right <length 1>=sum of lengths <length 2>.

At an operation 1806, a determination as to whether the potential forces exerted by the individual points in the first set of points and/or other sets of points on the virtual object are conflicting may be performed. In some implementations, an indication of conflicting potential forces may be based on evaluating a magnitude of the aggregate potential force vector and the aggregate scalar magnitude with respect to one or more thresholds. By way of non-limiting example, when there is a discrepancy (with respect to some threshold) between "total strength of individual forces applied" (e.g., as indicated by the aggregate scalar magnitude) and the "sum of those forces" (e.g., as indicated by the magnitude of the aggregate potential force vector), this may convey that one or more applied forces may be canceling each other out and may be indicative of conflicting potential force vectors.

In some implementations, a difference between an aggregate scalar magnitude and a magnitude of the aggregate potential force vector may be evaluated against a threshold. In some implementations, responsive to a difference between the aggregate scalar magnitude and the aggregate magnitude of the aggregate potential force vector being greater than a threshold value, it may be determined that the potential forces exerted by the individual points in the first set of points and/or other sets of points on the virtual object may be conflicting. In some implementations, responsive to a difference between an aggregate scalar magnitude and an aggregate magnitude of the aggregate potential force vector being less than a threshold value, it may be determined that the potential forces exerted by the individual points in the first set of points and/or other sets of points on the virtual object may not be conflicting.

In some implementations, a threshold value may comprise one or more of a predetermined value, a value determined based on one or both of the aggregate scalar magnitude and/or the magnitude of the aggregate potential force vector, and/or other values. By way of non-limiting example, a value determined based on one or both of the aggregate scalar magnitude and/or the aggregate magnitude of the aggregate potential force vector may comprise a percentage of one or both of the aggregate scalar magnitude and/or the magnitude of the aggregate potential force vector. By way of non-limiting example, the threshold value may be 80% of the aggregate magnitude, and/or other values.

In some implementations, operation 1806 and/or other operations may further comprise effectuating one or more modifications to the individual potential force vectors associated with the individual points in a first set of points and/or other sets of points. By way of non-limiting example, responsive to a determination that potential forces exerted by individual points in the first set of points and/or other sets of points on a virtual object may be conflicting, a modification to the individual potential force vectors associated with the individual points in the first set of points and/or other sets of points may be effectuated. The modification may include reducing the scalar value of individual magnitudes of the individual potential force vectors associated with the points in the first set of points and/or other sets of points. By way of non-limiting illustration, a determination that potential forces exerted by individual points in the first set of points and/or other sets of points on the virtual object may be conflicting may be indicative of a user performing a "grab" gesture and/or other gesture. The modification to the individual potential force vectors associated with the individual points in the first set of points and/or other sets of points may effectuate a "dampening" of the forces exerted on a virtual object.

In some implementations, a modification to individual potential force vectors associated with the points in the first set of points for achieving the "dampening" effect may be effectuated so long as it may be determined that potential forces exerted by the individual points in the first set of points on the virtual object may be conflicting. By way of non-limiting example, a determination that potential forces exerted by individual points in a set of points on a virtual object may be conflicting may be associated with a current (or recent) point in time. At one or more subsequent points in time, further determinations as to whether potential forces exerted by the individual points in the set of points on the virtual object may be conflicting may be carried out. By way of non-limiting illustration, at a subsequent point in time, responsive to a determination that the potential forces exerted by the individual points in the set of points on the virtual object are no longer conflicting, the modification to the individual potential force vectors associated with the individual points in the set of points may no longer be effectuated. For example, the subsequent point in time may correspond to a user's release of the virtual object and/or other gesture being performed by the user.

In some implementations, at one or more further operations of method 1800 (not shown FIG. 18), a set of points may be associated with a user object within an augmented reality space. The user object may comprise a user's hand and/or other user objects. At another operation (not shown), an object position of the user object may be determined. The object position of the user object may be defined by three-dimensional coordinates of points within the set of points and/or other sets of points.

At another operation (not shown in FIG. 18), a determination as to whether an object position of a user object relative to an object position of a virtual object may be indicative of a user interaction with the virtual object may be made. In some implementations, determining whether the object position of the user object relative to the object position of the virtual object may be indicative of a user interaction with the virtual object may comprise determining whether the individual points in a set of points have coordinates within a volume of influence (also referred to as the interactive volume) associated with the virtual object.

Responsive to a positive determination that the individual points in the set of points may have coordinates within the volume of influence, a user interaction with the virtual object may be determined.

At another operation (not shown in FIG. 18) a manner of user interaction may be determined. For example, the manner of user interaction may be one or more of a grab gesture, a release gesture, a touch gesture, and/or other gestures. In some implementations, responsive to one or more of the determination of the occurrence of the user interaction, the determination that the potential forces exerted by the individual points in a set of points and/or other sets of points on the virtual object may be conflicting, and/or other operations, the user interaction may be associated with a first manner of user interaction. The first manner of interaction may include a wrapping the user's hand around the virtual object (e.g., performing a "grab" gesture"). In some implementations, responsive to one or more of the determination of the user interaction, the determination that the potential forces exerted by the individual points in the first set of points on the virtual object may not be conflicting, and/or other operations, the user interaction may be associated with a second manner of user interaction. The second manner of interaction may be associated with one or more of a release gesture, a touch gesture, and/or other gestures.

Figure 19:
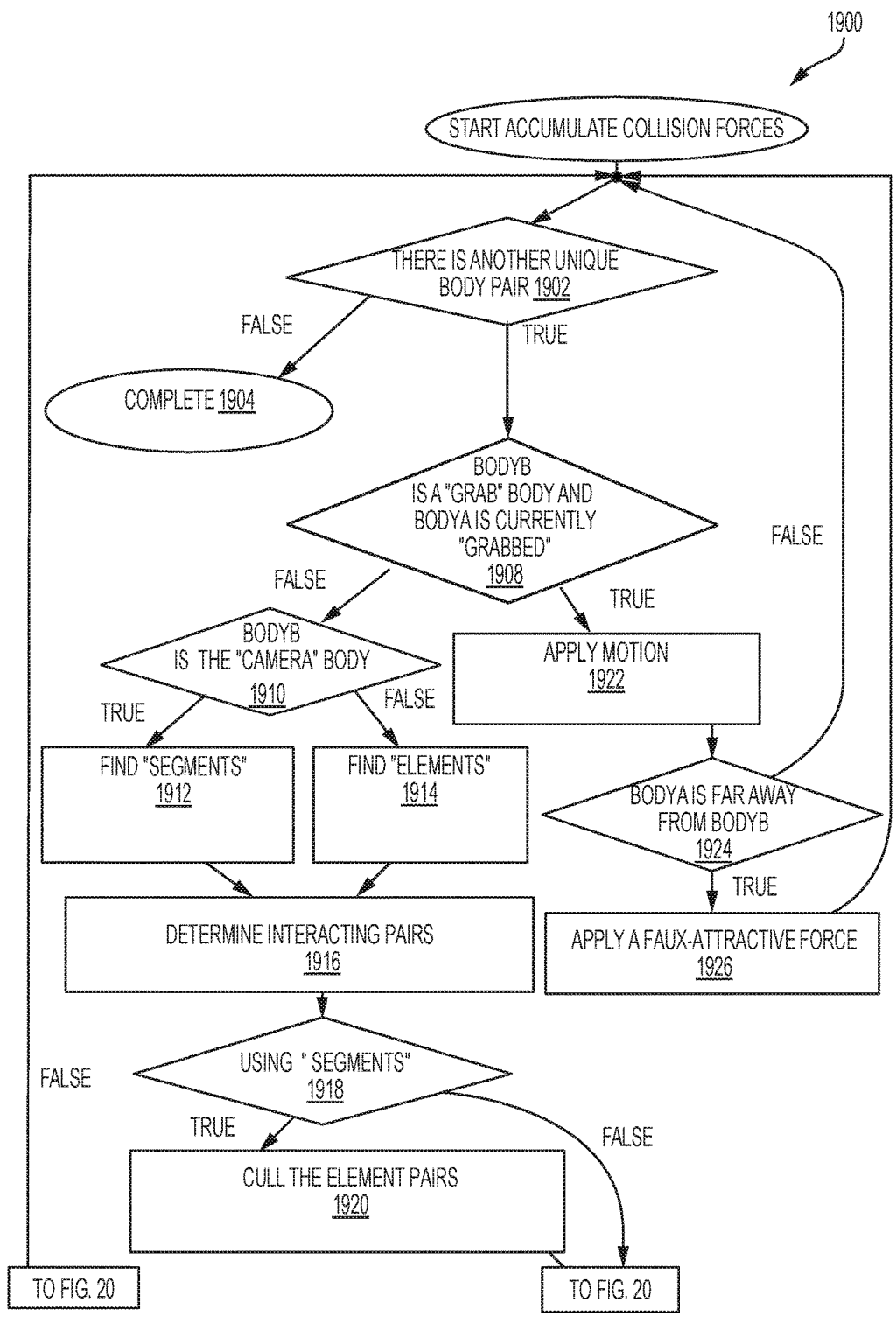
FIG. 19 illustrates at least part of a method of physics simulation for a "grab" gesture of a virtual object by a user object, in accordance with one or more implementations.
Figure 20:
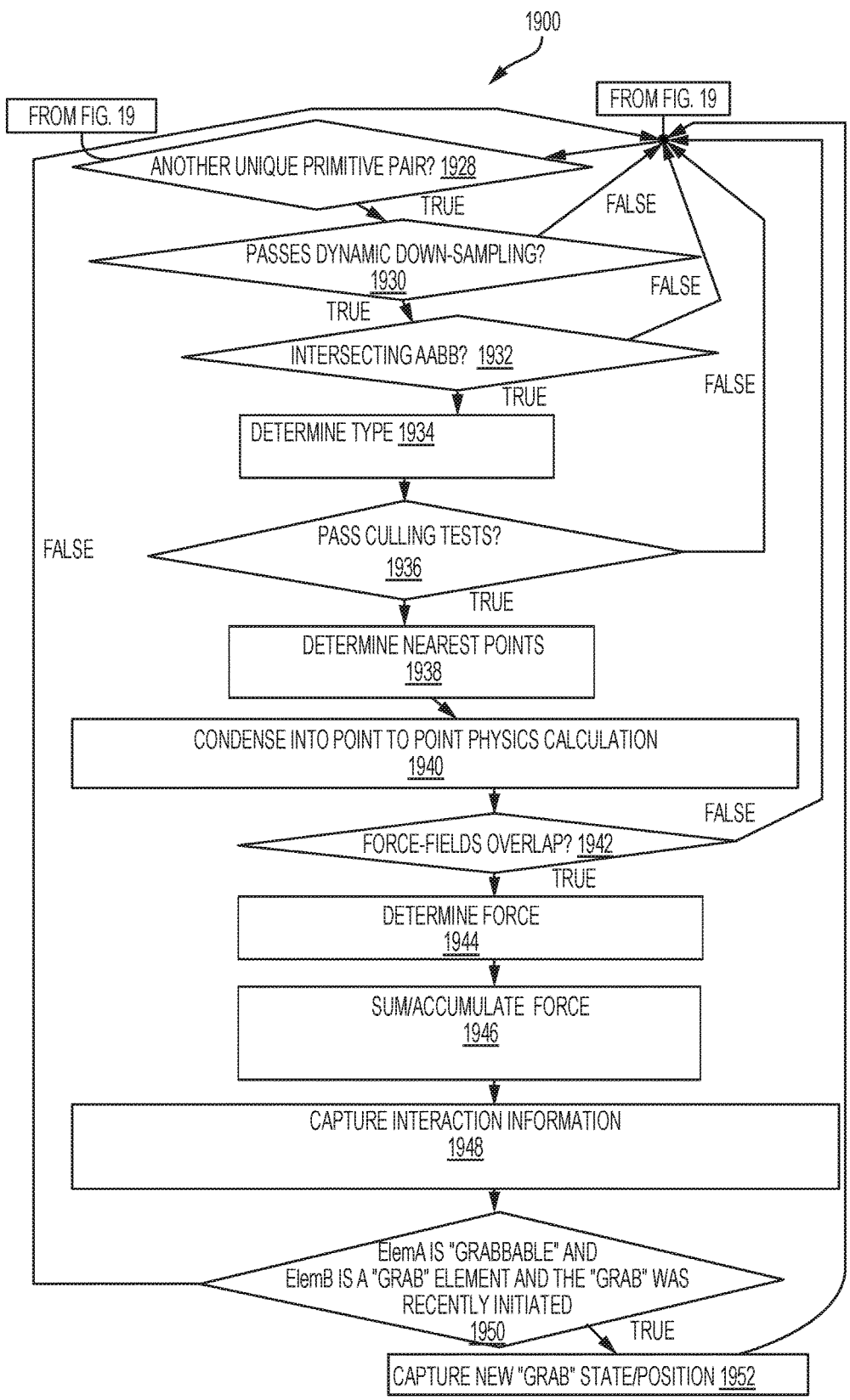
FIG. 20 illustrates at least part of a method of physics simulation of FIG. 19, in accordance with one or more implementations.

FIG. 19 and FIG. 20 illustrate respective parts of a method 1900 of physics simulation for a "grab" gesture of a virtual object by a user object, in accordance with one or more implementations. The method 1900 may include operations of one or more of performing comparisons between bodies and their elements, culling them away as inexpensively as possible, handling the various combinations of element pairs (point, box, and/or line) to capture much of their interaction/force information for later user, and/or other operations. A "body" may refer one or both of a virtual object or user object that may be simulated as a rigid body within a virtual space.

The method 1900 may be implemented in one or more processing devices such as processing devices shown in FIGS. 13D and/or 13E and/or other processing device(s). By way of non-limiting example, a processor and/or other processing device may be configured by machine-readable instructions. The machine-readable instructions may include one or more computer program components. Individual computer program components and/or sets of computer program components may be configured to carry out one or more operations of method 1900 described herein.

At an operation 1902, a determination may be made as to whether there may be one or more pairs of unique bodies. Individual bodies in a pair of bodies may be unique by virtue of being separate and distinct. If it is determined that there are no pairs of unique bodies, method 1900 may proceed to operation 1904. At operation 1904, method 1900 may be completed. If it is determined that there may be one or more pairs of unique bodies, method 1900 may proceed to operation 1908. For illustrative purposes, a pair of bodies, "BodyA" and "BodyB" will be considered. For example, BodyA may represent a virtual object, and BodyB may represent a user object, such as the user's hand.

At operation 1908, it may be determined whether one or more conditions may be satisfied. A condition may include one or more of a body performing one or more gestures, a body being in a given state, and/or other conditions. For example, a first condition may be performing a grab gesture and a second condition may be being in a grabbed state. In some implementations, operation 1908 may include determining that the first condition, second condition, and/or other conditions are satisfied. By way of non-limiting illustration, operation 1908 may include determining whether both BodyB may be performing a "grab" gesture and BodyA may be in a "grabbed" state. If it is determined that neither conditions are satisfied (e.g., "False"), method 1900 may proceed to an operation 1910. If it is determined that both conditions are satisfied, method 1900 may proceed to an operation 1922.

At operation 1910, it may be determined whether an individual body in a pair of unique bodies may be a "camera body." If it is determined that an individual body (e.g., BodyB) may be a camera body (e.g., "True"), method 1900 may proceed to operation 1912. If it is determined that an individual body (e.g., BodyB) may not be a camera body (e.g., "False"), method 1900 may proceed to operation 1914.

At operation 1912, one or more segments within an individual body in a pair of unique bodies that have an AABB which overlap with one or more segments within another individual body in the pair of unique bodies may be identified. For example, one or more segments within BodyB (determined from point cloud data of BodyB) that may have AABB overlap with one or more segments within BodyA (determined from point cloud data of BodyA) may be identified.

At operation 1914, one or more primitives within an individual body in a pair of unique bodies that have an AABB which overlap with one or more primitives within another individual body in the pair of unique bodies may be identified. For example, one or more primitives within BodyB that may have AABB that overlap with one or more primitives in BodyA may be identified. Method 1900 may proceed to operation 1916.

At operation 1916, using either one or more identified segments from operation 1912, or one or more identified primitives from operation 1914, one or more potential interacting pairs of primitives within bodies of an individual pair of unique bodies may be identified. For example, using identification(s) from operation 1912 and/or 1914, one or more interacting pairs of primitives within BodyA and BodyB may be identified.

At operation 1918, it may be determined whether one or more identified segments from operation 1912, or one or more identified primitives from operation 1914 were used in operation 1916. If one or more identified segments from operation 1912 were used in operation 1916 (e.g., "True"), method 1900 may proceed to operation 1920. If one or more identified primitives from operation 1914 were used in operation 1916 (e.g., "False"), method 1900 may proceed to operation 1928 in FIG. 20.

At operation 1920, primitive pairs identified at operation 1916 may be culled. A primitive pair may be culled using AABB of individual segments and/or other information. For example, primitive pairs from BodyB may be culled using AABB of individual segments. This operation may include culling based upon "segments" of the "camera body" (e.g., the "point cloud"). The method 1900 may divide the cloud's points into 3D segments (e.g., roughly 8 cm cubes, by default). Individual ones of these segments may contain a set of points (e.g., 100 or more points) from the cloud. Rather than checking distances between individual virtual elements and individual points in a segment's set of points, method 1900 may optimize by using the segment instead. Segments may be defined by an AABB (axis-aligned bounding box), which may have properties that make them very fast/efficient to determine whether a virtual element is touching/within the AABB. If the element is not touching/inside the AABB, the culling at operation 1920 may be used to avoided excessive distance calculations. When the element is touching/inside, method 1900 may step through increasingly more precise (and expensive) culling phases. The goal, ultimately, may be to get accurate results with the fewest amount of calculations. This use of segments may be a form of spatial partitioning.

At operation 1922, based on a determination that both BodyB may be performing a "grab" gesture and BodyA may be in a "grabbed" state, motion of BodyB may be applied to BodyA. The motion of BodyB may be determined from palm-position information, and/or other information.

At an operation 1924, it may be determined whether BodyA may be outside a threshold distance from BodyB. If it is determined that BodyA is outside the threshold distance from BodyB ("True"), method 1900 may proceed to operation 1926. If it is determined that BodyA is not outside the threshold distance from BodyB ("False"), method 1900 may return to operation 1902. Here it may be desired to keep the grabbed element near to the hand that is grabbing/holding it. The closer the object stays to the hand, the more realistic it may be experienced by the user, e.g., by transferring the hand's motion to object as accurately as possible. By way of non-limiting illustration, the threshold distance may be 1-2 cm and/or other distances.

This approach may allow for virtual elements to collide with the grabbed element. For example, if a user grabs a virtual ball and tries to drag it through a virtual wall, the ball may react to the wall, but the users real-world hands may not. When the hand is brought away from the wall, a "faux-attractive force" (operation 1926) may bring it back to the hand. In some implementations, it may "lock" the virtual element to the hand, preventing any physical collisions that may otherwise push the element away from the hand.

At operation 1926, a faux-attractive force may be applied between BodyA and BodyB. The faux-attractive force may be determined based on a distance between BodyA and BodyB. For example, at individual frames of the simulation, BodyA may be pulled half the distance toward the BodyB. Method 1900 may return to operation 1902.

In FIG. 20, at operation 1928, it may be determined whether there are one or more unique primitive pairs. A primitive in a primitive pair may be unique by virtue of being separate and distinct from the other primitive in the pair. If it is determined that there are one or more unique primitive pairs (e.g., "True"), method 1900 may proceed to operation 1930. If it is determined that there are not one or more unique primitive pairs (e.g., "False"), method 1900 may return to operation 1902 in FIG. 19.

At operation 1930, it may be determined whether an identified unique primitive pair passes a dynamic down-sampling. If it is determined that an identified unique primitive pair passes a dynamic down-sampling (e.g., "True"), method 1900 may proceed to operation 1932. If it is determined that an identified unique primitive pair does not pass a dynamic down-sampling (e.g., "False"), method 1900 may return to operation 1928.

At operation 1932, it may be determined whether an identified unique primitive pair have intersecting AABB's. If it is determined that an identified unique primitive pair have intersecting AABB's (e.g., "True"), method 1900 may proceed to operation 1934. If it is determined that an identified unique primitive pair do not have intersecting AABB's (e.g., "False"), method 1900 may return to operation 1928.

At operation 1934, individual primitive types of individual primitives in a unique primitive pair may be determined. The primitive types may include one or more of point, box, line, and/or other types.

At an operation 1936, it may be determined whether an identified unique primitive pair passes a type-specific culling test. If it is determined that an identified unique primitive pair passes a type-specific culling test (e.g., "True"), method 1900 may proceed to operation 1938. If it is determined that an identified unique primitive pair do not pass a type-specific culling test (e.g., "False"), method 1900 may return to operation 1928. The culling tests may be type-specific in the sense that an individual pairing (e.g., sphere vs. sphere, box vs. capsule, box vs. box, etc.) may have some different mathematical techniques for determining whether they are touching. As described above, the goal may be to cull a pair as soon as possible, in order to minimize the total number of calculations (and thus achieve better performance).

At operation 1938, for an identified unique primitive pair interaction, a nearest set of points between the primitives in the unique pair may be determined. The set of points may include two points. The set of points may fall on individual surfaces of individual primitives in the unique pair.

At an operation 1940, using a nearest set of points between primitives in a unique pair, a physical interaction may be condensed into a point-to-point physics calculation. The point-to-point physical calculation may also be referred to as "sphere-to-sphere." This may be the simplest scenario for calculating a force between two elements, because the interaction may be based entirely on distance/radius of the spheres. Here, method 1900 may distill all force calculations (from all different shapes) down into a sphere-to-sphere calculation. This may be accomplished by determining the nearest points between any two elements (sphere/box/capsule), and then treating those two points as spheres. By way of non-limiting illustration, consider a sphere hitting a capsule (a cylinder with hemisphere endpoints). As the sphere approaches, there may be one point on the capsule's surface that is nearest to the sphere. That point may be treated as a sphere, giving it a force-field radius that matches the capsule's. This allows method 1900 to use the same sphere-to-sphere calculation for combinations of element types.

At an operation 1942, it may be determined whether individual point force-fields overlap. If it is determined that an individual point force-field overlaps (e.g., "True"), method 1900 may proceed to operation 1944. If it is determined that an individual point force-field does not overlap (e.g., "False"), method 1900 may return to operation 1928.

At operation 1944, an amount and/or position of force that may be generated between points in a set of points may be determined.

At an operation 1946, an amount and/or position of force that may be generated between points in a set of points may be summed/accumulated into individual primitives in a unique primitive pair. In some implementations, an applied force in a given primitive in the pair may be opposite to an applied force in another primitive in the pair.

At operation 1948, interaction information may be captured. The interaction information may include one or more of a sum of forces, a list of individual forces (e.g., strength and/or position), a nearest distance between a scene primitive and a "camera" primitive, a nearest distance between a scene primitive and a "grab" primitive, and/or other information.

At an operation 1950, it may be determined whether a given primitive in a unique pair is grabable, another primitive in the unique pair is performing a "grab" gesture, and whether the "grab" was performed within a predetermined time frame. If it is determined that all three of those conditions are met (e.g., "True"), method 1900 may proceed to operation 1952. If it is determined that all three of those conditions are not met (e.g., "False"), method 1900 may return to operation 1928. By way of non-limiting illustration, operation 1950 may include determining one or more of whether a primitive of BodyA is grabbale, whether a primitive in BodyB is performing a "grab" gesture, and/or whether the "grab" gesture was recently initiated (e.g., relative a predetermined time frame).

At operation 1952, a new "grab" state/position on BodyA may be captured. The method 1900 may return to operation 928.

Figure 21:
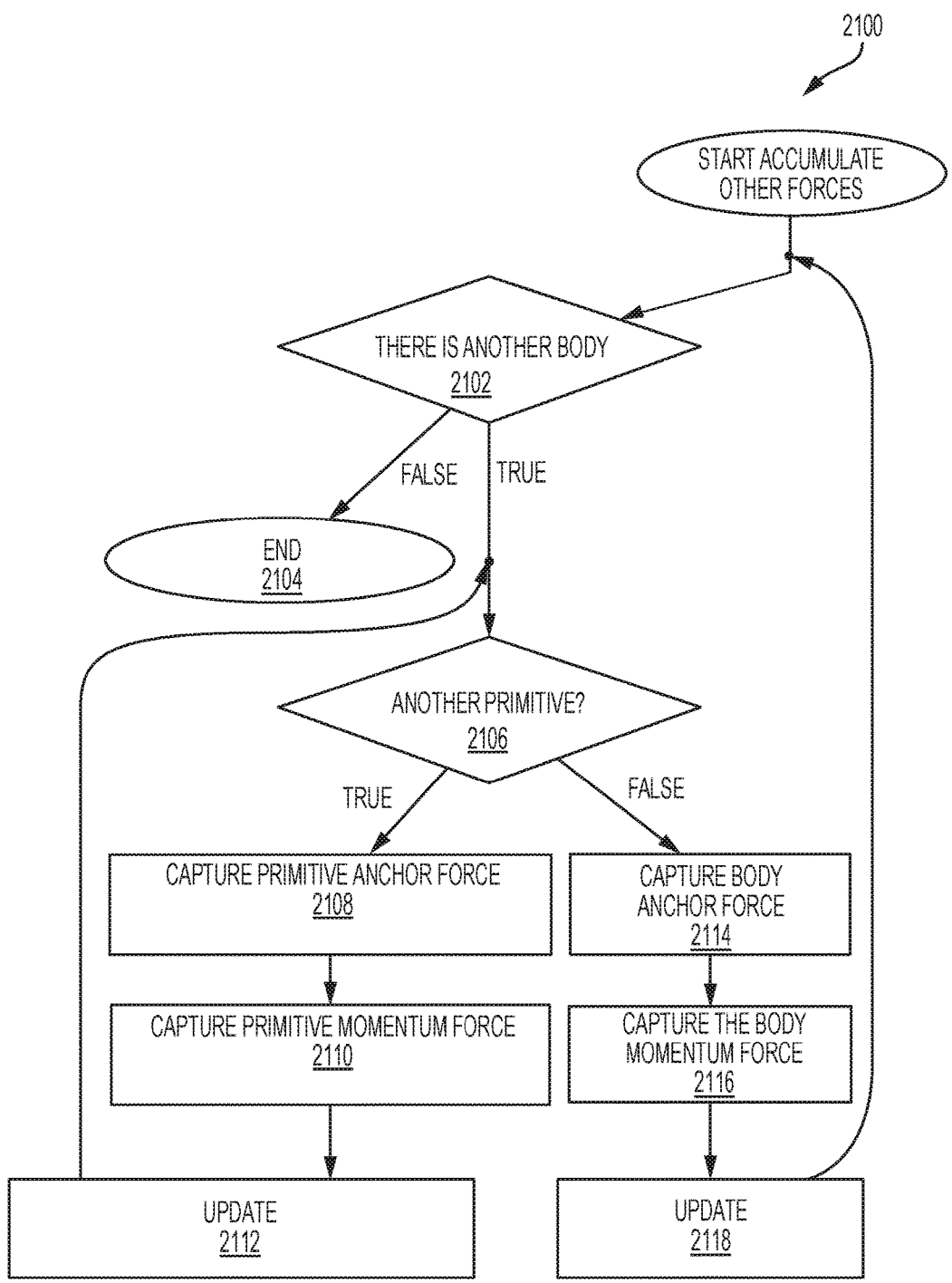
FIG. 21 illustrates a method of physics simulation that includes capturing anchor and momentum forces.

FIG. 21 illustrates a method 2100 of physics simulation that includes capturing anchor and momentum forces. A virtual object may move within a virtual space based on an anchor relationship between the virtual object and another virtual object. An anchor relationship may define an equilibrium position for a particular virtual object. In some implementations, an anchor relationship may be based on a physical property of an object. A physical property of an object may include a physical friction between two virtual objects. The anchor relationship may include an anchor strength that applies a physical friction to one or more virtual objects. A physical property of an object may include a physical momentum between two virtual objects. The anchor relationship may include an anchor momentum that applies a physical momentum to one or more virtual objects.

The method 2100 may be implemented in one or more processing devices such as processing devices shown in FIGS. 13D and/or 13E and/or other processing device(s). By way of non-limiting example, a processor and/or other processing device may be configured by machine-readable instructions. The machine-readable instructions may include one or more computer program components. Individual computer program components and/or sets of computer program components may be configured to carry out one or more operations of method 2100 described herein.

At an operation 2102, it may be determined whether one or more bodies may be present in a virtual space. If it is determined that one or more bodies may be present in a virtual space (e.g., "True"), method 2100 may proceed to operation 2106. If it is determined that one or more bodies may not be present in a virtual space (e.g., "False"), method 2100 may proceed to operation 2104. At operation 2104, method 2100 may be completed.

At operation 2106, presence of a primitive within a body may be determined. If it is determined that a primitive is present (e.g., "True"), method 2100 may proceed to operation 2108. If it is determined that a primitive is not present (e.g., "False"), method 2102 may proceed to operation 2114.

At operation 2108, a primitive anchor force may be captured. The primitive anchor force may be determined as a distance between the primitive position and an anchor multiplied by the anchor strength.

At operation 2110, a primitive momentum force may be captured. The primitive momentum force may be related to a recent velocity and a friction factor.

At an operation 2112, a primitive's momentum may be updated using latest movement and a friction factor. The method 2100 may return to operation 2106.

At operation 2114, an individual body's anchor force may be captured.

At an operation 2116, an individual body's momentum force may be captured.

At an operation 2118, an individual body's momentum force may be updated.

Figure 22:
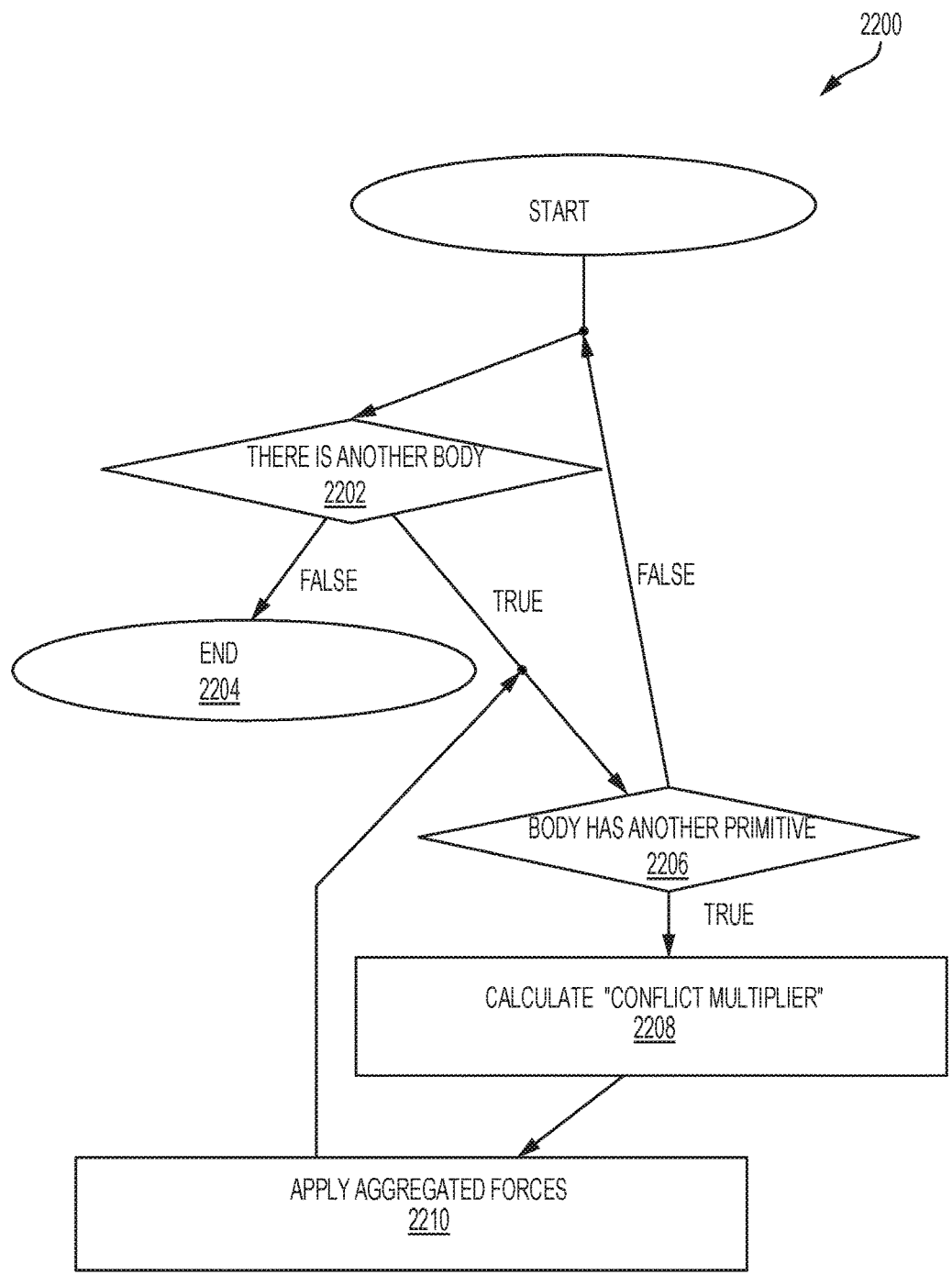
FIG. 22 illustrates a method of physics simulation that includes application of forces on individual elements of a virtual object body.

FIG. 22 illustrates a method 2200 of physics simulation that includes application of forces on individual elements (e.g., primitives) of a virtual object body. The method may include an operation of applying the accumulated forces to the position/rotation of individual elements. The method 2200 may be implemented in one or more processing devices such as processing devices shown in FIGS. 13D and/or 13E and/or other processing device(s). By way of non-limiting example, a processor and/or other processing device may be configured by machine-readable instructions. The machine-readable instructions may include one or more computer program components. Individual computer program components and/or sets of computer program components may be configured to carry out one or more operations of method 2200 described herein.

At operation 2202, presence of one or more bodies may be determined. If it is determined that a body is present (e.g., "True"), method 2200 may proceed to operation 2206. If it is determined that a body is not present (e.g., "False"), method 2200 may proceed to operation 2204. At operation 2204, method 2200 may be completed.

At operation 2206, presence of a primitive in a given body may be determined. If it is determined that a primitive is present (e.g., "True"), method 2200 may proceed to operation 2208. If it is determined that a primitive is not present (e.g., "False"), method 2200 may return to operation 2202 to determine if another body may be present.

At operation 2208, a "conflict multiplier" may be calculated. The conflict multiplier may be lower when many individual forces may be canceling each other out. The conflict multiplier may be calculated based on the same or similar operations as shown and described in method 1800.

At an operation 2210, a primitive's aggregated forces may be applied to its position. An individual force may be reduced by the "conflict multiplier" determined at operation 2208 and divided by FrameSteps.

Figure 23:
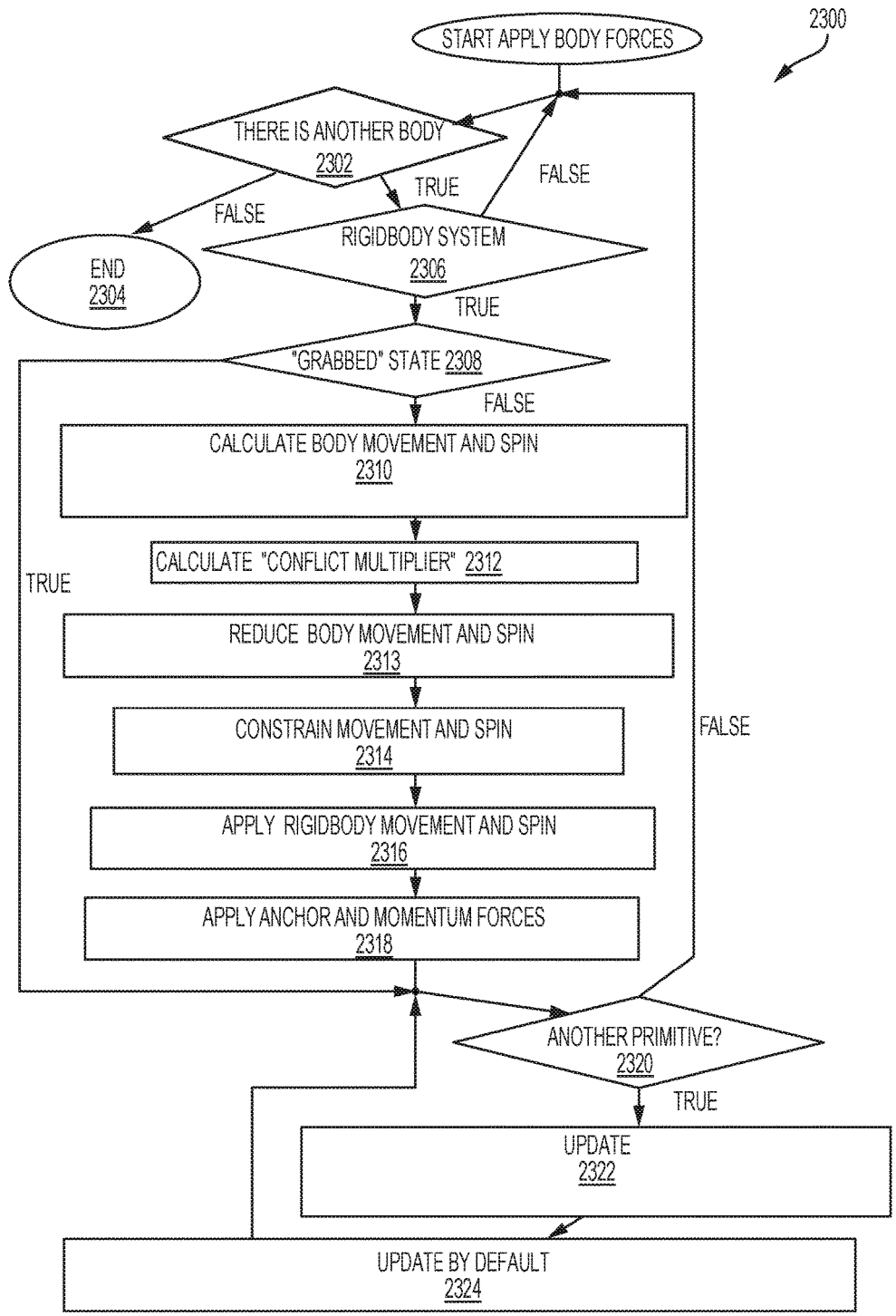
FIG. 23 illustrates a method of physics simulation that includes determining resultant movement/spin on the virtual object body based on the forces applied on individual elements of the virtual object body.

FIG. 23 illustrates a method 2300 of physics simulation that includes determining resultant movement/spin on the virtual object body based on the forces applied on individual elements of the virtual object body. The method may include an operation of using the accumulated forces on a virtual body's elements to determine one or more of movement and/or spin of the rigid body system that is the virtual object. The method may include an operation of updating the elements so that they may move and/or rotate as a rigid (or semi-rigid) unit.

The method 2300 may be implemented in one or more processing devices such as processing devices shown in FIGS. 13D and/or 13E and/or other processing device(s). By way of non-limiting example, a processor and/or other processing device may be configured by machine-readable instructions. The machine-readable instructions may include one or more computer program components. Individual computer program components and/or sets of computer program components may be configured to carry out one or more operations of method 2300 described herein.

At operation 2302, presence of one or more bodies may be determined. If it is determined that a body is present (e.g., "True"), method 2300 may proceed to operation 2306. If it is determined that a body is not present (e.g., "False"), method 2300 may proceed to operation 2304. At operation 2304, method 2300 may be completed.

At operation 2306, it may be determined whether a given body is configured as a rigidbody system. If it is determined that a given body is configured as a rigidbody system (e.g., "True"), method 2300 may proceed to operation 2308. If it is determined that a given body is not configured as a rigidbody system (e.g., "False"), method 2300 may return to operation 2302.

At operation 2308, it may be determined whether a given body is in a "grabbed" state. If it is determined that a given body is in a "grabbed" state (e.g., "True"), method 2300 may proceed to operation 2320. If it is determined that a given body is not in a "grabbed" state (e.g., "False"), method 2300 may proceed to operation 2310.

At operation 2310, an amount of body movement and/or spin may be calculated based on one or more of strengths and/or positions of forces that may have been applied to one or more primitives of a given body. The positions of forces may be relative the given body's center pivot.

At an operation 2312, a "conflict multiplier" for a given body may be determined.

At operation 2313, body movement and/or spin of a given body may be reduced. The body movement and/or spin may be reduced using a conflict multiplier and dividing by FrameSteps.

At an operation 2314, body movement and/or spin may be constrained. Body movement and/or spin may be constrained by canceling out one or more axes of freedom, and/or by other techniques.

At an operation 2316, rigidbody movement and/or spin may be applied to a given body's position and/or rotation.

At an operation 2318, anchor and/or momentum forces may be applied to a given body's position and/or rotation.

At operation 2320, presence of one or more primitives in a given body may be determined. If it is determined that a primitive is present (e.g., "True"), method 2300 may proceed to an operation 2322. If it is determined that a primitive is not present (e.g., "False"), method 2300 may return to operation 2302.

At operation 2322, a given primitive's anchor point may be updated. The given primitive's anchor point may be updated using one or more of a position and/or rotation calculated relative to a given body's position and/or rotation.

At an operation 2324, a given primitive's anchor may be updated by default. This may allow for semi-rigid behavior. Semi-rigid behavior may allow individual primitives to move, rotate, bounce, and/or move in other ways relative a rigid anchor point.

Although the disclosed technology has been described in detail for the purpose of illustration based on what is currently considered to be the most practical and preferred implementations, it is to be understood that such detail is solely for that purpose and that the disclosure is not limited to any particular implementations, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

What is claimed is:

1. A system configured to simulate user interaction with virtual objects in an augmented reality space, the system comprising:
one or more physical processor configured by machine-readable instructions to:
obtain three-dimensional point cloud information from a three-dimensional volumetric imaging sensor, the three-dimensional point cloud information conveying three-dimensional coordinates of points within the augmented reality space, the points including a first set of points;
determine an object position of a virtual object, the object position being defined by three-dimensional coordinates within the augmented reality space;
determine individual potential force vectors for potential forces exerted on the virtual object by individual points in the first set of points, an individual one of the potential force vectors being defined by a magnitude and a direction, the magnitude of the individual potential force vectors being a function of individual distances between the individual points in the first set of points and the virtual object within the augmented reality space;
determine an aggregate scalar magnitude of the individual potential force vectors;
determine an aggregate potential force vector by aggregating the magnitudes and directions of the individual potential force vectors; and
determine an aggregate magnitude of the aggregate potential force vector;
determine whether the potential forces exerted by the individual points in the first set of points on the virtual object are conflicting by comparing a difference between the aggregate scalar magnitude and the aggregate magnitude of the aggregate potential force vector with a threshold value,
wherein responsive to the difference being greater than the threshold value, it is determined the potential forces exerted by the individual points in the first set of points on the virtual object are conflicting; and
wherein responsive to the difference being less than the threshold value, it is determined the potential forces exerted by the individual points in the first set of points on the virtual object are not conflicting.

2. The system of claim 1, wherein the one or more physical processors are further configured by machine-readable instructions to:
effectuate a modification to the individual potential force vectors associated with the individual points in the first set of points that reduces the magnitudes of the individual potential force vectors, in response to determination that the potential forces exerted by the individual points in the first set of points on the virtual object are conflicting.

3. The system of claim 2, wherein the determination that the potential forces exerted by the individual points in the first set of points on the virtual object are conflicting is associated with a recent point in time, and wherein the one or more physical processors are further configured by machine-readable instructions to:
at one or more subsequent points in time, determine whether potential forces exerted by the individual points in the first set of points on the virtual object at any of the one or more subsequent points in time are conflicting; and
at a first subsequent point in time, responsive to a determination that the potential forces exerted by the individual points in the first set of points on the virtual object are not conflicting at the first subsequent point in time, no longer effectuate the modification.

4. The system of claim 1, wherein the one or more physical processors are further configured by machine-readable instructions to:
associate the first set of points with a user object within the augmented reality space; and determine a second object position of the user object, the second object position being defined by the three-dimensional coordinates of the points within the first set of points.

5. The system of claim 4, wherein the one or more physical processors are further configured by machine-readable instructions to:
   determine whether the second object position of the user object relative to the object position of the virtual object is indicative of a user interaction with the virtual object.

6. The system of claim 5, wherein the one or more physical processors are further configured by machine-readable instructions such that determining whether the second object position of the user object relative to the object position of the virtual object is indicative of a user interaction with the virtual object comprises:
   determining whether the individual points in the first set of points have coordinates within a volume of influence associated with the virtual object, wherein responsive to a positive determination that the individual points in the first set of points have coordinates within the volume of influence, a first user interaction with the virtual object is determined.

7. The system of claim 6, wherein the one or more physical processors are further configured by machine-readable instructions to:
   responsive to the determination of the first user interaction and the determination that the potential forces exerted by the individual points in the first set of points on the virtual object are conflicting, associate the first user interaction with a manner of user interaction.

8. The system of claim 7, wherein the user object comprises a hand of a user, and wherein the manner of user interaction includes wrapping the hand of the user around the virtual object.

9. The system of claim 6, wherein the one or more physical processors are further configured by machine-readable instructions to:
   responsive to the determination of the first user interaction and the determination that the potential forces exerted by the individual points in the first set of points on the virtual object are not conflicting, associate the first user interaction with a manner of user interaction.

10. The system of claim 9, wherein the user object comprises a hand of a user, and wherein the manner of user interaction includes one or more of touching or releasing the virtual object.

11. A method of simulating user interaction with virtual objects in an augmented reality space, the method being implemented in a computer system comprising one or more physical processors and storage media storing machine-readable instructions, the method comprising:
   obtaining three-dimensional point cloud information from a three-dimensional volumetric imaging sensor, the three-dimensional point cloud information conveying three-dimensional coordinates of points within the augmented reality space, the points including a first set of points;
   determining an object position of a virtual object, the object position the being defined by three-dimensional coordinates within the augmented reality space;
   determining individual potential force vectors for potential forces exerted on the virtual object by individual points in the first set of points, an individual one of the potential force vectors being defined by a magnitude and a direction, the magnitude of the individual potential force vectors being a function of distances between the individual points in the first set of points and the virtual object within the augmented reality space;
   determining an aggregate scalar magnitude of the individual potential force vectors;
   determining an aggregate potential force vector by aggregating the magnitudes and directions of the individual potential force vectors;
   determining an aggregate magnitude of the aggregate potential force vector; and
   determining whether the potential forces exerted by the individual points in the first set of points on the virtual object are conflicting by comparing a difference between the aggregate scalar magnitude and the aggregate magnitude of the aggregate potential force vector with a threshold value,
   wherein responsive to the difference being greater than the threshold value, it is determined the potential forces exerted by the individual points in the first set of points on the virtual object are conflicting; and
   wherein responsive to the difference being less than the threshold value, it is determined the potential forces exerted by the individual points in the first set of points on the virtual object are not conflicting.

12. The method of claim 11, further comprising:
   effectuating a modification to the individual potential force vectors associated with the individual points in the first set of points that reduces the magnitudes of the individual potential force vectors, in response to determination that the potential forces exerted by the individual points in the first set of points on the virtual object are conflicting.

13. The method of claim 12, wherein the determining that the potential forces exerted by the individual points in the first set of points on the virtual object are conflicting is associated with a recent point in time, and wherein the method further comprises:
   at one or more subsequent points in time, determining whether potential forces exerted by the individual points in the first set of points on the virtual object are conflicting; and
   at a first subsequent point in time, responsive to a determination that the potential forces exerted by the individual points in the first set of points on the virtual object are not conflicting at the first subsequent point in time, no longer effectuating the modification.

14. The method of claim 11, further comprising:
   associating the first set of points with a user object within the augmented reality space; and
   determining a second object position of the user object, the second object position being defined by the three-dimensional coordinates of the points within the first set of points.

15. The method of claim 14, further comprising:
   determining whether the second object position of the user object relative to the object position of the virtual object is indicative of a user interaction with the virtual object.

16. The method of claim 15, wherein determining whether the second object position of the user object relative to the object position of the virtual object is indicative of a user interaction with the virtual object comprises:
   determining whether the individual points in the first set of points have coordinates within a volume of influence associated with the virtual object, wherein responsive to a positive determination that the individual points in the first set of points have coordinates within the volume of influence, determining a first user interaction with the virtual object.

17. The method of claim 16, further comprising:
responsive to the determination of the first user interaction and the determination that the potential forces exerted by the individual points in the first set of points on the virtual object are conflicting, associating the first user interaction with a manner of user interaction.

18. The method of claim 17, wherein the user object comprises a hand of a user, and wherein the manner of user interaction includes wrapping the hand of the user around the virtual object.

19. The system of claim 16, wherein the one or more physical processors are further configured by machine-readable instructions to:
responsive to the determination of the first user interaction and the determination that the potential forces exerted by the individual points in the first set of points on the virtual object are not conflicting, associate the first user interaction with a manner of user interaction.

20. The system of claim 19, wherein the user object comprises a hand of a user, and wherein the manner of user interaction includes one or more of touching or releasing the virtual object.

* * * * *